US007502726B2

(12) United States Patent
Panasyuk et al.

(10) Patent No.: US 7,502,726 B2
(45) Date of Patent: *Mar. 10, 2009

(54) SYSTEMS AND METHODS FOR MAINTAINING A SESSION BETWEEN A CLIENT AND HOST SERVICE

(75) Inventors: Anatoliy Panasyuk, Bellevue, WA (US); Andre Kramer, Cambridge (GB); Bradley Jay Pedersen, Parkland, FL (US); David Sean Stone, Lauderdale By-The-Sea, FL (US); Terry Treder, Highland Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 613 days.

This patent is subject to a terminal disclaimer.

(21) Appl. No.: 11/158,156

(22) Filed: Jun. 20, 2005

(65) Prior Publication Data
US 2005/0246445 A1    Nov. 3, 2005

Related U.S. Application Data

(60) Division of application No. 10/711,646, filed on Sep. 29, 2004, which is a continuation-in-part of application No. 09/880,268, filed on Jun. 13, 2001, now Pat. No. 7,100,200, and a continuation-in-part of application No. 10/683,881, filed on Oct. 10, 2003.

(51) Int. Cl.
*G06F 9/445* (2006.01)
*G06F 12/16* (2006.01)
*G06F 15/18* (2006.01)

(52) U.S. Cl. ............................. 703/22; 703/27; 726/7; 726/8; 709/224

(58) Field of Classification Search .................. 703/22, 703/27; 709/224–227; 726/15, 7, 8
See application file for complete search history.

(56) References Cited

U.S. PATENT DOCUMENTS
4,438,511 A    3/1984    Baran
(Continued)

FOREIGN PATENT DOCUMENTS
EP    0 384 339 A2    8/1990
(Continued)

OTHER PUBLICATIONS

Alanko, T. et al. "Measured performance of data transmission over cellular telephone networks." Publication C-1994-53, pp. 1-20, University of Helsinki, Department of Computer Science, Helsinki, 1994.
(Continued)

*Primary Examiner*—Thai Phan
(74) *Attorney, Agent, or Firm*—John D. Lanza; Christopher J. McKenna; Choate, Hall & Stewart LLP

(57) ABSTRACT

The invention relates to methods and systems for reconnecting a client and providing user authentication across a reliable and persistent communication session. A first protocol that encapsulates a plurality of secondary protocols is used to communicate over a network. A first protocol service, using the first protocol, provides session persistence and a reliable connection between a client and a host service. When there is a disruption in the network connection between a client and a host service, the connection is reestablished and the user's session with the host service is maintained through the connection being reestablished.

36 Claims, 27 Drawing Sheets

U.S. PATENT DOCUMENTS

| | | |
|---|---|---|
| 4,649,510 A | 3/1987 | Schmidt |
| 4,736,369 A | 4/1988 | Barzilai et al. |
| 4,750,171 A | 6/1988 | Kedar et al. |
| 4,768,190 A | 8/1988 | Giancarlo |
| 4,837,800 A | 6/1989 | Freeburg et al. |
| 4,893,307 A | 1/1990 | McKay et al. |
| 4,912,756 A | 3/1990 | Hop |
| 4,924,378 A | 5/1990 | Hershey et al. |
| 4,941,089 A | 7/1990 | Fischer |
| 4,953,159 A | 8/1990 | Hayden et al. |
| 5,010,549 A | 4/1991 | Katou et al. |
| 5,021,949 A | 6/1991 | Morten et al. |
| 5,159,592 A | 10/1992 | Perkins |
| 5,181,200 A | 1/1993 | Harrison |
| 5,204,897 A | 4/1993 | Wyman |
| 5,210,753 A | 5/1993 | Natarajan |
| 5,212,806 A | 5/1993 | Natarjan |
| 5,220,501 A | 6/1993 | Lawlor et al. |
| 5,224,098 A | 6/1993 | Bird et al. |
| 5,241,542 A | 8/1993 | Natarajan et al. |
| 5,276,680 A | 1/1994 | Messenger |
| 5,307,490 A | 4/1994 | Davidson et al. |
| 5,325,361 A | 6/1994 | Lederer et al. |
| 5,349,678 A | 9/1994 | Morris et al. |
| 5,359,721 A | 10/1994 | Kempf et al. |
| 5,390,297 A | 2/1995 | Barber et al. |
| 5,410,543 A | 4/1995 | Seitz et al. |
| 5,412,654 A | 5/1995 | Perkins |
| 5,412,717 A | 5/1995 | Fischer |
| 5,416,842 A | 5/1995 | Aziz |
| 5,426,637 A | 6/1995 | Derby et al. |
| 5,442,633 A | 8/1995 | Perkins et al. |
| 5,442,791 A | 8/1995 | Wrabetz et al. |
| 5,446,736 A | 8/1995 | Gleeson et al. |
| 5,446,915 A | 8/1995 | Pierce |
| 5,448,561 A | 9/1995 | Kaiser et al. |
| 5,455,953 A | 10/1995 | Russell |
| 5,475,819 A | 12/1995 | Miller et al. |
| 5,481,535 A | 1/1996 | Hershey |
| 5,481,721 A | 1/1996 | Serlet et al. |
| 5,490,139 A | 2/1996 | Baker et al. |
| 5,491,750 A | 2/1996 | Bellare et al. |
| 5,491,800 A | 2/1996 | Goldsmith et al. |
| 5,499,343 A | 3/1996 | Pettus |
| 5,504,814 A | 4/1996 | Miyahara |
| 5,509,070 A | 4/1996 | Schull |
| 5,515,508 A | 5/1996 | Pettus et al. |
| 5,524,238 A | 6/1996 | Miller et al. |
| 5,544,246 A | 8/1996 | Mandelbaum et al. |
| 5,548,723 A | 8/1996 | Pettus |
| 5,550,976 A | 8/1996 | Henderson et al. |
| 5,550,981 A | 8/1996 | Bauer et al. |
| 5,553,060 A | 9/1996 | Obermanns et al. |
| 5,553,139 A | 9/1996 | Ross et al. |
| 5,557,732 A | 9/1996 | Thompson |
| 5,559,800 A | 9/1996 | Mousseau et al. |
| 5,564,016 A | 10/1996 | Korenshtein |
| 5,564,070 A | 10/1996 | Want et al. |
| 5,566,225 A | 10/1996 | Haas |
| 5,568,645 A | 10/1996 | Morris et al. |
| 5,572,528 A | 11/1996 | Shuen |
| 5,574,774 A | 11/1996 | Ahlberg et al. |
| 5,586,257 A | 12/1996 | Perlman |
| 5,592,549 A | 1/1997 | Nagel et al. |
| 5,594,490 A | 1/1997 | Dawson et al. |
| 5,602,916 A | 2/1997 | Grube et al. |
| 5,604,490 A | 2/1997 | Blakley et al. |
| 5,610,595 A | 3/1997 | Garrabrant et al. |
| 5,623,600 A | 4/1997 | Ji et al. |
| 5,623,601 A | 4/1997 | Vu |
| 5,627,821 A | 5/1997 | Miyagi |
| 5,627,892 A | 5/1997 | Kauffman |
| 5,633,868 A | 5/1997 | Baldwin et al. |
| 5,638,358 A | 6/1997 | Hagi |
| 5,638,513 A | 6/1997 | Ananda |
| 5,652,789 A | 7/1997 | Miner et al. |
| 5,657,390 A | 8/1997 | Elgamal et al. |
| 5,664,007 A | 9/1997 | Samadi et al. |
| 5,666,501 A | 9/1997 | Jones et al. |
| 5,668,999 A | 9/1997 | Gosling |
| 5,671,354 A | 9/1997 | Ito et al. |
| 5,673,322 A | 9/1997 | Pepe et al. |
| 5,682,534 A | 10/1997 | Kapoor et al. |
| 5,689,708 A | 11/1997 | Regnier et al. |
| 5,717,737 A | 2/1998 | Doviak |
| 5,721,818 A | 2/1998 | Hanif et al. |
| 5,724,346 A | 3/1998 | Kobayashi et al. |
| 5,729,734 A | 3/1998 | Parker et al. |
| 5,732,074 A | 3/1998 | Spaur |
| 5,737,416 A | 4/1998 | Cooper et al. |
| 5,742,757 A | 4/1998 | Hamadani et al. |
| 5,748,897 A | 5/1998 | Katiyar |
| 5,752,185 A | 5/1998 | Ahuja |
| 5,754,774 A | 5/1998 | Bittinger et al. |
| 5,758,186 A | 5/1998 | Hamilton et al. |
| 5,768,525 A | 6/1998 | Kralowetz et al. |
| 5,771,459 A | 6/1998 | Demery et al. |
| 5,784,643 A | 7/1998 | Shields |
| 5,794,207 A | 8/1998 | Walker et al. |
| 5,796,727 A | 8/1998 | Harrison et al. |
| 5,812,671 A | 9/1998 | Ross |
| 5,812,784 A | 9/1998 | Watson et al. |
| 5,848,064 A | 12/1998 | Cowan |
| 5,856,974 A | 1/1999 | Gervais et al. |
| 5,889,816 A | 3/1999 | Agrawal et al. |
| 5,909,431 A | 6/1999 | Kuthyar et al. |
| 5,923,756 A | 7/1999 | Shambroom |
| 5,933,412 A | 8/1999 | Choudhury et al. |
| 5,935,212 A | 8/1999 | Kalajan et al. |
| 5,944,791 A | 8/1999 | Scherpbier |
| 5,956,407 A | 9/1999 | Slavin |
| 5,968,176 A | 10/1999 | Nessett et al. |
| 5,987,611 A | 11/1999 | Freund |
| 6,006,090 A | 12/1999 | Coleman et al. |
| 6,023,724 A | 2/2000 | Bhatia et al. |
| 6,055,575 A | 4/2000 | Paulsen et al. |
| 6,058,250 A | 5/2000 | Harwood et al. |
| 6,058,480 A | 5/2000 | Brown |
| 6,085,247 A | 7/2000 | Parsons et al. |
| 6,088,451 A | 7/2000 | He et al. |
| 6,091,951 A | 7/2000 | Sturniolo et al. |
| 6,094,423 A | 7/2000 | Alfano et al. |
| 6,101,543 A | 8/2000 | Alden et al. |
| 6,112,085 A | 8/2000 | Garner et al. |
| 6,131,116 A | 10/2000 | Riggins et al. |
| 6,145,109 A | 11/2000 | Schuster et al. |
| 6,147,986 A | 11/2000 | Orsic |
| 6,154,461 A | 11/2000 | Sturniolo et al. |
| 6,161,123 A | 12/2000 | Renouard et al. |
| 6,166,729 A | 12/2000 | Acosta et al. |
| 6,167,513 A | 12/2000 | Inoue et al. |
| 6,169,992 B1 | 1/2001 | Beall et al. |
| 6,170,057 B1 | 1/2001 | Inoue et al. |
| 6,170,075 B1 | 1/2001 | Schuster et al. |
| 6,198,920 B1 | 3/2001 | Doviak et al. |
| 6,199,113 B1 | 3/2001 | Alegre et al. |
| 6,201,962 B1 | 3/2001 | Sturniolo et al. |
| 6,226,618 B1 | 5/2001 | Downs et al. |
| 6,226,750 B1 | 5/2001 | Trieger |
| 6,226,769 B1 | 5/2001 | Schuster et al. |
| 6,230,004 B1 | 5/2001 | Hall et al. |
| 6,233,617 B1 | 5/2001 | Rothwein et al. |
| 6,233,619 B1 | 5/2001 | Narisi et al. |
| 6,236,652 B1 | 5/2001 | Preston et al. |

| | | | |
|---|---|---|---|
| 6,240,514 | B1 | 5/2001 | Inoue et al. |
| 6,243,753 | B1 | 6/2001 | Machin et al. |
| 6,249,818 | B1 | 6/2001 | Sharma |
| 6,256,739 | B1 | 7/2001 | Skopp et al. |
| 6,266,418 | B1 | 7/2001 | Carter et al. |
| 6,269,402 | B1 | 7/2001 | Lin et al. |
| 6,289,461 | B1 | 9/2001 | Dixon |
| 6,308,281 | B1 | 10/2001 | Hall, Jr. et al. |
| 6,336,135 | B1 | 1/2002 | Niblett et al. |
| 6,349,337 | B1 | 2/2002 | Parson et al. |
| 6,360,265 | B1 | 3/2002 | Falck et al. |
| 6,415,329 | B1 | 7/2002 | Gelman et al. |
| 6,418,324 | B1 | 7/2002 | Doviak et al. |
| 6,421,768 | B1 | 7/2002 | Purpura |
| 6,449,651 | B1 | 9/2002 | Dorfman et al. |
| 6,484,206 | B2 * | 11/2002 | Crump et al. ............... 709/227 |
| 6,487,690 | B1 | 11/2002 | Schuster et al. |
| 6,496,520 | B1 | 12/2002 | Acosta |
| 6,502,144 | B1 | 12/2002 | Accarie |
| 6,505,241 | B2 | 1/2003 | Pitts |
| 6,546,425 | B1 | 4/2003 | Hanson et al. |
| 6,560,650 | B1 | 5/2003 | Imai |
| 6,564,320 | B1 | 5/2003 | de Silva et al. |
| 6,574,239 | B1 | 6/2003 | Dowling et al. |
| 6,605,241 | B2 | 8/2003 | Asakawa et al. |
| 6,606,708 | B1 | 8/2003 | Shoulberg et al. |
| 6,609,198 | B1 | 8/2003 | Wood et al. |
| 6,611,522 | B1 | 8/2003 | Zheng et al. |
| 6,671,729 | B1 | 12/2003 | Gordon et al. |
| 6,681,017 | B1 | 1/2004 | Matias et al. |
| 6,691,232 | B1 | 2/2004 | Wood et al. |
| 6,697,377 | B1 | 2/2004 | Ju et al. |
| 6,714,536 | B1 | 3/2004 | Dowling |
| 6,725,376 | B1 | 4/2004 | Sasmazel et al. |
| 6,826,696 | B1 | 11/2004 | Chawla et al. |
| 6,832,260 | B2 | 12/2004 | Brabson et al. |
| 6,845,387 | B1 | 1/2005 | Prestas et al. |
| 6,857,071 | B1 | 2/2005 | Nakae |
| 6,874,086 | B1 | 3/2005 | Gu et al. |
| 6,993,652 | B2 | 1/2006 | Medvinsky |
| 6,996,631 | B1 | 2/2006 | Aiken et al. |
| 7,010,300 | B1 * | 3/2006 | Jones et al. ............... 455/439 |
| 7,340,772 | B2 * | 3/2008 | Panasyuk et al. ............... 726/15 |
| 2001/0037464 | A1 | 11/2001 | Persels |
| 2001/0056547 | A1 | 12/2001 | Dixon |
| 2002/0010866 | A1 | 1/2002 | McCullough et al. |
| 2002/0029340 | A1 | 3/2002 | Pensak et al. |
| 2002/0035699 | A1 | 3/2002 | Crosbie |
| 2002/0098840 | A1 | 7/2002 | Hanson et al. |
| 2002/0115407 | A1 | 8/2002 | Thompson et al. |
| 2002/0116642 | A1 | 8/2002 | Joshi et al. |
| 2002/0142774 | A1 | 10/2002 | Saint-Hilaire et al. |
| 2002/0164952 | A1 | 11/2002 | Singhal et al. |
| 2002/0165990 | A1 | 11/2002 | Singhal et al. |
| 2002/0178211 | A1 | 11/2002 | Singhal et al. |
| 2003/0018913 | A1 | 1/2003 | Brezak et al. |
| 2003/0043844 | A1 | 3/2003 | Heller |
| 2003/0069803 | A1 | 4/2003 | Pollitt |
| 2003/0078983 | A1 | 4/2003 | Sullivan et al. |
| 2003/0078985 | A1 | 4/2003 | Holbrook et al. |
| 2003/0093691 | A1 | 5/2003 | Simon et al. |
| 2003/0117992 | A1 | 6/2003 | Kim et al. |
| 2003/0120811 | A1 | 6/2003 | Hanson et al. |
| 2003/0233554 | A1 | 12/2003 | Litai et al. |
| 2004/0258003 | A1 | 12/2004 | Kokot et al. |
| 2005/0144186 | A1 | 6/2005 | Hesselink et al. |
| 2005/0149481 | A1 | 7/2005 | Hesselink et al. |
| 2005/0220086 | A1 | 10/2005 | Dowling |
| 2005/0246445 | A1 * | 11/2005 | Panasyuk et al. ............... 709/227 |
| 2005/0286466 | A1 * | 12/2005 | Tagg et al. ............... 370/329 |
| 2007/0130334 | A1 * | 6/2007 | Carley ............... 709/224 |

FOREIGN PATENT DOCUMENTS

| | | |
|---|---|---|
| EP | 0 483 547 A1 | 5/1992 |
| EP | 0 483 551 A2 | 5/1992 |
| EP | 0 643 514 A2 | 3/1995 |
| EP | 0 679 980 A1 | 11/1995 |
| EP | 0 734 144 A2 | 9/1996 |
| EP | 0 851 628 A1 | 7/1998 |
| EP | 0 575 765 B1 | 10/1999 |
| EP | 1 351 467 A2 | 10/2003 |
| GB | 2 168 831 A | 6/1986 |
| JP | 2000-125029 A | 4/2000 |
| WO | WO 92/19059 A1 | 10/1992 |
| WO | WO 94/14114 | 6/1994 |
| WO | WO 94/28670 | 12/1994 |
| WO | WO 97/18635 | 5/1997 |
| WO | WO 98/52344 | 11/1998 |
| WO | WO 99/66675 | 12/1999 |
| WO | WO 99/66762 | 12/1999 |
| WO | WO 00/72506 A1 | 11/2000 |
| WO | WO 02/23362 A1 | 3/2002 |

OTHER PUBLICATIONS

Alexander, S. et al. "DHCP Options and BOOTP Vender Extensions." retrieved from the internet at http://www.ietf.org/rfc/rfc2132.txt?number=2132, 29 pp., Mar. 1997.

Bakre, A. et al. "I-TCP: Indirect TCP for Mobile Hosts." Document DCS-TR-314, pp. 1-18, Rutgers University, Piscataway, New Jersey, Oct. 1994.

Berners-Lee, T. et al. "Hyptertect transfer protocol—HTTP/1.0" downloaded from the internet at http://www.w3.org/Protocols/rfc1945/rfc1945, pp. 1-60, May 1996.

Datability Software Systems, Inc. "Proposal Presented to Digital Equipment Corporation Large System Group", Marlboro, Massachusetts Jul. 7, 1983. 13 pp., 1983.

Droms, R. "Dynamic Host Configuration Protocol" retrieved from the internet at http://www.ietf.org/rfc/rfc2131.txt, 38 pp., 1997.

Information Sciences Institute "Transmission Control Protocol: DARPA Internet Program Protocol Specification." 85 pp., 1981. University of Southern California, Marina Del Ray, CA.

International Business Machines Corporation "ARTour." 4 pp., 1995.

International Search Report to PCT/US2004/033334 (Jan. 5, 2005) 7 pages.

International Search Report to PCT/US2004/033794 (Jan. 20, 2005) 8 pages.

International Search Report to PCT/US2004/033333 (Jan. 17, 2005) 7 pages.

Ioannidis, J. et al. "IP-based protocols for mobile internetworking" In Proceedings of the ACM SIGCOMM Symposium on Communications, Architectures and Protocols, pp. 235-245, Sep. 1991.

Ioannidis, J. et al. "Protocols for supporting mobile IP hosts." Internet Draft, retrieval address unknown, 48 pp., Jun. 1992.

Ioannidis, J. et al. "The Design and Implementation of a Mobile Internetworking Architecture." 1993 Winter USENIX, Jan. 1993.

Kiiskinen, J. et al. "Data channel service for wireless telephone links." Publication C-1996-1, pp. 1-17, University of Helsinki, Department of Computer Science, Helsinki, 1996.

Kojo, M. et al. "Connecting mobile workstations to the internet over a digital cellular telephone network." Publication C-1994-39, pp. 1-16, University of Helsinki, Department of Computer Science, Helsinki, 1994.

Kojo, M. et al. "Enhanced communication services for mobile TCP/IP networking." Publication C-1995-15, pp. 1-22, University of Helsinki, Department of Computer Science, Helsinki, 1995.

Laamanen, H. "An experiment of dependability and performance of GSM access to fixed data network." Publication C-1995-41, pp. 1-21, University of Helsinki, Department of Computer Science, Helsinki, 1995.

Liljeberg, M. et al. "Enhanced services for world-wide web in mobile WAN environment." Publication C-1996-28, pp. 1-12, University of Helsinki, Department of Computer Science, Helsinki, 1996.

Liljeberg, M. et al. "Optimizing world-wide web for weakly connected mobile workstations: an indirect approach." 8pp., in Proc. 2nd International Workshop on Services in Distributed and Networked Environments (SDNE), Whistler Canada, Jun. 1995.

M3I Systems, Inc. "M3i RadioLink (management through instant interactive information): Overview." 7pp., 1995.

Maltz, D. et al. "MSOCKS: an architecture for transport layer mobility.", 9 pp. in Proceedings of the IEEE INFOCOM '98, 1998.

Milligan, T. "iiif, The Integrated Interactive Intermedia Facility Design Report—CAVECAT Revision1.2.2", 22 pp. Dynamic Graphics Project, University of Toronto, Toronto, 1991.

Montenegro, G. "Reverse Tunneling for Mobile IP," draft-ietf-mobileip-tunnel-reverse-00.txt, 15pp., retrieved from the internet at hegel.ittc.ukans.edu/topics/internet/internet-drafts/draft-i/draft-ietf-mobileip-firewall-trav-00.txt, Jan. 1997.

NetMotion Wireless "Netmotion wireless product documentation." 3 pp., retrieved from the internet at http://www.netmotionwireless.com/support/manuals, 2002.

Nodes Group "MOWGLI: Mobile Office Workstations using GSM Links" 3 pp., retrieved from the internet at http://www.cs.helsinki.fi/research/mowgli/ , 2000.

PADCom, Inc. "Connectivity Suite Technical Overview." pp. i-ii, 1-40, Padcom, Inc., Bethlehem, PA, 2001.

Pankoke-Babatz, U. "1984/1988 X.400 recommendations—user requirements." Computer Communications 13(10):595-610, 1990.

Perkins, C.E. "Mobile networking through mobile IP." 15 pp., retrieved from the internet at www.computer.org/internet/v2n1/perkins.htm , Internet Computing Online, 1997.

Perkins, C.E. et al. "DHCP for mobile networking with TCP/IP." IEEE Symposium on Computers and Communications, p. 255-61, +1995.

Piscitello, D. et al. "Mobile Network Computing Protocol (MNCP)", 28 pp., retrieved from the internet at http://www.watersprings.org/pub/id/draft-piscitello-mncp-00.txt, 1997.

Postel, J., et al. "File Transfer Protocol (FTP)" IETF RFC 765, Oct. 1985.

Sun Microsystems, Inc. "RPC: Remote Procedure Call Protocol Specification Version 2" IETF RFC 1050, Jun. 1988.

TEKnique "Optimized TCP/IP over wireless" 5 pp. [publication date unknown].

TEKnique "TransNet II Wireless Gateway Services" 2 pp. [publication date unknown].

TEKnique "Transnet II: Wireless gateway." 3 pp., [publication date unknown].

TEKnique "TransRMail" 2pp. [publication date unknown].

TEKnique "TX1000" 2 pp., 1994.

TEKnique "TX2000" 2 pp. [publication date unknown].

TEKnique "TX5000" 2 pp., 1994.

Teraoka, F. et al. "A Network Architecture Providing Host Migration Transparency." In Proceedings of the ACM SIGCOMM Symposium on Communications, Architectures and Protocols, pp. 209-220, Sep. 1991.

Weiser, M. "Some computer science issues in ubiquitous computing" pp. 75-85 Communications of the ACM, Jul. 1993.

WRQ, Inc. "AtGuard Getting Started Guide." 6 pp. retrieved from the internet at http://www.atguard.com/help/docs/guide.html [publication date unknown].

WRQ, Inc. "Glossary." 8pp. retrieved from the internet at http://www.atguard.com/product_info/features.html [publication date unknown].

WRQ, Inc. "Tour of AtGuard's features." 8pp. retreived from the internet at http://www.atguard.com/product_info/features.html [publication date unknown].

WRQ, Inc. "WRQ licenses AtGuard to Symantec and ASCII Network Technology." 1 p. retrieved from the internet at http://www.atguard.com/press_area/Welcome.html, 1999.

Written Opinion of the International Searching Authority to PCT/US2004/033334 (Oct. 8, 2004) 5 pages.

Written Opinion of the International Searching Authority to PCT/US2004/0033794 (Oct. 12, 2004) 6 pages.

Written Opinion of the International Searching Authority to PCT/US2004/033333 (Oct. 8, 2004) 7 pages.

"Network Neighborhood" http://www.internet.com, © 1999, internet.com.

Allison, et al. "File System Security: Secure Network Data Sharing for NT and UNIX" Network Appliance, Inc., Tecj Library, Jan. 16, 1998 pp. 1-16 (double-sided).

B. Clifford Neuman, "Proxy-Based Authorization and Accounting for Distributed Systems" © IEEE, May 25, 1993, pp. 283-291.

Charles Seife, "Algorithmic Gladiators Vie for Digital Glory" www.sciencemag.org, Science, vol. 288, May 19, 2000, pp. 1161 & 1163.

Dave Otway and Owen Rees, "Efficient and Timely Mutual Authentication" the ANSA Project, 24 Hills Road, Cambridge CB21JP United Kingdom, pp. 8-10.

Howard Millman, "Give Your Computer the Finger" Computerworld, Mar. 27, 2000.

IBM: "IBM Operating System/2 Version 1.2 Profile Validation Hooks" pp. 1-26, Nov. 22, 1989.

International Search Report for PCT/US02/18295 (6 pages).

International Search Report for PCT/US03/05475 (4 pages).

Lawrence C. Paulson, "Mechanized Proofs for a Recursive Authentication Protocol" Computer Laboratory, University of Cambridge, Pembroke Street, Cambridge CB2 3QG, England, pp 84-94.

Li Gong, "Using One-Way Functions for Authentication" University of Cambridge Computer Laboratory, Cambridge CB2 3QG, England Jul. 1989, pp. 8-11.

Mark Nicholson, "How to hold mobile users to account" Financial Times, Tuesday, May 2, 2000.

N.F. Maxemchuk, S. Low, "The Use of Communications Networks To Increase Personal Privacy" from IEEE INFOCOM '95, Proceedings, vol. 2, Apr. 2-6, 1995, pp. 504-512.

P.Y.A. Ryan, S.A. Schneider, "An attack on a recursive authentication protocol; A cautionary tale" Information Processing Letters 65, 1998 Elsevier, B.V., pp. 7-10.

Russel Kay, "Authentication" Computerworls, Mar. 27, 2000, pp. 77-79.

Tom Yager, "OS Paradise" BYTE, Nov. 1995.

Tony Savvas, "Handset giants launch security system" www.computerweekly.com.

Win95 Tutorial: Index of Topics, http://orion.valencia.cc.fl.us/tutprials/Win95demo.net.html, printed Dec. 27, 1999, 2 pages.

Written Opinion of the International Searching Authority to PCT/US02/018295 (Aug. 23, 2003), 5 pages.

* cited by examiner

SYSTEMS AND METHODS FOR MAINTAINING A SESSION BETWEEN A CLIENT AND HOST SERVICE

RELATED APPLICATIONS

This present application is a divisional application of and claims priority to U.S. patent application Ser. No. 10/711,646 entitled "Automatically Reconnecting A Client Across Reliable And Persistent Communication Sessions" filed Sep. 29, 2004, which is a continuation-in-part of and claims priority to U.S. patent application Ser. No. 09/880,268 entitled "Method and Apparatus for Transmitting Authentication Credentials of a User Across Communication Sessions" filed Jun. 13, 2001, and U.S. patent application Ser. No. 10/683,881, entitled "Encapsulating Protocol for Session Persistence and Reliability" filed Oct. 10, 2003, all of which are incorporated herein by reference.

TECHNICAL FIELD

The invention generally relates to network and client-server communications. More particularly, the invention relates to systems and methods for re-establishing client communications using a communication protocol that encapsulates other protocols to provide session persistence and reliability and for facilitating the reauthentication of a user using a client computer to communicate with a server computer via the encapsulating protocol.

BACKGROUND INFORMATION

Communications over a network between two computers, for example a client and a server, can be implemented using a variety of known communication protocols. Often, however, the network connection is susceptible to breakdown. For instance, a wireless connection between a client and a server is often unreliable. In other cases, the network connection is often intermittent. As such, a connection can be lost when one enters an elevator or tunnel and may only be restored following one's exit from the elevator or tunnel.

If an established communication session between the client and the server computer abnormally terminates, the client generally has to re-establish the connection by starting a new communication session. To begin the new communication session, the user typically has to retransmit the authentication credentials, such as a login/password pair, to the server computer so that the server computer can authorize the user for the new communication session. This retransmission of the authentication credentials of a user across multiple communication sessions repeatedly exposes the authentication credentials of that user to potential attackers, thereby decreasing the level of security of the authentication credentials. In addition, this often is a slow process that also results in user frustration and inefficiency. Furthermore, in establishing a new communication session, the network may require the client obtains a new network identifier, such as an internet protocol address. The applications or programs on the client may need to be restarted because of the change in the client's network identifier. Thus, it is desirable to provide a technique for automatically re-authenticating a client when a communication session between a client computer and a server computer is re-established without requiring repeated transmission of the client's authentication credentials or restarting of programs.

Improved systems and methods are needed for re-establishing a communication session between a client computer and a server computer without repeatedly transmitting the authentication credentials.

SUMMARY OF THE INVENTION

The present invention relates to systems and methods for providing a client with a persistent and reliable connection to a host service and for reconnecting the client to the persistent and reliable connection. Reconnecting the client includes re-establishing the client's communication session with the host service and re-authenticating the user of the client to the host service. A persistent and reliable connection to a host service is maintained by a first protocol service on behalf of a client. The first protocol service ensures that data communicated between the client and the host service is buffered and maintained during any disruption in the network connection with the client and the first protocol service. For example, a temporary disruption in a network connection may occur when a client, such as a mobile client, roams between different access points in the same network, or when a client switches between networks (e.g., from a wired network to a wireless network). When roaming between different access points, the client may need to be assigned a different network identifier, such as an internet protocol address, as required by the network topology. In addition to maintaining buffered data during a network disruption, the first protocol service re-authenticates the client to the host service when re-establishing the client's connection to the first protocol service. After re-authenticating, the first protocol service re-links the client's connection to the host service. This prevents the user of the client from re-entering authentication credentials to re-establish its connection with the host service. Furthermore, the first protocol service will automatically manage changes to the client's network identifier that may need to occur after a network disruption. This prevents the user from restarting any applications or programs that would customarily need to be restarted when the client's assigned network identifier changes. The user can selflessly continue using the client as the user roams between network access points without interruption from changes by the network to the client's assigned network identifier. In summary, the present invention provides automatic reconnection of a disrupted client connection to a host service without restarting applications or re-establishing sessions, including re-authentication without the user reentering authentication credentials.

In one aspect, the invention relates to a method for maintaining a session between a client and a host service. The method includes providing, by a first protocol service, a first connection between a client and the first protocol service, and a second connection between the first protocol service and a first server The method establishes a user session via a second protocol between an application of the client and a host service via the first connection and the second connection. The client communicates to the first protocol service via the second protocol encapsulated in a first protocol, and the first protocol service communicates to the host service using the second protocol. The method includes detecting, by the first protocol service, a disruption in the first connection interrupting the user session. While maintaining the second connection and user session related information, the client or the first protocol service re-establishes the disrupted first connection via the first protocol, and the user session is continued between the application of the client and the host service via the second protocol.

In one embodiment of the present invention, the method includes communicating, by the client, to the host service using a network identifier assigned by a computing device to the client, and the host service communicating to the client using the network identifier. The computing device includes a server, a network device, or a Dynamic Host Configuration Protocol server. In another embodiment, the method includes re-establishing, by the client or the first protocol service, the disrupted first connection without re-opening or closing the user session associated with the second protocol.

In some embodiments, the method includes maintaining, by the first protocol service or the server, the second connection via the second protocol used by the application for the user session. In other embodiments, the first connection may be re-established using the same protocol used by the application of the client to communicate with one of the first protocol service or the server. The second protocol may include a remote display protocol, such as the Independent Computing Architecture protocol or the Remote Desktop Protocol. In one embodiment, the method includes the host service executing an application program on behalf of the client, and transmitting display output generated by the application program to the client. In a further embodiment, the method encrypts communications via the second protocol, such as the display output generated by the application program.

In an additional embodiment, the method of the present invention re-establishes the user session by using a ticket associated with the client. The method may authenticate the client via the ticket to re-establish the disrupted first connection. In some embodiments, the first protocol comprises an application-layer transport protocol, and the first protocol service comprises a tunneling or an application-level proxy.

In at least one embodiment, the method re-establishes the disrupted first connection transparently to at least one of the following: 1) a transport driver interface and at least a presentation layer of a network communication stack, 2) the second protocol, 3) a user of the client, and 4) an application executing on the client. The method may also re-establish the disrupted first connection transparently to the application of the client by a client agent corresponding to the application. In some embodiments, the method includes re-establishing the disrupted first connection without manipulating a transport driver interface, or intercepting a communication at the transport driver interface. In yet further embodiments, the client may be a mobile client or a non-mobile client.

In another aspect, the present invention relates to a system for maintaining a session between a client and a host service. The system includes a means for providing a first connection between a client and the first protocol service, and a second connection between the first protocol service and a first server. The system also includes a means for establishing a user session via a second protocol between an application of the client and a host service via the first connection and the second connection. The client communicates to the first protocol service via the second protocol encapsulated in a first protocol, and the first protocol service communicates to the host service using the second protocol. The system also includes a means for detecting a disruption in the first connection interrupting the user session, and a means for re-establishing the disrupted first connection via the first protocol while maintaining the second connection and user session related information. The user session is continued between the application of the client and the host service via the second protocol.

In another embodiment, the system includes a means for communicating, by the client, to the host service using a network identifier assigned by a computing device to the client, and the host service communicating to the client using the network identifier. The computing device may include a server, a network device, or a Dynamic Host Configuration Protocol server.

In a further embodiment, the system includes a means for re-establishing the disrupted first connection without re-opening or closing the user session associated with the second protocol. The system may include a means for maintaining, by the first protocol service or the server, the second connection via the second protocol used by the application for the user session. Additionally, the system may include a means for re-establishing the first connection using the same protocol used by the application of the client to communicate with one of the first protocol service or the server. The second protocol may be a remote display protocol, such as the Independent Computing Architecture protocol or the Remote Desktop Protocol. In some embodiments, the system includes a means for the host service to execute an application program on behalf of the client, and transmit display output generated by the application program to the client. The system may also encrypt communications via the second protocol, such as display output generated by the application program.

In one embodiment, the system includes a means for re-establishing the user session by using a ticket associated with the client. The system may authenticate the client via the ticket to re-establish the disrupted first connection. In some embodiments, the first protocol includes an application-layer transport protocol, and in further embodiments, the first protocol service includes a tunneling or an application-level proxy.

In some embodiments, the system includes a means for re-establishing the disrupted first connection transparently to at least one of the following: 1) a transport driver interface and at least a presentation layer of a network communication stack, 2) the second protocol, 3) a user of the client, and 4) an application executing on the client. The system may also re-establish the disrupted first connection transparently to the application of the client by a client agent corresponding to the application. In other embodiments, the system includes a means for re-establishing the disrupted first connection without manipulating a transport driver interface, or intercepting a communication at the transport driver interface. In yet additional embodiments, the client may be a mobile or a non-mobile client.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DESCRIPTION

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

Figure 1A:
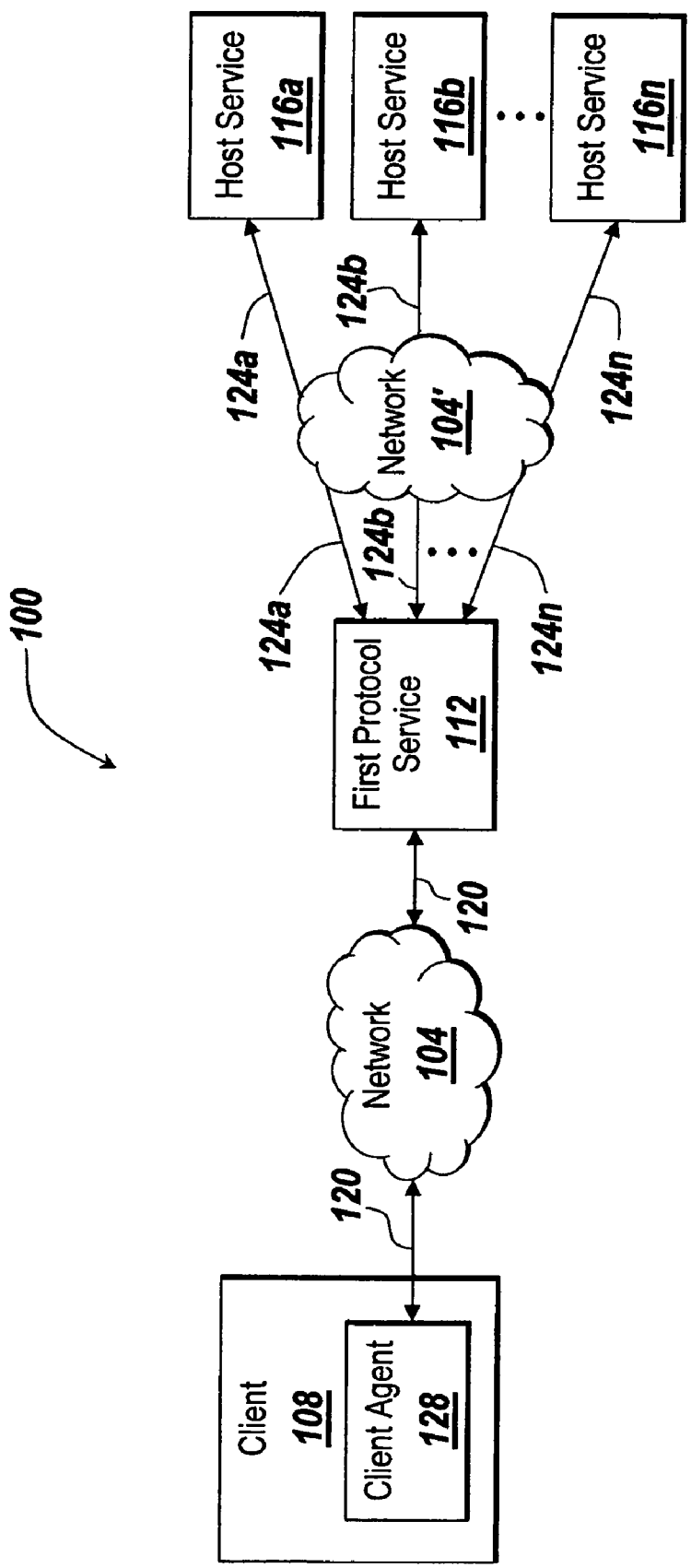
FIG. 1A is a block diagram of a system for providing a client with a reliable connection to a host service according to an illustrative embodiment of the invention.

Referring to FIG. 1A, in general, the invention pertains to network communications and can be particularly useful for providing a client with a reliable connection to a host service. In a broad overview, a system 100 for network communications includes a client 108 (e.g., a first computing device) in communication with a first protocol service 112 (e.g., a second computing device) over a network 104. Also included in the system 100 are a plurality of host services 116a-116n (e.g., third computing devices) that are in communication, over a network 104', with the first protocol service 112 and, through the first protocol service 112 and over the network 104, with the client 108. Alternatively, in another illustrative embodiment of the invention, and with reference now to FIG. 1B, the first protocol service 112 and the host services 116a-116n are not implemented as separate computing devices, as shown in FIG. 1A, but, rather, they are incorporated into the same computing device, such as, for example, host node 118a. The system 100 can include one, two, or any number of host nodes 118a-118n.

Figure 1B:
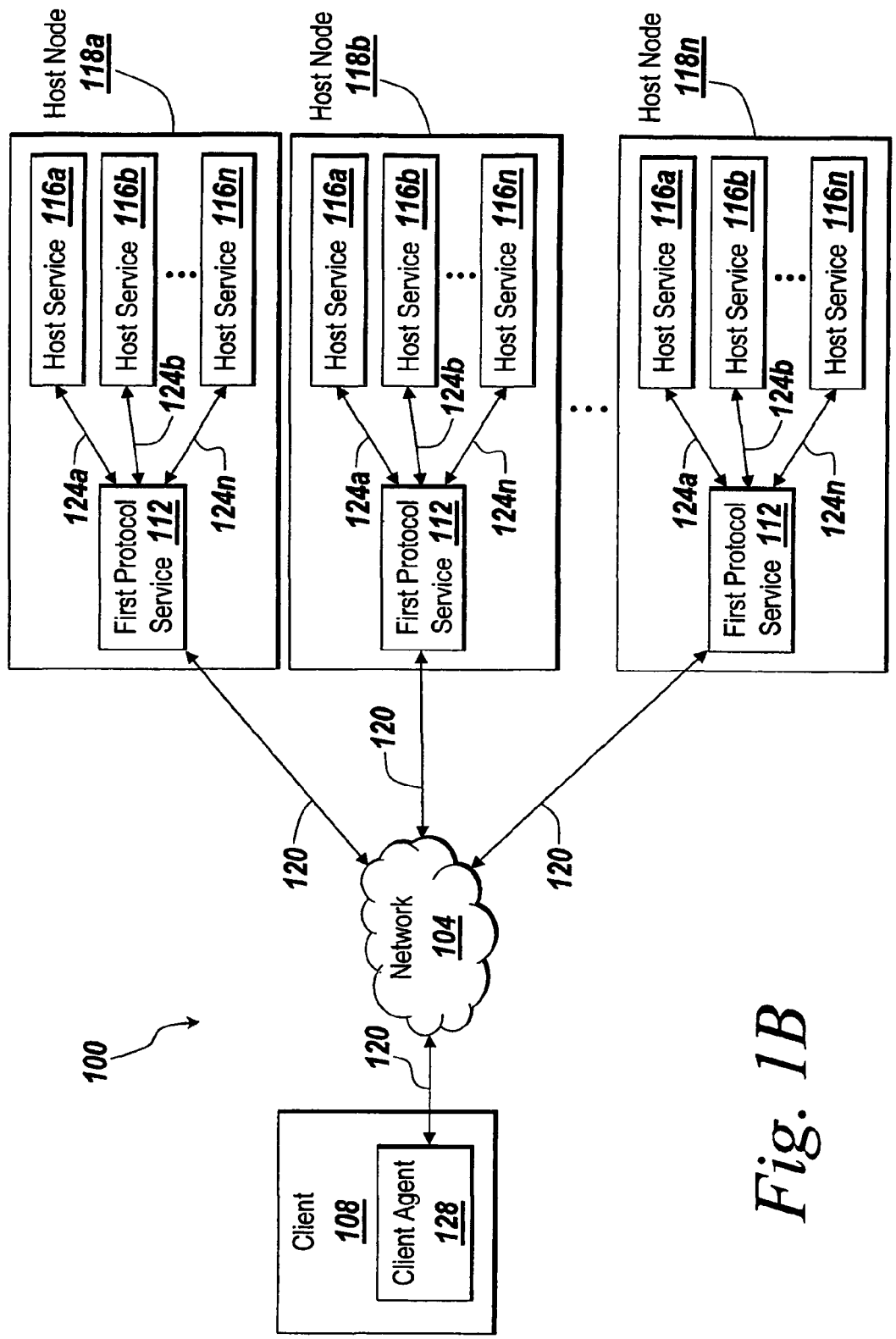
FIG. 1B is a block diagram of a system for providing a client with a reliable connection to a host service according to another illustrative embodiment of the invention.

In one embodiment, the networks 104 and 104' are separate networks, as in FIG. 1A. The networks 104 and 104 can be the same network 104, as shown in FIG. 1B. In one embodiment, the network 104 and/or the network 104' is, for example, a local-area network (LAN), such as a company Intranet, or a wide area network (WAN), such as the Internet or the World Wide Web. The client 108, the first protocol service 112, the host services 116a-116n, and/or the host nodes 118a-118n can be connected to the networks 104 and/or 104' through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above.

Moreover, the client 108 can be any workstation, desktop computer, laptop, handheld computer, mobile telephone, or other form of computing or telecommunications device that is capable of communication and that has sufficient processor power and memory capacity to perform the operations described herein. Additionally, the client 108 can be a local desktop client on a local network 104 or can be a remote display client of a separate network 104. The client 108 can include, for example, a visual display device (e.g., a computer monitor), a data entry device (e.g., a keyboard), persistent and/or volatile storage (e.g., computer memory), a processor, and a mouse. An example of a client agent 128 with a user interface is a Web Browser (e.g. a Microsoft® Internet Explorer browser and/or Netscape™ browser).

Similarly, with reference to FIG. 1A, each of the first protocol service 112 and the host services 116a-116n can be provided on any computing device that is capable of communication and that has sufficient processor power and memory capacity to perform the operations described herein. Alternatively, where the functionality of the first protocol service 112 and the host services 116a-116n are incorporated into the same computing device, such as, for example, one of the host nodes 118a-118n, as in FIG. 1B, the first protocol service 112 and/or the host services 116a-116n can be implemented as a software program running on a general purpose computer and/or as a special purpose hardware device, such as, for example, an ASIC or an FPGA.

Similar to the client 108, each of the host nodes 118a-118n can be any computing device described above (e.g. a personal computer) that is capable of communication and that has sufficient processor power and memory capacity to perform the operations described herein. Each of the host nodes 118a-118n can establish communication over the communication channels 124a-124n using a variety of communication protocols (e.g., ICA, HTTP, TCP/IP, and IPX). SPX, NetBIOS, Ethernet, RS232, and direct asynchronous connections).

In one embodiment, each of the host services 116a-116n hosts one or more application programs that are remotely available to the client 108. The same application program can be hosted by one or any number of the host services 116a-116n. Examples of such applications include word processing programs, such as MICROSOFT WORD, and spreadsheet programs, such as MICROSOFT EXCEL, both of which are available from Microsoft Corporation of Redmond, Wash. Other examples of application programs that may be hosted by any or all of the host services 116a-116n include financial reporting programs, customer registration programs, programs providing technical support information, customer database applications, and application set managers. Moreover, in one embodiment, one or more of the host services 116a-116n is an audio/video streaming server that provides streaming audio and/or streaming video to the client 108. In another embodiment, the host services 116a-116n include file servers that provide any/all file types to the client 108.

Referring still to the illustrative embodiments of FIGS. 1A and 1B, the client 108 is configured to establish a connection 120 between the client 108 and a first protocol service 112 over the network 104 using a first protocol. For its part, the first protocol service 112 is configured to accept the connection 120. The client 108 and the first protocol service 112 can, therefore, communicate with one another using the first protocol as described below in reference to FIGS. 2A-2B and FIG. 3.

In some embodiments, as shown in FIGS. 1A and 1B, a client agent 128 is included within the client 108. The client agent 128 can be, for example, implemented as a software program and/or as a hardware device, such as, for example, an ASIC or an FPGA. The client agent 128 can use any type of protocol and it can be, for example, an HTTP client agent, an FTP client agent, an Oscar client agent, a Telnet client agent, an Independent Computing Architecture (ICA) client agent from Citrix Systems, Inc. of Fort Lauderdale, Fla., or a Remote Desktop Procedure (RDP) client agent from Microsoft Corporation of Redmond, Wash. In some embodiments, the client agent 128 is itself configured to communicate using the first protocol. In some embodiments (not shown), the client 108 includes a plurality of client agents 128a-128n, each of which communicates with a host service 116a-116n, respectively.

In another embodiment, a standalone client agent is configured to enable the client 108 to communicate using the first protocol. The standalone client agent can be incorporated within the client 108 or, alternatively, the standalone client agent can be separate from the client 108. The standalone client agent is, for example, a local host proxy. In general, the standalone client agent can implement any of the functions described herein with respect to the client agent 128.

As also described further below, the first protocol service 112 is, in one embodiment, itself configured to communicate using the first protocol. The first protocol service 112 is configured to establish a connection 124a-124n between the first protocol service 112 and the host service 116a-116n, respectively. For example, the first protocol service 112 can establish a connection 124a between the first protocol service 112 and one host service 116a and a connection 124b between the first protocol service 112 and another host service 116b. In one embodiment, the first protocol service 108 separately establishes such connections 124a-124n (i.e., the first protocol service 112 establishes one connection at a time). In another embodiment, the first protocol service 112 simultaneously establishes two or more of such connections 124a-124n.

In yet another embodiment, the first protocol service 112 can concurrently establish and maintain multiple connections 124a-124n. The first protocol service 112 is configured to provide two or more connections 124a-124n without interrupting the connection 120 with the client 108. For example, the first protocol service 112 can be configured to establish the connection 124a between the first protocol service 112 and the host service 116a when a user of the client 108 requests execution of a first application program residing on the host service 116a. When the user ends execution of the first application program and initiates execution of a second application program residing, for example, on the host service 116b, the first protocol service 112 is, in one embodiment, configured to interrupt the connection 124a and establish the connection 124b between the first protocol service 112 and the host service 116b, without disrupting the connection 120 between the first protocol service 112 and the client 108.

The first protocol service 112 and the host services 116a-116n can communicate over the connections 124a-124n, respectively, using any one of a variety of secondary protocols, including, but not limited to, HTTP, FTP, Oscar, Telnet, the ICA remote display protocol from Citrix Systems, Inc. of Fort Lauderdale, Fla., and/or the RDP remote display protocol from Microsoft Corporation of Redmond, Wash. For example, the first protocol service 112 and the host service 116a can communicate over the connection 124a using the ICA remote display protocol, while the first protocol service 112 and the host service 116b can communicate over the connection 124b using the RDP remote display protocol.

In one embodiment, the secondary protocol used for communicating between the first protocol service 112 and a host service 116, such as, for example, the ICA remote display protocol, includes a plurality of virtual channels. A virtual channel is a session-oriented transmission connection that is used by application-layer code to issue commands for exchanging data. For example, each of the plurality of virtual channels can include a plurality of protocol packets that enable functionality at the remote client 108. In one embodiment, one of the plurality of virtual channels includes protocol packets for transmitting graphical screen commands from a host service 116, through the first protocol service 112, to the client 108, for causing the client 108 to display a graphical user interface. In another embodiment, one of the plurality of virtual channels includes protocol packets for transmitting printer commands from a host service 116, through the first protocol service 112, to the client 108, for causing a document to be printed at the client 108.

In another embodiment, the first protocol is a tunneling protocol. The first protocol service 112 encapsulates a plurality of secondary protocols, each used for communication between one of the host services 116a-116n and the first protocol service 112, within the first protocol. As such, the host services 116a-116n and the first protocol service 112 communicate with the client 108 via the plurality of secondary protocols. In one embodiment, the first protocol is, for example, an application-level transport protocol, capable of tunneling the multiple secondary protocols over a TCP/IP connection.

Figure 2A:
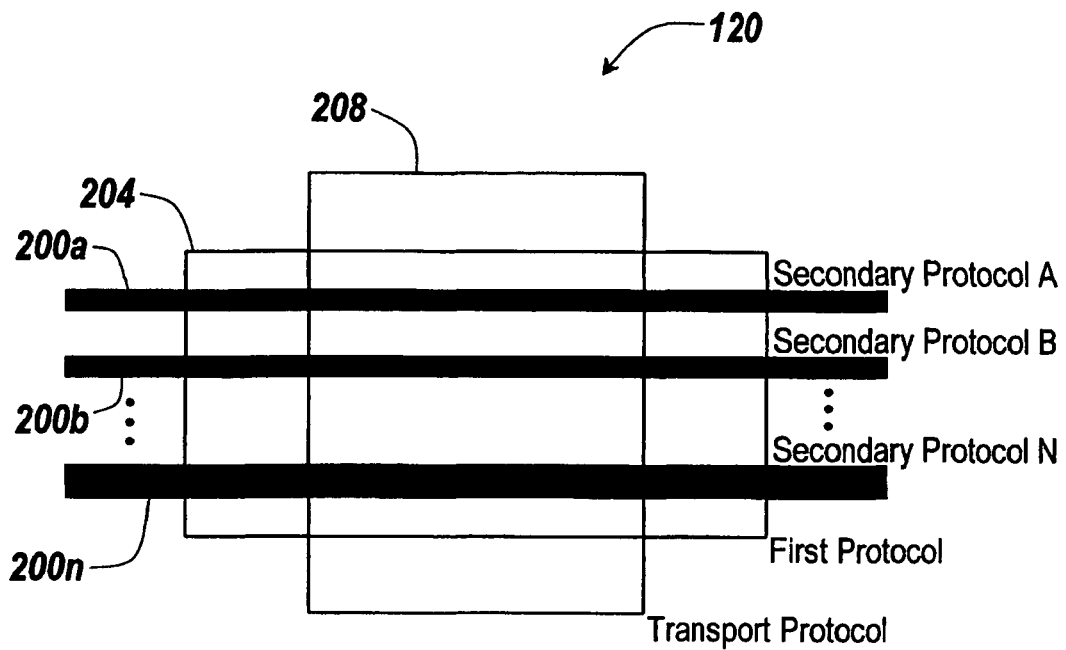
FIG. 2A depicts communications occurring over a network according to an illustrative embodiment of the invention.

Referring to FIG. 2A, communications between the client 108 and the first protocol service 112 via the connection 120 take the form of a plurality of secondary protocols 200a-200n (e.g., HTTP, FTP, Oscar, Telnet, ICA, and/or RDP) encapsulated within a first protocol 204. This is indicated by the location of secondary protocols 200a-200n inside the first protocol 204. Where secure communication is not called for, the first protocol 204 can be, as illustrated in FIG. 2A, communicated over an unsecured TCP/IP connection 208.

Figure 2B:
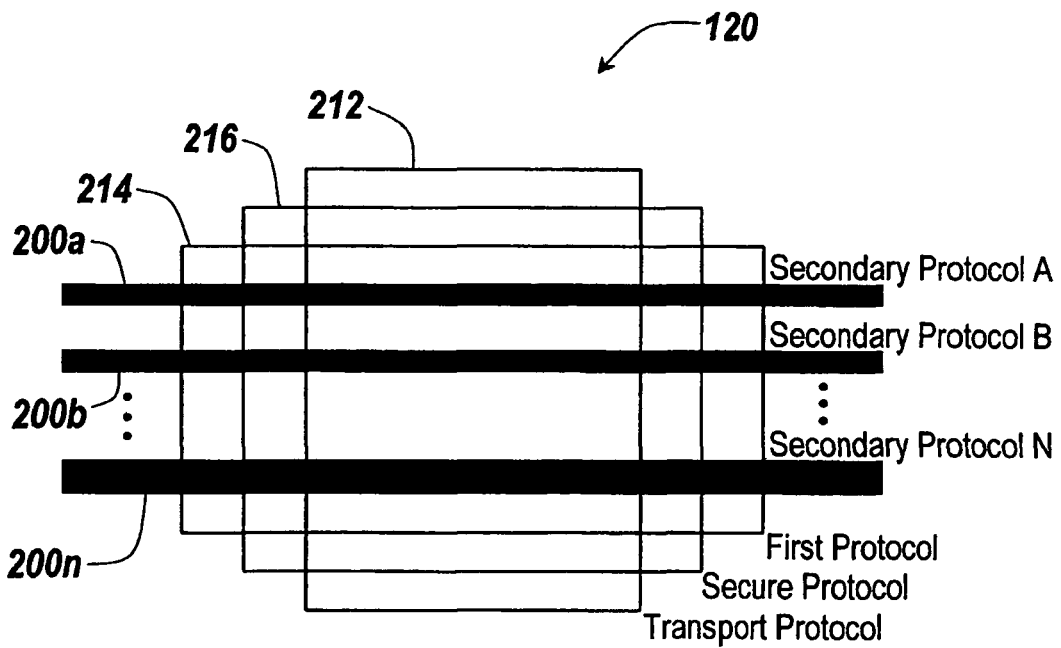
FIG. 2B depicts communications occurring over a network according to another illustrative embodiment of the invention.

Referring now to FIG. 2B, if secure communication is used, the first protocol 204 is communicated over an encrypted connection, such as, for example, a TCP/IP connection 212 secured by using a secure protocol 216 such as the Secure Socket Layer (SSL). SSL is a secure protocol first developed by Netscape Communication Corporation of Mountain View, Calif., and is now a standard promulgated by the Internet Engineering Task Force (IETF) as the Transport Layer Security (TLS) protocol and described in IETF RFC-2246.

Thus, the plurality of secondary protocols 200a-200n are communicated within the first protocol 204 with (FIG. 2B) or without (FIG. 2A) a secure protocol 216 over the connection 120. The secondary protocols that can be used to communicate over the connections 124a-124n include, but are not limited to, HTTP, FTP, Oscar, Telnet, ICA, and RDP. Moreover, in one embodiment, at least one of the secondary protocols, as described above, includes a plurality of virtual channels, each of which can include a plurality of protocol packets enabling functionality at the remote client 108. For example, in one embodiment, one host service 116a is a web server, communicating with the first protocol service 112 over the connection 124a using the HTTP protocol, and another host service 1116b is an application server, communicating with the first protocol service 112 over the connection 124b using the ICA protocol. The host service 116b generates both protocol packets for transmitting graphical screen commands to the client 108, for causing the client 108 to display a graphical user interface, and protocol packets for transmitting printer commands to the client 108, for causing a document to be printed at the client 108.

Another aspect of the present invention is the method and systems described herein reduce the number of times network connections are opened and closed. In one embodiment, the first protocol 204 allows the secondary protocol connections 200a-200n tunneled therein, such as, for example, an HTTP connection 200n, to be opened and/or closed, repetitively, without also requiring the transport connection over which the first protocol 204 is communicated (e.g., TCP connection 208 and/or 212), the secure protocol connection 216, or the first protocol connection 204 itself to similarly be repetitively opened and/or closed. Without the encapsulation of the first protocol 204, the secondary protocol 200a-200n may frequently open and close network connections, such as TCP connections. This would add significant delays and overhead to the system. These delays and overhead would be further increased by the use of a secure encapsulation protocol 214, such as SSL, which have significant overhead in establishing network connections. By encapsulating the secondary protocol 200a-200n within the first protocol 204 and maintaining the connection of the transport connection (208, 212), the secondary protocols 200a-200n, as part of the payload of the first protocol 204, do not need to perform frequent and costly open and closes of the network connection 120. Furthermore, since the secondary protocols 200a-200n can be communicated within the first protocol 204 with a secure protocol 216, the secondary protocols 200a-200n also do not need to open and close secured connections such as with SSL. The transport connection (208, 212) establishes and maintains the network connection 120 so that the encapsulated second protocols 200a-200n can be communicated without repetitively opening and closing the secured or unsecured network connection 120. This significantly increases the speed of operation in communicating the secondary protocols 200a-200n.

As described above, the secondary protocols 200a-200n carry protocol packets related to applications using such protocols as HTTP, FTP, Oscar, Telnet, RDA or ICA. The secondary protocol packets 304a-304n transport data related to the application functionality transacted between the client 108 and the host service 116a-116n. For example, a user on the client 108 may interact with a web page provided by a host service 116a-116n. In transactions between the client 108 and the host service 116a-116n, the secondary protocol 200a-200n encapsulated in the first protocol 204 may have http protocol packets related to displaying the web page and receiving any user interaction to communicate to the host service 116a-116n. Since the transport connection (208, 212) is not maintained by the secondary protocols 200a-200n, the secondary protocols 200a-200n do not need to handle any network-level connection interruptions. As such, the secondary protocols 200a-200n may not provide any network-level connection interruption information in their payloads. In the above example, the http related secondary protocol packets 304a-304n of the secondary protocol 200a-200n transmitted to the client 108 would not provide a notification that a network interruption occurred, e.g., an error message on a web page. Therefore, the user on the client 108 will not be notified of any network-level connection interrupts through the secondary protocol 200a-200n. This effectively hides the network connection interruptions from the user during the use of the applications related to the secondary protocols 200a-200n.

Figure 3:
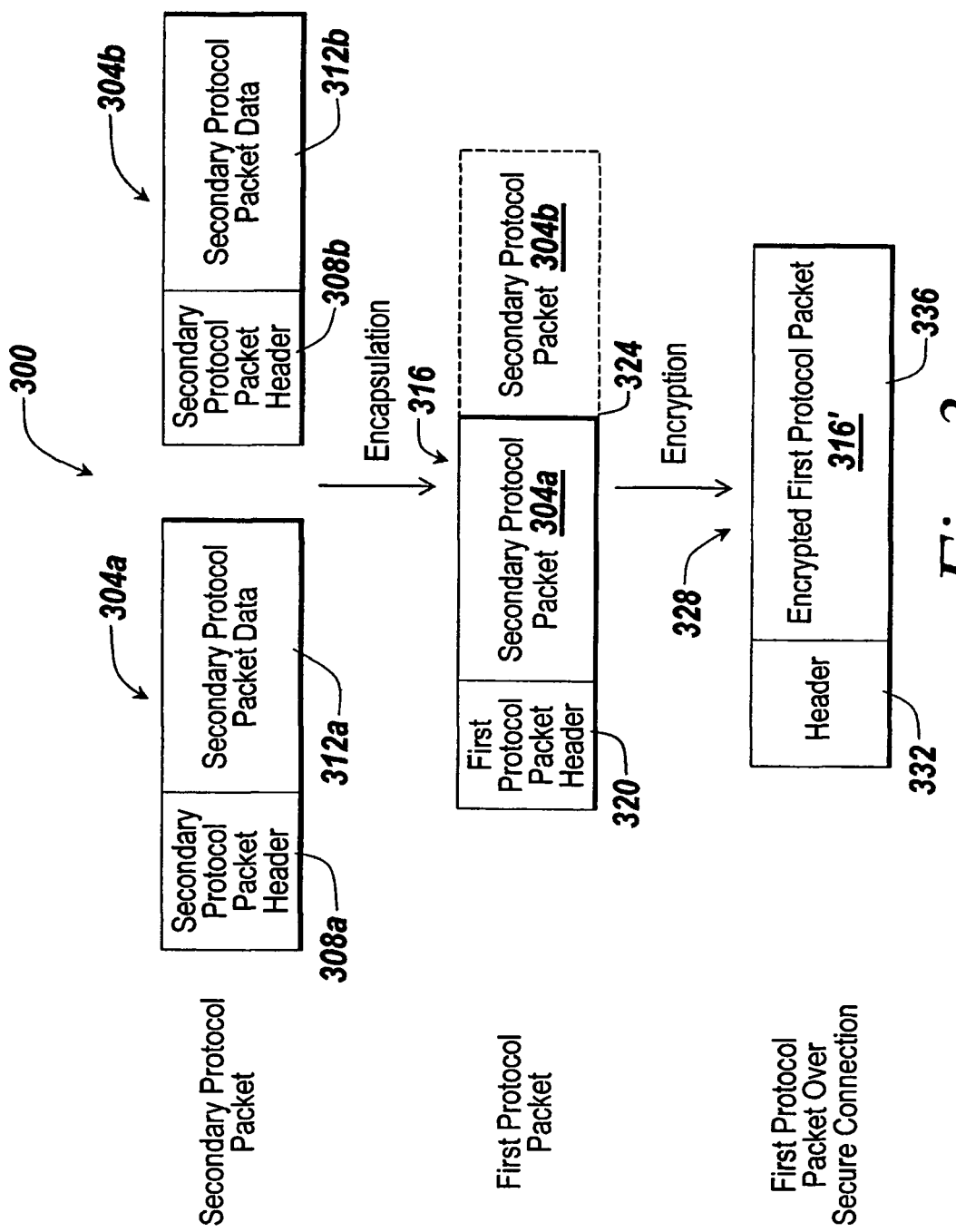
FIG. 3 depicts a process for encapsulating a plurality of secondary protocols within a first protocol for communication over a network according to an illustrative embodiment of the invention.

Referring to FIG. 3, an example process 300 used by the first protocol service 112 and the client agent 128 of the client 108 encapsulates the plurality of secondary protocols 200 (e.g., HTTP, FTP, Oscar, Telnet, ICA, and/or RDP) within the first protocol 204 for communication via the connection 120. Optionally, as described below, the example process 300 used by the first protocol service 112 and the client agent 128 of the client 108 also compresses and/or encrypts the communications at the level of the first protocol prior to communications via the connection 120. From the point of view of the first protocol service 112, secondary protocol packets 304a-304n are received via the connections 124a-124n at the first protocol service 112. For example, two secondary protocol packets 304a and 304b are received by the first protocol service 112. One, two, or any number of secondary protocol packets 304a-304n can be received. In one embodiment, the secondary protocol packets 304a-304n are transmitted by the host services 116 to the first protocol service 112 over the connection 124. The secondary protocol packets 304a-304n include a header 308 and a data packet 312, also referred to as a data payload.

Following receipt of the secondary protocol packets 304a-304n, the first protocol service 112 encapsulates one or more of the secondary protocol packets 304 within a first protocol packet 316. In one embodiment, the first protocol service 112 generates a first protocol packet header 320 and encapsulates within the data payload 324 of the first protocol packet 316 one or more secondary protocol packets 304a-304n, such as, for example, two secondary protocol packets 304a and 304b. In another embodiment, only one secondary protocol packet 304a is encapsulated in each first protocol packet 316.

In one embodiment, the first protocol packets 316 are then transmitted over the connection 120, for example over the connection 208 described with reference to FIG. 2A, to the client agent 128 of the client 108. Alternatively, in another embodiment, the first protocol service 112 is further configured to encrypt, prior to the transmission of any first protocol packets 316, communications at the level of the first protocol 204. In one such embodiment, the first protocol packets 316 are encrypted by using, for example, the SSL protocol described with reference to FIG. 2B. As a result, a secure packet 328, including a header 332 and an encrypted first protocol packet 316' as a data payload 336, is generated. The secure packet 328 can then be transmitted over the connection 120, for example over the secure TCP/IP connection 212 illustrated in FIG. 2B, to the client agent 128 of the client 108.

In another embodiment, the first protocol service 112 is further configured to compress, prior to the transmission of any first protocol packets 316, communications at the level of the first protocol 204. In one embodiment, prior to encrypting the first protocol packet 316, the first protocol service 112 compresses, using a standard compression technique, the first protocol packet 316. As such, the efficiency of the system 100 is improved.

Referring again to FIGS. 1A-1B, the system 100 of the present invention, in one embodiment, provides the remote client 108 with a persistent connection to a host service 116, such as, for example, the host service 116a. For example, if the client 108 establishes a connection 120 between the client 108 and the first protocol service 112 and the first protocol service 112 establishes a connection 124a between the first protocol service 112 and the host service 116a, then either the client agent 128, the first protocol service 112, or both are configured to maintain a queue of the first protocol data packets most recently transmitted via the connection 120. For example, the queued data packets can be maintained by the client agent 128 and/or the first protocol service 112 both before and upon a failure of the connection 120. Moreover, upon a failure of the connection 120, the first protocol service 112 and, likewise, the host service 116a are configured to maintain the connection 124a.

Following a failure of the connection 120, the client 108 establishes a new connection 120 with the first protocol service 112, without losing any data. More specifically, because the connection 124a is maintained upon a failure of the connection 120, a newly established connection 120 can be linked to the maintained connection 124a. Further, because the most recently transmitted first protocol data packets are queued, they can again be transmitted by the client 108 to the first protocol service 112 and/or by the first protocol service 112 to the client 108 over the newly established connection 120. As such, the communication session between the host service 116a and the client 108, through the first protocol service 112, is persistent and proceeds without any loss of data.

In one embodiment, the client agent 128 of the client 108 and/or the first protocol service 112 number the data packets that they transmit over the connection 120. For example, each of the client agent 128 and the first protocol service 112 separately numbers its own transmitted data packets, without regard to how the other is numbering its data packets. Moreover, the numbering of the data packets can be absolute, without any re-numbering of the data packets, i.e., the first data packet transmitted by the client agent 128 and/or the first protocol service 112 can be numbered as No. 1, with each data packet transmitted over the connection 120 by the client agent 128 and/or the first protocol service 112, respectively, consecutively numbered thereafter.

In one such embodiment, following a disrupted and re-established connection 120, the client agent 128 and/or the first protocol service 112 informs the other of the next data packet that it requires. For example, where the client agent 128 had received data packets Nos. 1-10 prior to the disruption of connection 120, the client agent 128, upon re-establishment of the connection 120, informs the first protocol service 112 that it now requires data packet No. 11. Similarly, the first protocol service 112 can also operate as such. Alternatively, in another such embodiment, the client agent 128 and/or the first protocol service 112 informs the other of the last data packet received. For example, where the client agent 128 had received data packets Nos. 1-10 prior to the disruption of connection 120, the client agent 128, upon re-establishment of the connection 120, informs the first protocol service 112 that it last received data packet No. 10. Again, the first protocol service 112 can also operate as such. In yet another embodiment, the client agent 128 and/or the first protocol service 112 informs the other, upon re-establishment of the connection 120, of both the last data packet received and the next data packet it requires.

In such embodiments, upon re-establishment of the connection 120, the client agent 128 and/or the first protocol service 112 can retransmit the buffered data packets not received by the other, allowing the communication session between a host service 116 and the client 108, through the first protocol service 112, to proceed without any loss of data. Moreover, upon re-establishment of the connection 120, the client agent 128 and/or the first protocol service 112 can flush from each of their respective buffers the buffered data packets now known to be received by the other.

By providing the client 108 with a reliable and persistent connection to a host service 116a-116n, the present invention avoids the process of opening a new user session with the host service 116a-116n by maintaining the user session through network connection interruptions. For each user session with a host service 116a-116n, the client 108 and the host service 116a-116n may maintain session specific context and caches, and other application specific mechanisms related to that instance of the user session. For each new user session established, these session specific context and caches need to be re-populated or re-established to reflect the new user session. For example, a user on the client 108 may have an http session with a host service 116a-116n. The host service 116a-116n may keep context specific to providing this instance of the http session with the client 108. The context may be stored in the memory of the server, in files of the server, a database or other component related to providing the functionality of the host service 116a-116n. Also, the client 108 may have local context specific to the instance of the http session, such as a mechanism for keeping track of an outstanding request to the host service 116a-116n. This context may be stored in memory of the client 108, in files on the client 108, or other software component interfaced with the client 108. If the connection between the client 108 and the host service 116a-116n is not persistent, then a new user session needs to be established with new session specific context on the host service 116a-116n and the client 108. The present invention maintains the session so that a new session, and therefore new specific session context, does not need to be re-established.

The present invention maintains the user session through network level connection interruptions and without notification to the user of the client that the session was interrupted. In operation of this aspect of the invention, the first protocol service 112 establishes and maintains a first connection with a client 108 and a second connection with a host service 116a-116n. Via the first connection and the second connection, a session between the client 108 and the host service 116a-116n is established. The first protocol service 112 can store and maintain any session related information such as authentication credentials, and client 108 and host service 116a-116n context for the established session. A user on the client 108 will exercise the functionality provided by the host service 116a-116n through the established session. As such, related secondary protocol packets 304a-304n will contain data related to the transaction of such functionality. These secondary protocol packets 304a-304n as part of the secondary protocol 200a-200n are encapsulated and communicated in a first protocol 204. Upon detection of a disruption in either the first connection or the second connection, the first protocol service 112 can re-establish the disrupted connection while maintaining the other connection that may have not been disrupted. The network connection disruption may cause an interruption to the session between the client 108 and the host service 116a-116n. However, since the transport mechanism is not maintained by the secondary protocols 200a-200n, the session can be re-established after the network connection is re-established without the user on the client 108 having notification that the session was interrupted. The secondary protocol 200a-200n does not need to contain any interruption related information to transmit to the client 108. Thus, the interruption of the session caused by the network connection disruption is effectively hidden from the user because of the encapsulation of the first protocol 204.

The first protocol service 112 maintaining session related information can re-establish the session between the client 108 and the host service 116a-116n. For example, if the first connection between the client 108 and the first protocol service 116 is disrupted, the first protocol service 112 can keep the client's 108 session active or open between the first protocol service 112 and the host service 116a-116n. After the first connection is re-established, the first protocol service 112 can link the session of the client 108 to the maintained session between the first protocol service 112 and the host service 116. The first protocol service 112 can send to the client 108 any data that was queued prior to the disruption in the first connection. As such, the client 108 will be using the same session prior to the disruption, and the host service 116a-116n and client 108 can continue to use any session specific context that may have in memory or stored elsewhere. Furthermore, because of the intermediary of the first protocol service 112, the host service 116a-116n may not be aware of the network disruption between the first protocol service 112 and the client 108.

In another example, if the second connection between the first protocol service 112 and the host service 116a-116n is disrupted, the first protocol service can maintain the first connection with the client 108 while re-establishing the second connection with the host service 116a-116n. After re-establishing the second connection, the first protocol service 112 can re-establish the client's session, on behalf of the client, with the host service 116a-116n. Since the first protocol service 112 was maintaining any session relation information, the first protocol service may re-establish the same session or a similar session so that the client 108 is not aware of the disruption in the second network connection and the resulting disruption to the session between the first protocol service 112 and the host service 116a-116n. During re-establishing the second network connection and the session, the first protocol service 112 can queue any session transactions sent by the client 108 during the disruption. Then, after re-establishing the session with the host service 116a-116n, the first protocol service 112 can transmit the queued transactions to the host service 116a-116n and the session can continue normally. In this manner, the client 108 continues to operate as if there was not an interruption to the session.

Additionally, by providing a reliable and persistent connection, the present invention also avoids interruptions to transactions, commands or operations as part of the functionality exercised between the client 108 and a server 415, or a host service 116a-116n. For example, a file copy operation using Windows Explorer has not been designed to continue working after there is a disruption in a network connection. A user on the client 108 may use the file copy feature of Windows Explorer to copy a file from the client 108 to a server 415. Because of the size of the file or files, this operation may take a relatively extended period of time to complete. If during the middle of the operation of the copy of the file to the server 415, there is an interruption in the network connection between the client 108 and the server 415, the file copy will fail. Once the network connection is re-established, the user will need to start another file copy operation from Windows Explorer to copy the file from the client 108 to the server 415. Under the present invention, the user would not need to start another file copy operation. The network connection would be re-established as part of the first protocol 204 connection. The file copy operations would be encapsulated in the payload of the secondary protocols 200a-200n. As such, the file copy of Windows Explorer would not get notified of the interruption in the network connection and therefore, would not fail. The first protocol service 112 would re-establish any connections and transmits any queued data so that operation can continue without failure. The first protocol service 112 would maintain a queue of the data related to the file copy operations that has not been transferred to the server 415 because of the interruption in the network connection. Once the network connection is re-established, the first protocol service 112 can transmit the queued data and then continue on with transferring the data related to the file copy operation in due course.

Although this aspect of the invention is described in terms of a file copy operation example, one ordinarily skilled in the art will recognize that any operation, transaction, command, function call, etc. transacted between the client 108 and the server 415, or host service 116a-116n, can be maintained and continued without failure from the network connection disruption, and, furthermore, without the client 108 recognizing there was a disruption or having notice of the disruption.

Furthermore, by providing a reliable and persistent connection, the present invention also enables a client 108 to traverse through different network topologies without re-starting a session or an application on the client 108. For example, the client 108 may be a computer notebook with a wireless network connection. As the client 108 moves from a first wireless network to a second wireless network, the client's network connection 120 may be temporarily disrupted from the first wireless network as a network connection is established with the second wireless network. The second wireless network may assign a new network identifier, such as a host name or internet protocol address, to the client 108. This new network identifier may be different than the network identifier assigned to the client 108 by the first wireless network. In another example, the client 108 may be physically connected through an Ethernet cable to a port on the network. The physical connection may be unplugged and the client 108 moved to another location to plug into a different port on the network. This would cause a disruption into the network connection 102 and possible a change in the assigned network identifier. Without the present invention, any sessions with a host service 116a-116n on the client 108 or application on the client 108 accessing the network may need to be restarted due to the change in the network topology, the disruption to the network connection 120, and/or the change in the assigned network identifier. By the method and systems described herein, the present invention maintains the network connection for the client and automatically re-established the client's 108 network connection including handling changes in the network topology and network identifier. The client 108, and any applications or sessions on the client 108, can continue to operate as if there was not a network connection disruption or a change in the network identifier. Furthermore, the user on the client 108 may not recognize there were any interruptions or changes, and the client 108 may not receive any notice of such interruptions.

Even with a reliable and persistent communication session as described above, network connections are still disrupted. When re-establishing the client's connection to the host service, the client 108 also needs to be re-authenticated to the host service 116. One embodiment of the invention relates to systems and methods for authenticating a client 108 to a host service 116 and re-authenticating the client 108 to the host service 116 without re-entering authentication credentials.

Figure 4:
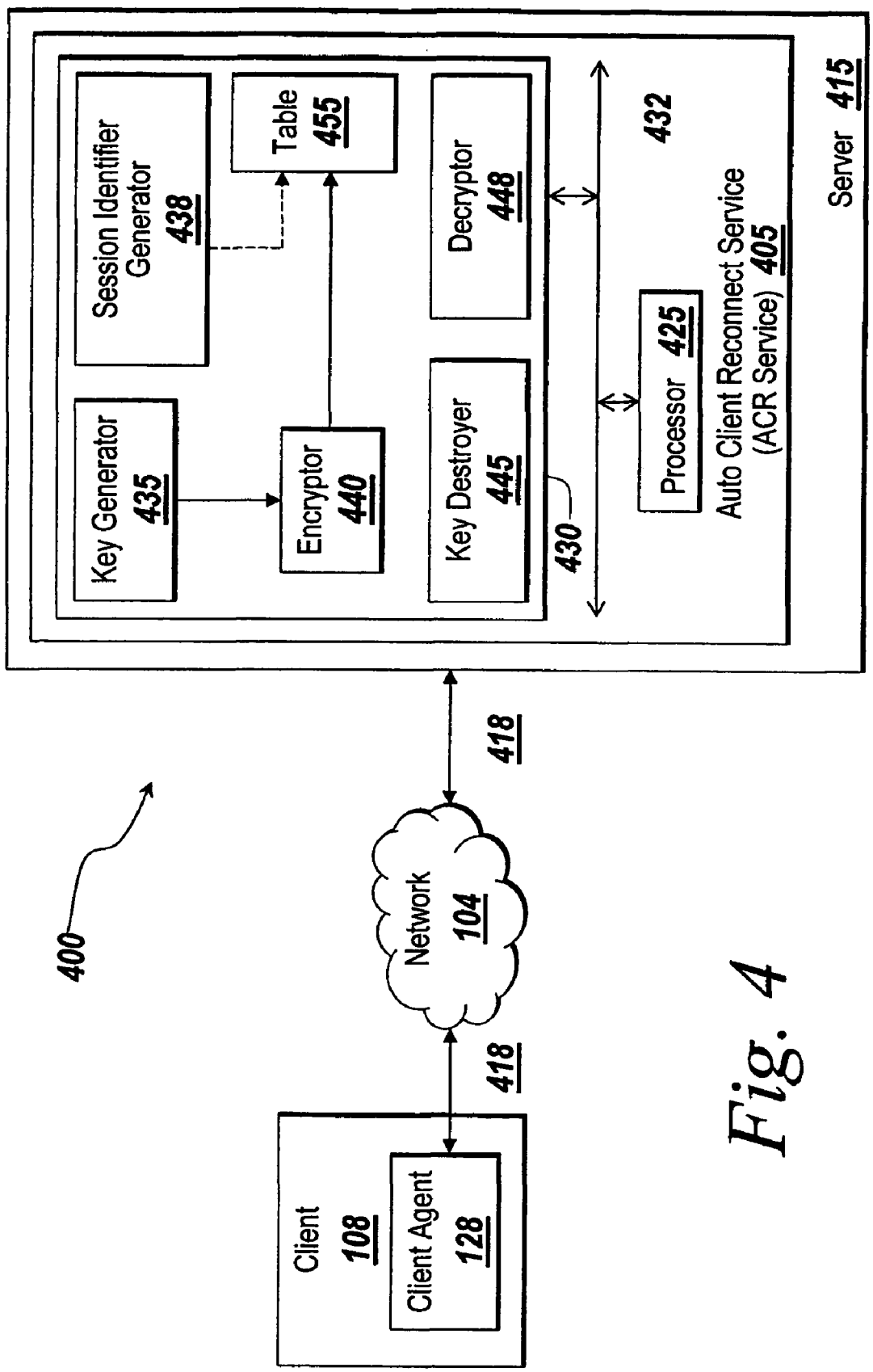
FIG. 4 is a block diagram of an embodiment of a computer system to maintain authentication credentials in accordance with the invention.

FIG. 4 depicts an illustrative embodiment of a system 400 that is capable of reconnecting the client 108 to a host service 116 using an automatic client reconnect service referred to as auto client reconnect service or ACR Service 405. In brief overview, a client 108 communicates with a server computer 415, also referred to as a server, over a communication channel 418. The communication channel 418 may include a network 104. For example, the communication channel 418 can be over a local-area network (LAN), such as a company Intranet, or a wide area network (WAN) such as the Internet or the World Wide Web. The server 415 provides auto client reconnect services through an ACR Service 405. The client 108 accesses the server 415 through the communication channel 418. The ACR Service 405 of the server 415 provides authentication services to authenticate the client 108 to the server 415. When there is a disruption in a network connection, the ACR Service 405 further provides re-authentication services to re-authenticate the client 108 to the server 415. Although illustrated with a single client 108 and one communication channel 418, any number of clients (e.g. 108, 108') and number of communication channels (e.g. 418, 418') can be part of the system 100.

In one embodiment, the server 415 includes a processor 425 and memory 430 that communicates over a system bus 432. The memory 430 may include random access memory (RAM) and/or read only memory (ROM). In another embodiment, the server 415 accesses memory 430 from a remote site (e.g., another computer, an external storage device).

The ACR Service 405 running on the server 415 includes a key generator 435, a session identifier (SID) generator 438, an encryptor 440, a key destroyer 445, and a decryptor 448. The key generator 435 generates a key when the server 415 or the ACR Service 405 receives authentication credentials from the client 108. In one embodiment, the key generator 435 derives the key from a characteristic of the server 415. Particular examples include the key generator 435 deriving the key from the temperature of the processor 425, the time that server 415 received the authentication credentials, and the number of keys stored in memory 430. In a further embodiment, the key and the authentication credentials are the same size (e.g. eight bits). In one embodiment, the key generator is a software module. In another embodiment, the key generator 435 is a random number generator.

The SID generator 438 generates the unique SID to enable the server 415 to identify a particular communication session. In one embodiment, the SID generator 438 is a software module. In another embodiment, the SID generator 438 is a random number generator. In another embodiment, the SID generator transmits the SID to the host service 116. In one embodiment, the SID generator 438 obtains the SID from a host service 116 running on the server. In yet another embodiment, the SID generator generates the SID by receiving a session identifier from the host service 116 establishing a user session.

The encryptor 440 encrypts the key with the authentication credentials to create encrypted authentication credentials. In one embodiment, the encryptor 440 encrypts the key with the authentication credentials by performing an exclusive OR operation (i.e. XOR) on the key and the authentication credentials. In another embodiment, the encryptor 440 adds the authentication credentials to the key to encrypt the authentication credentials; that is, the encryptor 440 performs a "Caesar Cipher" on the authentication credentials using the key as the shift value. In another embodiment, the encryptor 440 performs a hash function, such as MD4, MD5, or SHA-1, on the authentication credentials. It should be clear that the encryptor 440 can perform any type of manipulation on the authentication credentials as long as the ACR Service 405 can decrypt the encrypted authentication credentials with the key.

In one embodiment, the encryptor 440 is a software module that executes mathematical algorithms on the key and the authentication credentials to create the encrypted authentication credentials. In another embodiment, the encryptor 440 is a logic gate of the server computer 415, such as an exclusive OR (XOR) gate.

In one embodiment, the encryptor 440 stores the encrypted authentication credentials with the SID in a table 455 in memory 430. In another embodiment, the encryptor 440 stores the encrypted authentication credentials in the table 455 and the SID generator 438 stores the SID in the table 455. In one embodiment, the table 455 is an area in memory 430 allocated by the processor 455 for us by the encryptor 440. In another embodiment, the encryptor 440 stores the encrypted authentication credentials with the SID in a database (not shown in FIG. 4) separate from memory 430.

In one embodiment, the ACR Service 405 uses the SID as a vector to the location of the encrypted authentication credentials in the table 455. In another embodiment, the ACR Service 405 uses the SID as a database key to locate and retrieve the encrypted authentication credentials in a database (not shown in FIG. 4). Each encrypted authentication credential created by the encryptor 440 is associated with only one unique SID. Thus, the ACR Service 405 can locate and retrieve the encrypted authentication credentials by using a particular SID.

The key destroyer 445 deletes the key once the ACR Service 405 determines that the key is no longer needed. In one embodiment, the key destroyer 445 is a delete function of a software program such as the operating system of the server 415.

The decryptor 448 decrypts the encrypted authentication credentials once the ACR Service 405 receives the key and the SID from the client 108. In one embodiment, the decryptor 448 is a software module that performs the inverse function or algorithm that the encryptor 440 performed to create the encrypted credentials. In another embodiment, the decryptor 448 is a hardware component (e.g. a logic gate) to perform the inverse operation of the encryptor 440.

In one embodiment, one or more of the key generator 435, the SID generator 438, the encryptor 440, the key destroyer 445 and the decryptor 448 are joined into one software module representing the ACR Service 405. In another embodiment, these components (436, 438, 440, 445 and 448) can be hardware components such as logic gates. In a further embodiment, these components (435, 438, 440, 445 and 448) are included in a single integrated circuit. In yet another embodiment, some of the components, for example the key generator 435 and the SID generator 438, can be hardware components, and other components, for example the encryptor 440, the key destroyer 445 and the decryptor 448, can be software components.

In another embodiment, the present invention also provides methods for reconnecting a client 108 to a host service 116 when there is a disruption in the client's connection to the network. The methods include re-establishing the client's connection to the host service 116 and using the ACR Service 405 to re-authenticate the client to the host service.

Figure 5A:
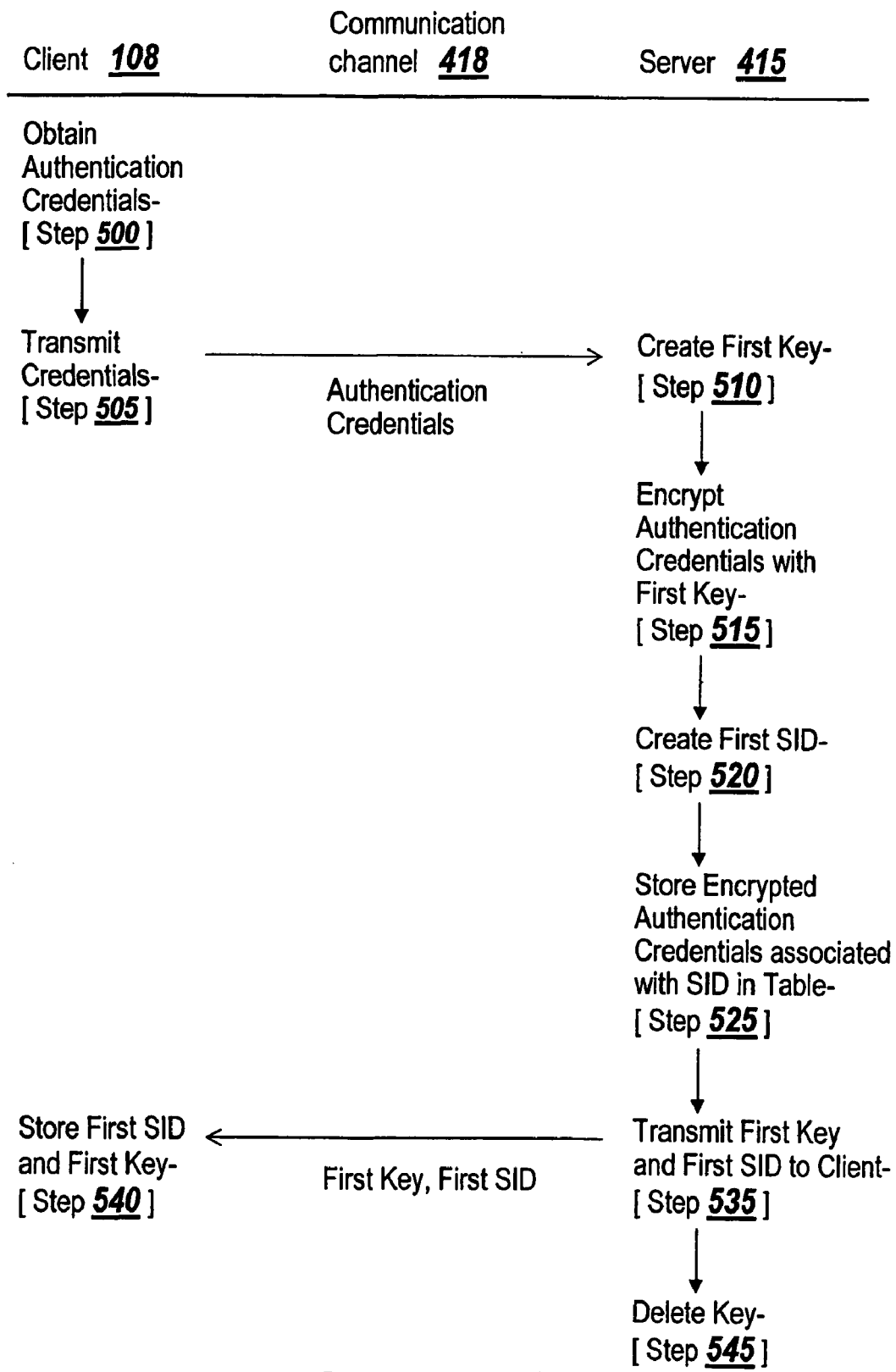
FIG. 5A is a flow diagram of the steps followed in an embodiment of the computer system of FIG. 4 to maintain authentication credentials during a first communication session in accordance with the invention.

Referring to FIG. 5A, the client 108 establishes a first communication session with the server 415 over the communication channel 418. The client 108 obtains (step 500) authentication credentials from a user of the client 108. In a system 100 not using an Open System Interconnection (OSI) protocol as the transmission protocol for communications between the client 108 and the server 415, the authentication credentials may be a login password that is needed to establish the first communication session. In this embodiment, the obtaining of the authentication credentials from the user precedes the establishment of the communication session. In another embodiment, the authentication credential is personal information of the user that the client 108 obtains after the first communication session has been established. Examples of authentication credentials include a login password, a social security number, a telephone number, an address, biometric information, a time-varying pass code and a digital certification. The client 108 then transmits (step 505) the authentication credentials to the server 415 over the communication channel 418 so that the server 415 can authenticate the client 108 or the user of the client 108.

After the server 415 receives the authentication credentials, the ACR Service 405 provides its auto client reconnect services. The key generator 435 creates (step 510) a first encryption key for use with the authentication credentials. In one embodiment, the encryption key is a random number. In another embodiment, the encryption key is any standard cryptographic key. The encryptor 440 then encrypts (step 515) the authentication credentials with the first key to generate encrypted authentication credentials. This prevents an attacker who gains access to the server 415 from accessing the authentication credentials without the key. The SID generator 438 then creates (step 520) a first SID to identify the first communication session between a client 108 and the server 415. In one embodiment, the first communication session is with a host service 116 hosted by the server 415. The encryptor 440 then stores (step 525) the encrypted authentication credentials with the first SID in the table 455 described above.

In one embodiment, the encryptor 440 stores the encrypted authentication credentials with the first SID in a certain location for more efficient retrieval at a later time. For instance, the encryptor 440 stores all encrypted authentication credentials and SIDs that have been created within a predetermined amount of time in RAM 30. The ACR service 405 transfers all encrypted authentication credentials and SIDS created before a predetermined time to a second, external memory (not shown). In another embodiment, the encryptor 440 stores the encrypted authentication credentials with the SID in a database (not shown).

The SID and the encrypted authentication credentials stored in the memory 430 can be arranged in any particular order and/or format. For example, the SID and encrypted authentication credentials can be stored in chronological order with respect to the creation time of the encrypted authentication credentials.

The server 415 then transmits (step 535) the first key and associated first SID to the client 108 over the network 104. The client 108 stores (step 540) the first key and the first SID in the client's 108 memory (not shown). Then the key destroyer 445 of the ACR Service 405 deletes (step 545) the key stored in memory 430.

In another embodiment, the ACR Service 405 does not delete the first key from memory 430 until the ACR Service 405 has notification that the client 108 has received the key. For example, the client 108 transmits an acknowledgment message to the server 415 after the client 108 successfully received the key. Once the ACR Service 405 receives notification, the key destroyer 445 then deletes (step 545) the key from the memory 430. This prevents the ACR Service 405 from deleting the key before the client 108 successfully received the key. By not deleting the key until the acknowledgment message, the ACR Service 405 can retransmit the key and the SID to the client 108 upon a failure in the transmission.

By deleting the key in step 545, the ACR Service 405 does not have the mechanism needed to decrypt the encrypted authentication credentials stored in the table 455. Thus, if an attacker accesses the memory 430 of the server 415, the attacker can retrieve the encrypted authentication credentials but cannot decrypt the encrypted authentication credentials. Therefore, the attacker cannot read the authentication credentials. In short, the encrypted authentication credentials stored on the server 415 do not provide any information that the attacker can interpret or understand. As such, the server 415 does not possess any information to decrypt the encrypted authentication credentials.

In addition, the client 108 is the only device that can provide the key to the encrypted authentication credentials. With the possibility of many clients 108 as part of the network 104, an attacker may have to attempt to gain access to each client (e.g. 108, 108') individually to find the client 108 that possesses the correct key. This can be time consuming and tedious and, as a result, may deter an attacker from an attempt to decrypt the encrypted authentication credentials.

In another embodiment, the server 415 has a timeout feature with respect to accessing the encrypted authentication credentials. For instance, the server 415 starts a timer after the first communication is abnormally terminated. If the timer reached a predetermined value before the client 108 re-establishes the second communication session and transmits the key to the server 415 for decryption, the ACR Service 405 deletes the encrypted authentication credentials from the table 455. If no timer is used, the key acts as a de facto password for future sessions.

Figure 5B:
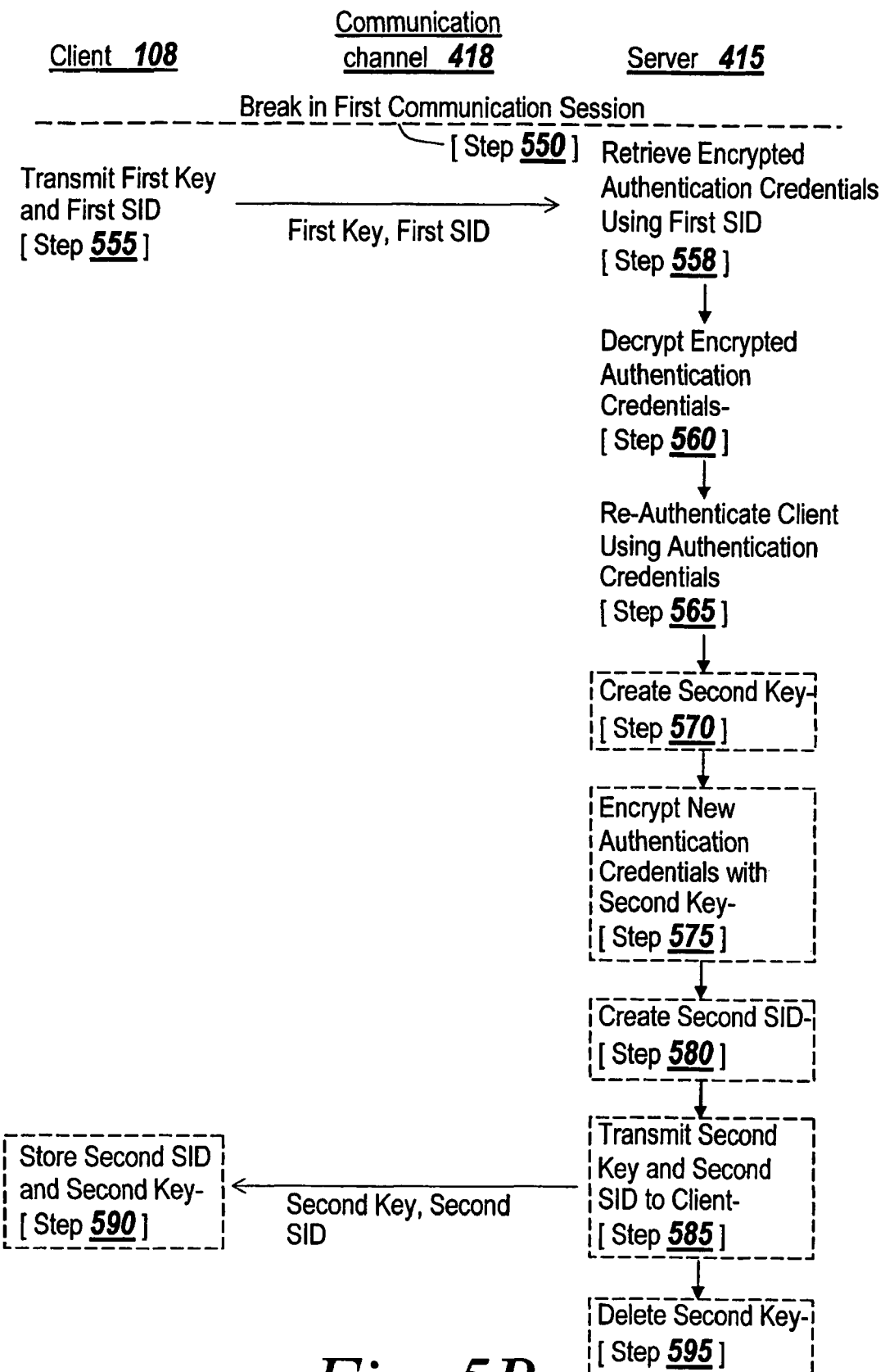
FIG. 5B is a flow diagram of the steps followed in an embodiment of the computer system of FIG. 4 to maintain authentication credentials during a second communication session following the termination of the first communication session of FIG. 5A in accordance with the invention.

Once the client 108 receives the first key and the first SID from the server 415 as described above in reference to FIG. 5A, the session can be re-established, as shown in FIG. 5B, without requiring the user to reenter his or her authentication credentials. When a disruption or break occurs in the first communication session (step 500) between the client 108 and the server 415, the first communication session 418 needs to be re-established and the client 108 re-authenticated to the server 415. The ACR Service 405 provides a system and method for re-establishing and re-authenticating the client 108 to the server 415.

When the client 108 and the server 415 re-establish a second communication session, the client 108 transmits the first key and the first SID (step 555) to the server 415. The ACR Service 405 uses the SID (step 558) to locate and retrieve the encrypted authentication credentials in the server's memory 430 and uses the key (step 560) to decrypt the retrieved authentication credentials. The server 415 then re-authenticates the client 108 to the server 415 (step 565) by validating the authentication credentials from the client 108. In one embodiment, the authentication and re-authentication is facilitated through the security services provided by the operating system of the computing device of the server 415. For example, the authentication credentials are a login and password to the server 415. In another embodiment, the authentication and re-authentication is facilitated through application level security services of an application or software program on the server 415. For example, the authentication credentials are an application login and password to a specific host service 116.

To illustrate, upon an abnormal termination of a first communication session (step 550) in which the user's login password was the authentication credential, the client 108 attempts to establish a second communication session with the server 415. As part of the request to the server 415 to establish a second communication session with the server 415, the client 108 transmits the key and the SID (step 555) of the first terminated communication session to the server 415. Instead of prompting the user to enter the user's login password again, the server 415, through the ACR Service 405, uses the SID (step 558) to locate and retrieve the encrypted authentication credentials associated with the user, uses the key (step 560) to decrypt the retrieved authentication credentials, and reauthenticates the client using the decrypted authentication information (step 565).

In one embodiment, during the second communication session, the ACR Service 405 creates (step 570) a second key for the authentication credentials and then encrypts (step 575) the authentication credentials using the second key. A second SID is created (step 580) to identify the second communication session and associate the session with the client 108. The second encrypted authentication credentials are stored (step 525) with the second SID in the table 455.

In this embodiment, the server then transmits (step 585) the second key and the second SID to the client 108. The client 108 then stores (step 590) the second key and the second SID in memory (not shown) for future retrieval. The ACR Service 405 then deletes (Step 595) the second key from the memory 430. Thus, the ACR Service 405 can only decrypt the second encrypted authentication upon obtaining the second key and the second SID from the client 108. The ACR Service 405 has created a new key and a new SID for the second communication session that is used with the same authentication credentials that the user had transmitted during the first communication session. Therefore, a user's authentication credentials do not have to be retransmitted upon a second communication channel after an abnormal termination of the first communication session.

Although the invention is discussed in terms of authentication credentials, any confidential information which can be maintained across sessions if there is a communication failure can be used. Thus if credit card information is required by an application and the credit card information is sent to the server, the subsequent disconnect between the client and the server does not require the credit card information to be reentered if this invention is issued. Further, although a session identifier, or SID, is discussed as providing a pointer to the stored authentication credentials, any number or value which is suitable as a pointer may be used.

Figure 6:
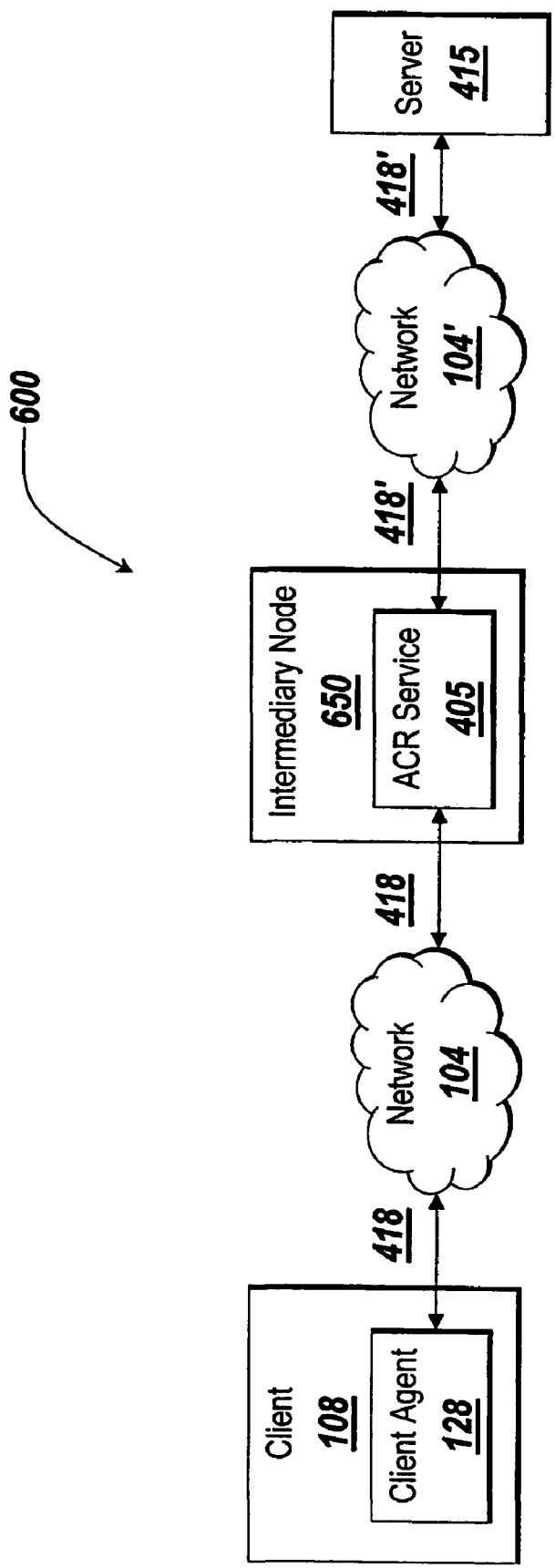
FIG. 6 is a block diagram of an embodiment of a computer system to maintain authentication credentials in accordance with another embodiment of the invention.

FIG. 6 depicts another illustrative embodiment of a system 600 that is capable of reconnecting a client 108 to a server 415 using an ACR Service 405 executing on an intermediary node 650. The intermediary node 650 is a computing device different from the server 415 and can be any computing device that is capable of communication and that has sufficient processor power and memory capacity to perform the operations described herein. In brief overview, the client 108 is in communication with an intermediary node 650 over a communication channel 418. The communication channel 418 may include a network 104. The intermediary node 650 provides auto client reconnect services, via an ACR Service 405, to the client 108 for the connection of the client 108 to the server 415. The intermediary node 650 is in communications with the server 415 over a communication channel 418'. The communication channel 418' may include a network 104'. The client 108 accesses the services of the server 415 through the intermediary node 650. The ACR Service 405 on the intermediary node 650 provides auto client reconnect services for the connection of the client 108 to the server 415. Although illustrated with a single client 108 over a communication channel 418, any number of clients and number of communication channels can be part of the system 600.

In a further embodiment (not shown), the system 600 includes multiple intermediary nodes 650 that are in communication with one or more clients 108 through a network 104 over additional communication channels 418, 418'. Although illustrated in FIG. 6 with a single intermediary node 650 over a communication channel 418, any number of intermediary nodes and number of communication channels can part of the system 600.

Figure 7A:
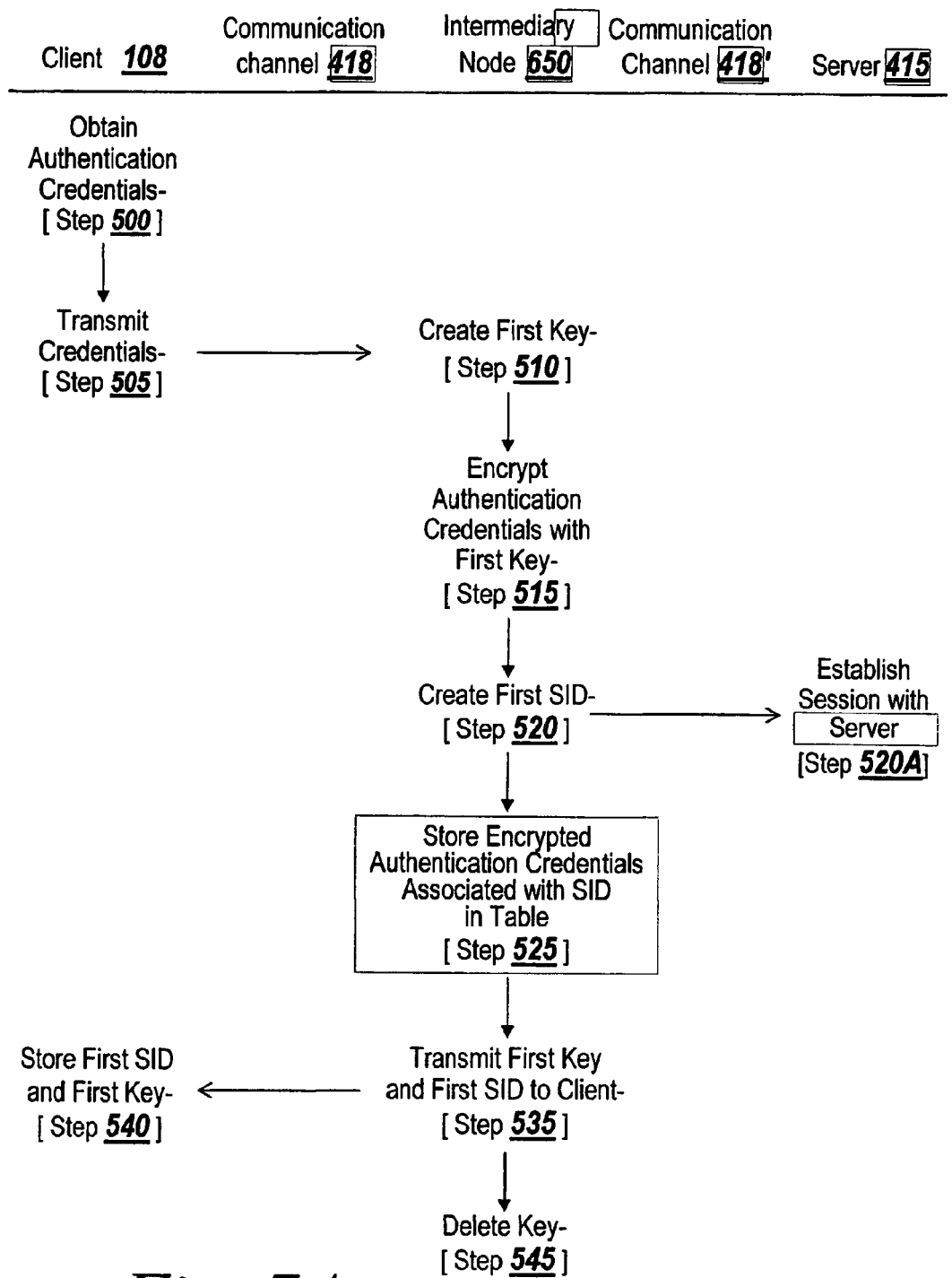
FIG. 7A is a flow diagram of the steps followed in an embodiment of the computer system of FIG. 6 to maintain authentication credentials during a first communication session in accordance with the invention.

In another embodiment, the invention relates to methods to facilitate establishing and authenticating a client's 108 connection to a server 415 using one or more intermediary nodes 650. As shown in FIG. 7A, an intermediary node 650 establishes (step 520A) a session with the server 415.

The client 108 establishes a first communication session with the intermediary node 650 over the communication channel 418. The client 108 obtains (step 500) authentication credentials from a user of the client 108. The client 108 then transmits (step 505) the authentication credentials to the intermediary node 650 over the communication channel 418 so that the intermediary node 650 can authenticate the user with the server 415.

After the intermediary node 650 receives the authentication credentials, the ACR Service 405 provides its auto client reconnect services. The ACR Service 405 creates (step 510) a first encryption key for use with the authentication credentials and then encrypts (step 515) the authentication credentials with the first key to generate encrypted authentication credentials. This prevents an attacker who gains access to the server 415 from accessing the authentication credentials without the key. Then a session is established with the server 415 (step 520A) and the client 108 is authenticated to the server 415 using the authentication credentials. Thereby, the ACR Service 405 creates a first SID to identify the first communication session. The encrypted authentication credentials are stored (step 525) with the first SID in the table 455 described above. The intermediary node 650 then transmits (step 535) the first key and the first SID to the client 108 over the network 104. The client 108 stores (step 540) the first key and the first SID in the client's 108 memory (not shown). The ACR Service 405 then deletes (step 545) the key stored in memory 430.

Figure 7B:
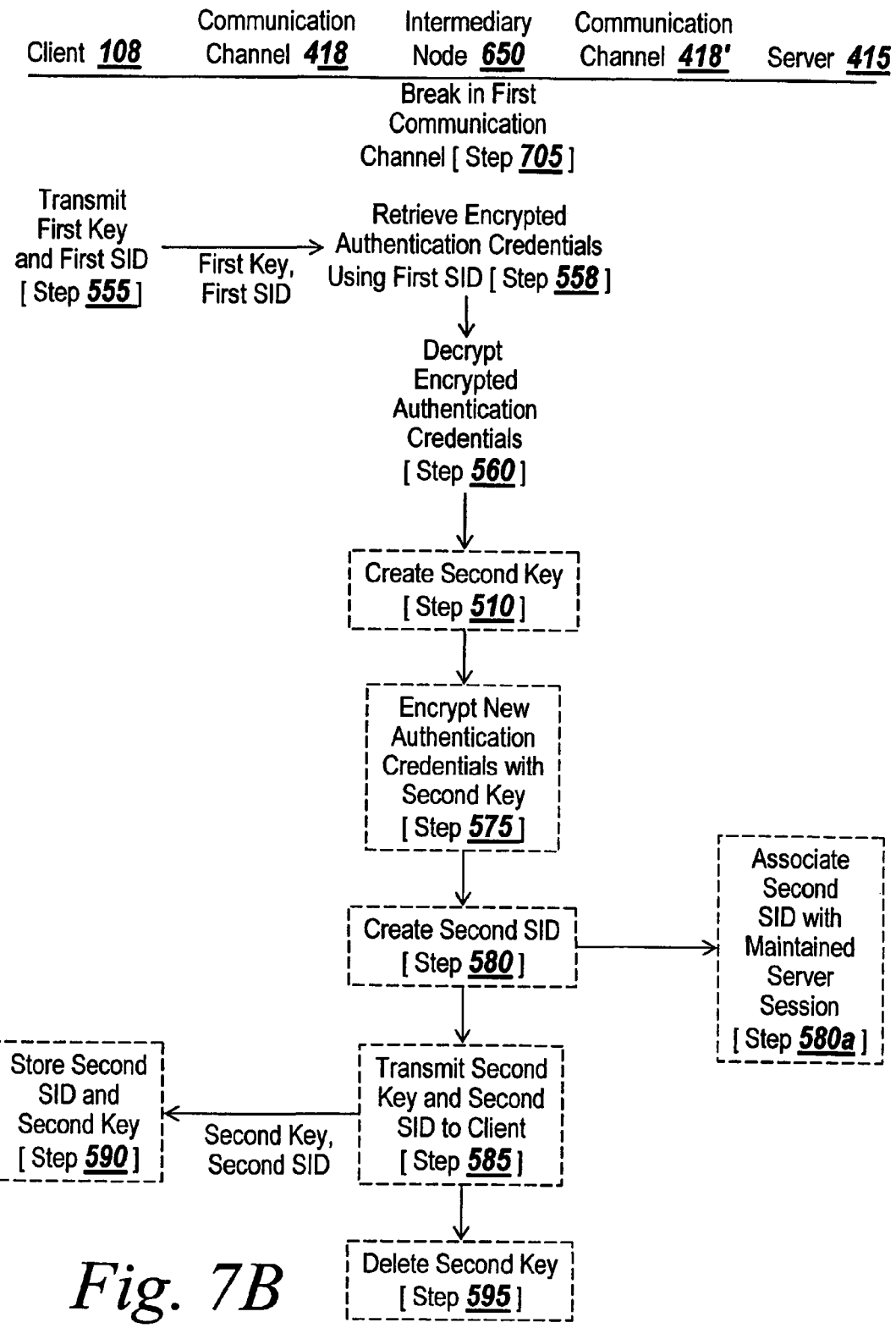
FIG. 7B is a flow diagram of the steps followed in an embodiment of the computer system of FIG. 6 to maintain authentication credentials during a second communication session following the termination of the first communication session of FIG. 6 in accordance with the invention.

Once the client 108 receives the first key and the first SID from the intermediary node 650 as described above in reference to FIG. 7A, the communication session can be re-established and re-authenticated, as shown in FIG. 7B, without requiring the user to reenter his or her authentication credentials. For example, there may be a disruption in the first communication session (step 705) between the client 108 and the intermediary node 650 from an abnormal termination.

When the client 108 and the intermediary node 650 re-establish a second communication session, the client 108 transmits the first key and the first SID (step 555) to the intermediary node 650. The ACR Service 405 of the intermediary node 650 uses the SID (step 558) to locate and retrieve the encrypted authentication credentials in the server's memory 430 and uses the key (step 560) to decrypt the retrieved authentication credentials. The key generator creates (step 570) a second key for the authentication credentials and the key encryptor 440 then encrypts (step 575) the authentication credentials using the second key. The SID generator 438 also creates (step 580) a second SID to identify the second communication session and associates it with the maintained session between the intermediary node 650 and the server 415. The encryptor 440 stores the second encrypted authentication credentials with the second SID in the table 455.

In this embodiment, the server 415 then transmits (step 585) the second key and the second SID to the client 108. The client 108 then stores (step 590) the second key and the second SID for future retrieval. The key destroyer 445 then deletes (Step 595) the second key from the memory 430. Thus, the ACR Service 405 can only decrypt the second encrypted authentication upon obtaining the second key and the second SID from the client 108. The ACR Service 405 has created a new key and a new SID for the second communication session that is used with the same authentication credentials that the user had transmitted during the first communication session. Therefore, a user's authentication credentials do not have to be retransmitted upon a second communication channel after an abnormal termination of the first communication session.

Figure 7C:
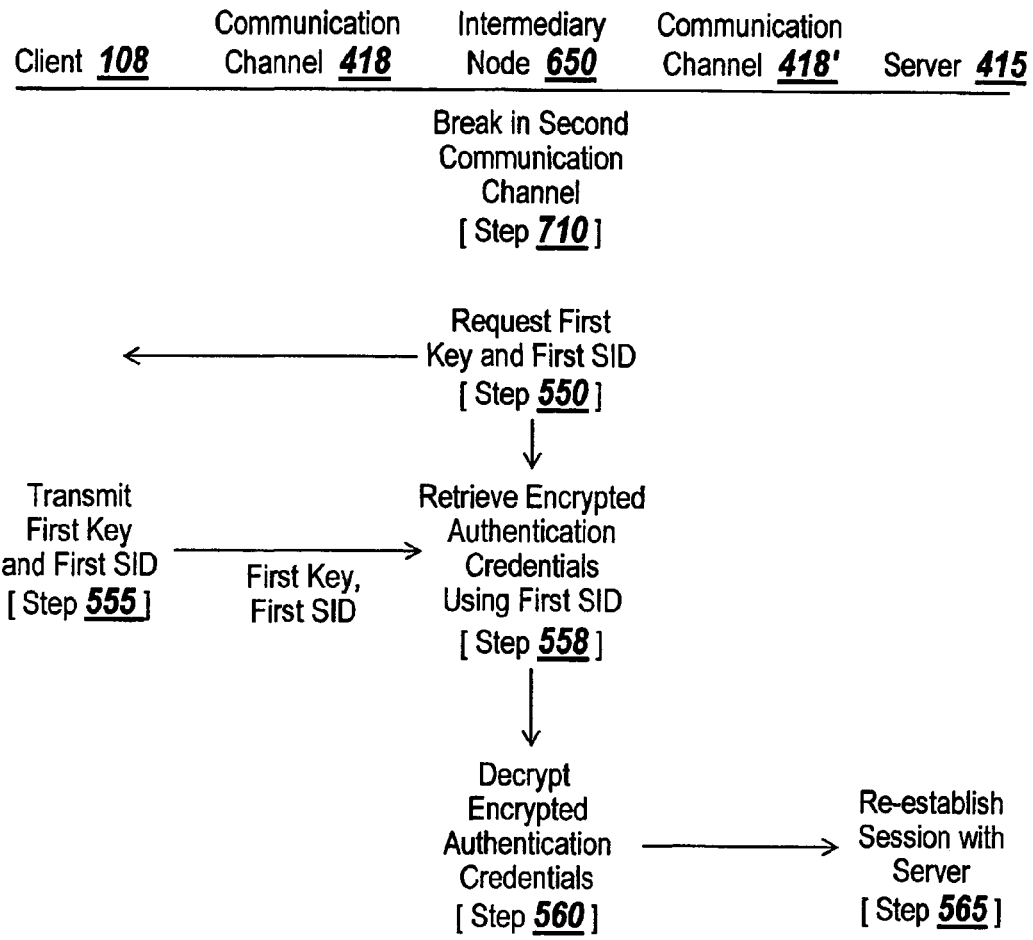
FIG. 7C is a flow diagram of the steps followed in an embodiment of the computer system of FIG. 6 to maintain authentication credentials during a second communication session following the termination of a second communication channel of the first communication session of FIG. 6 in accordance with the invention.

In another embodiment, there may be a disruption or abnormal termination in the second communication session (step 710) between the intermediary node 650 and the server 415. As described in FIG. 7C, the second communication session can be re-established and re-authenticated without requiring the user to reenter his or her authentication credentials.

When the intermediary node 650 and the server 415 re-establish a second communication session, the intermediary node 650 requests (step 550) the first key and first SID from the client 108 to re-establish a session with the server 415 on the client's behalf. In response, the client 108 transmits the first key and the first SID (step 555) to the intermediary node 650. The ACR Service 405 of the intermediary node 650 uses the SID (step 558) to locate and retrieve the encrypted authentication credentials in the server's memory 430 and uses the key (step 560) to decrypt the retrieved authentication credentials. The ACR Service 500 then re-establishes the client's session with the server (step 565) using the decrypted authentication credentials to re-authenticate the client 108 to the server 415.

In another embodiment, after re-establishing and re-authenticating the client over the second communication session, the ACR Service 405 of the intermediary node 650 creates a replacement second SID and second key as previously described in FIG. 7B. In reference to the embodiment of the ACR Service illustrated in FIG. 4, the key generator creates (step 570) a second key for the authentication credentials and the key encryptor 440 then encrypts (step 575) the authentication credentials using the second key. The SID generator 438 also creates (step 580) a second SID to identify the second communication session and associates it with the re-established session between the intermediary node 650 and the server 415. The encryptor 440 stores the second encrypted authentication credentials with the second SID in the table 455. In this embodiment, the server then transmits (step 585) the second key and the second SID to the client 108. The client 108 then stores (step 590) the second key and the second SID for future retrieval. The key destroyer 445 then deletes (Step 595) the second key from the memory 430.

In other embodiments, one or more of the first protocol service 112 and ACR Service 405 can be distributed across any of the host service nodes. As such, the functionality of re-establishing and re-authenticating, or automatically reconnecting, a client 108 connect to a host service 116 can be flexibly distributed in different system and deployment architectures across host services 116 and/or host nodes 118.

Figure 8A:
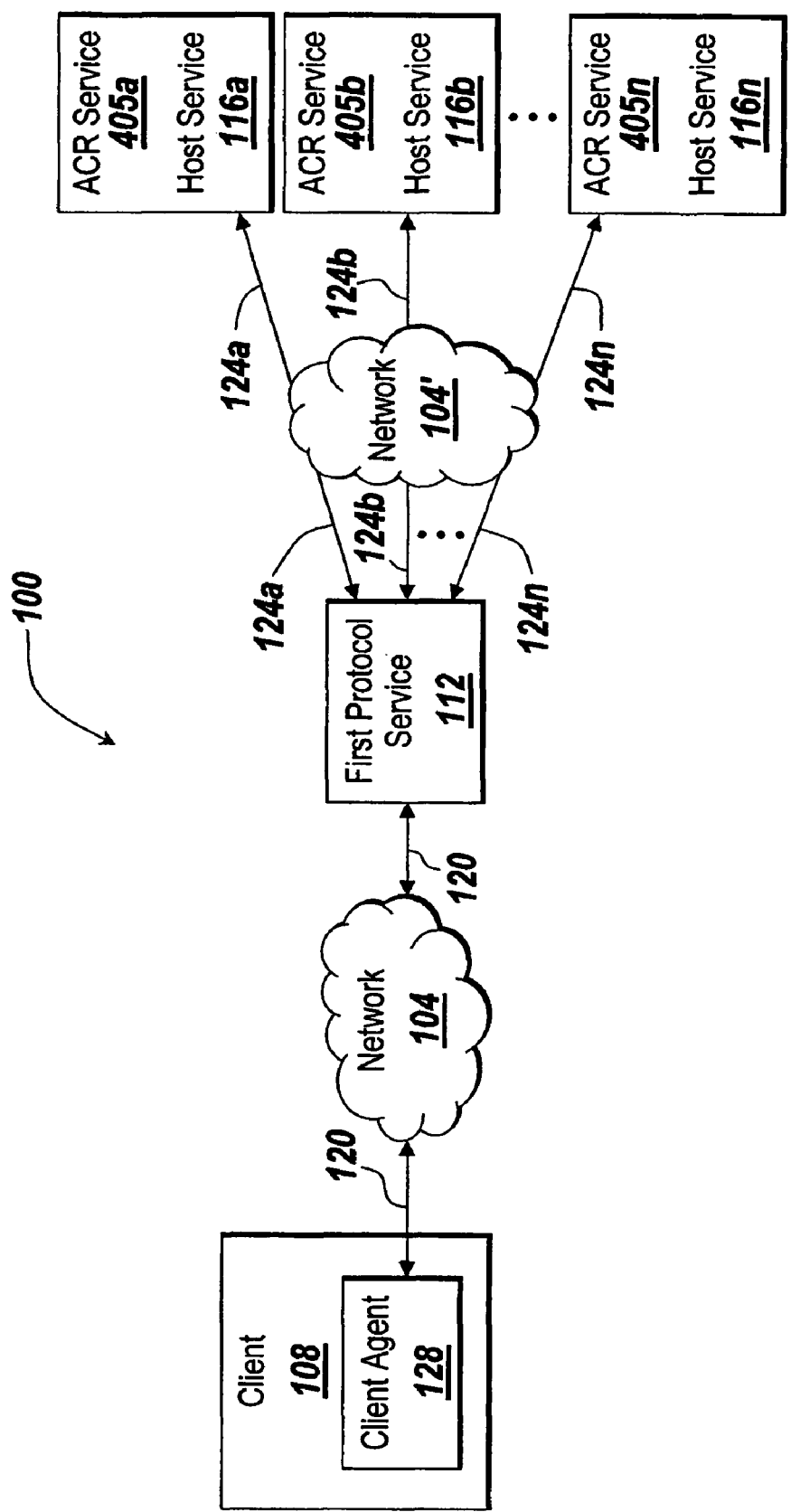
FIG. 8A is a block diagram of a system to maintain authentication credentials and provide a client with a reliable connection to a host service according to an illustrative embodiment of the invention.

In one embodiment of this aspect of the invention, an ACR Service 405 can be associated with each of the host services 116a-116n in system 100 to provide auto client reconnect services dedicated to each host service 116, respectively. A single first protocol service 112 can be deployed to handle all of the host services 116a-116n. As shown in FIG. 8A, each of the multiple ACR Services 405a-405n is associated with each of the host services 116a-116n, respectively. By way of example, a client 108 establishes a communication session with the host service 116a using the first protocol service 112. The ACR Service 405a associated with host service 116a provides auto client reconnect services for the connection of the client 108 to the host service 116a. If there is a disruption in a network connection, the first protocol service 112 will re-establish the connection with the client 108 and the ACR Service 405a will re-authenticate the client 108 to the host service 116a. A second client 108' may concurrently, with the first client 108, establish a communication session with the host service 116b using the first protocol service 112. The ACR Service 405b provides auto client reconnect services for the client's connection to the host service 116b. If there is a network disruption, the first protocol service 112 in conjunction with the ACR Service 405b will reconnect the client 108' to the host service 116b.

In another embodiment of this aspect of the invention, an ACR service can be associated with each of the multiple host services 116a-116n running on each of the host nodes 118a-118n of the system 100. A first protocol service 112 can be deployed on each host node 118 to service each of the multiple host services 116a-116n running on that host node 118.

Figure 8B:
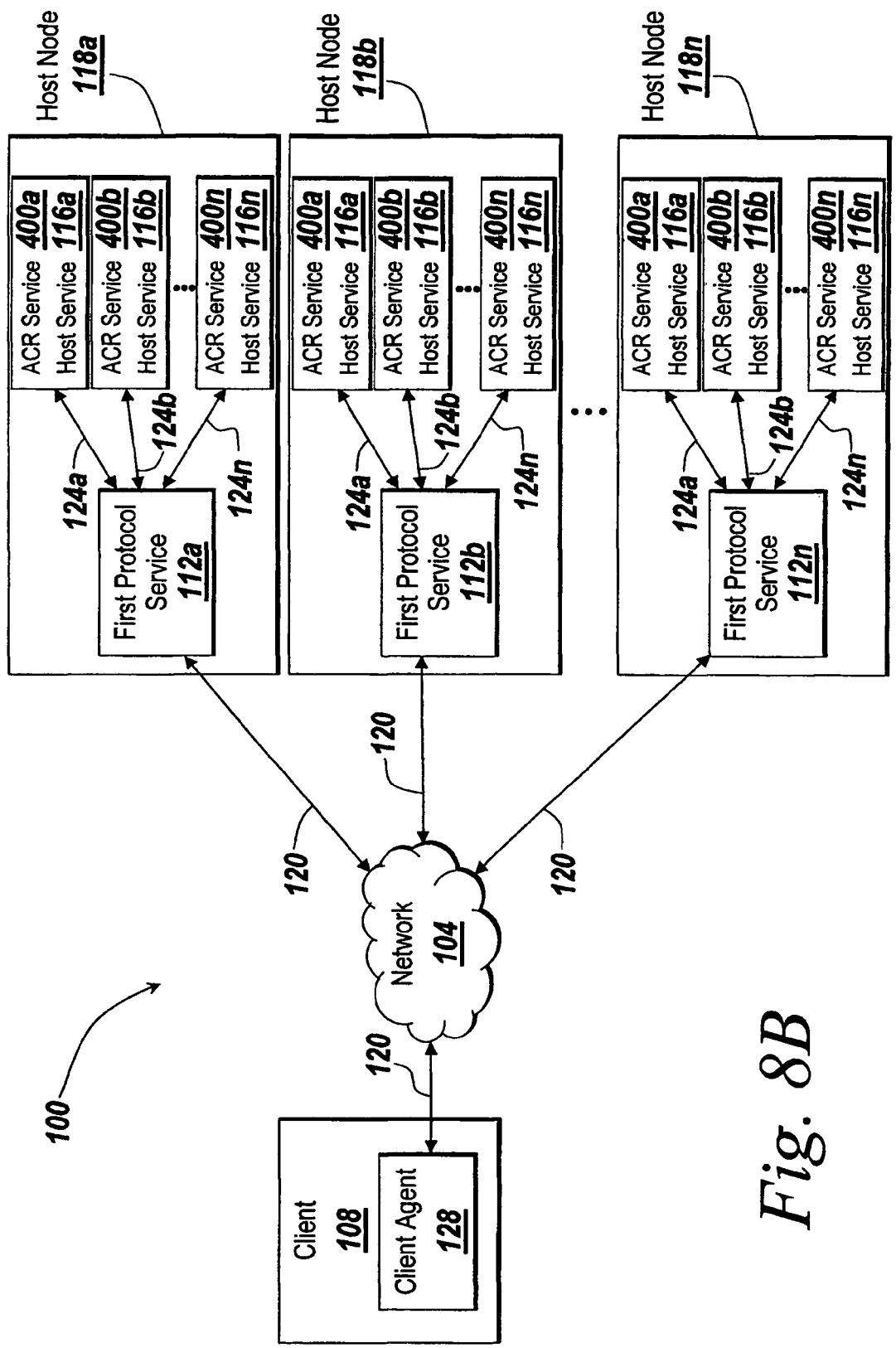
FIG. 8B is a block diagram of a system to maintain authentication credentials and provide a client with a reliable connection to a host service according to another illustrative embodiment of the invention.

As shown in FIG. 8B, each ACR service 405a-405n is associated with each host service 116a-116n, respectively. Each host node 118 has a dedicated first protocol service 112 servicing each of its host services 116 and each ACR Service 405. For example, a client 108 establishes a communication session with host service 116a on host node 118a by using the first protocol service 112a. The ACR Service 405a on host node 118a provides auto client reconnect services for the connection of the client 108 to the host service 116a on host node 118a.

If a network disruption is detected, the first protocol service 112a re-establishes the client's connection to the host service 116a on host node 118a and the ACR service 405a on host node 118a re-authenticates the client 108 to the host service 116a on host node 118a. Concurrently with the first client 108, a second client 108' establishes a communication session with host service 116b on host node 118a using the first protocol service 112a and ACR Service 405a. If there is a network disruption, the first protocol service 112a in conjunction with the ACR Service 405a reconnect the client 108' with host service 116b on host node 118a. Concurrently with the first client 108 and the second client 108', a third client 108" establishes a communication session with host service 116n on host node 118b using the first protocol service 112b and ACR Service 405n on host node 118b. In a similar manner, the first protocol service 112b and ACR Service 405n can reconnect the client 108" to the host service 116n of host node 118b.

In other embodiments, one or more of the ACR Services 405 can be distributed with the first protocol services 112 across any of the intermediary or first protocol services nodes. As such, the functionality of reconnecting a client 108 to a host service 116 can be flexibly distributed in different system and deployment architectures associated with the first protocol service 112.

Figure 9A:
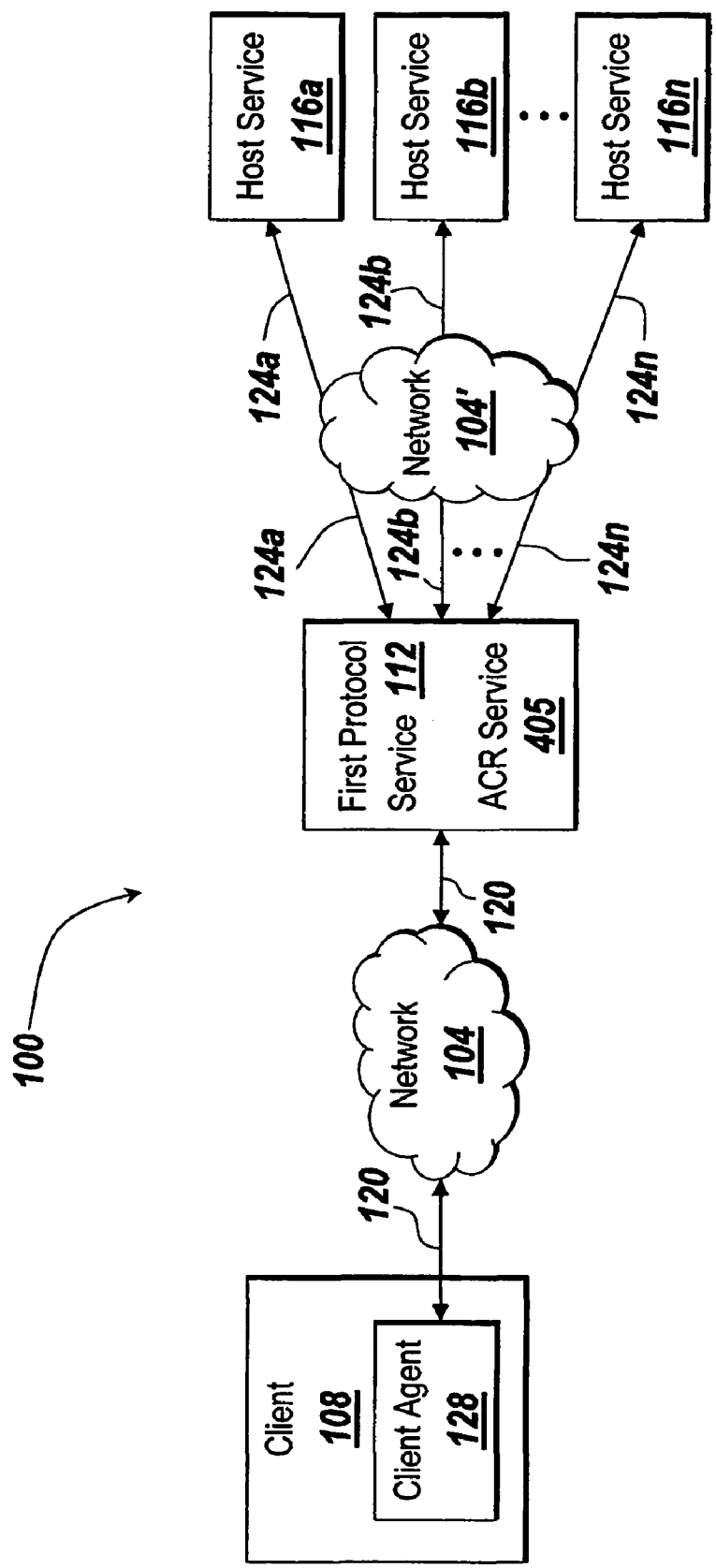
FIG. 9A is a block diagram of a system to maintain authentication credentials and provide a client with a reliable connection to a host service according to another illustrative embodiment of the invention.

In one embodiment of this aspect of the invention, the ACR Service 405 can be associated with each first protocol service 112 to provide auto client reconnect services dedicated to the first protocol service 112. A single first protocol service 112 and ACR Service 405 can be deployed to handle all of the host services 116a-116n. As shown in FIG. 9A, the ACR Service 405 resides with the first protocol service 112 on the same computing device to provide auto client reconnect services to host services 116a-116n. For example, a client 108 establishes a communication session with any of the host services 1116a-116n by using the first protocol service 112 and ACR Service 405. The first protocol service 112 and ACR Service 405 provide reconnecting functionality from a client 108 to any of the host services 116a-116n.

Figure 9B:
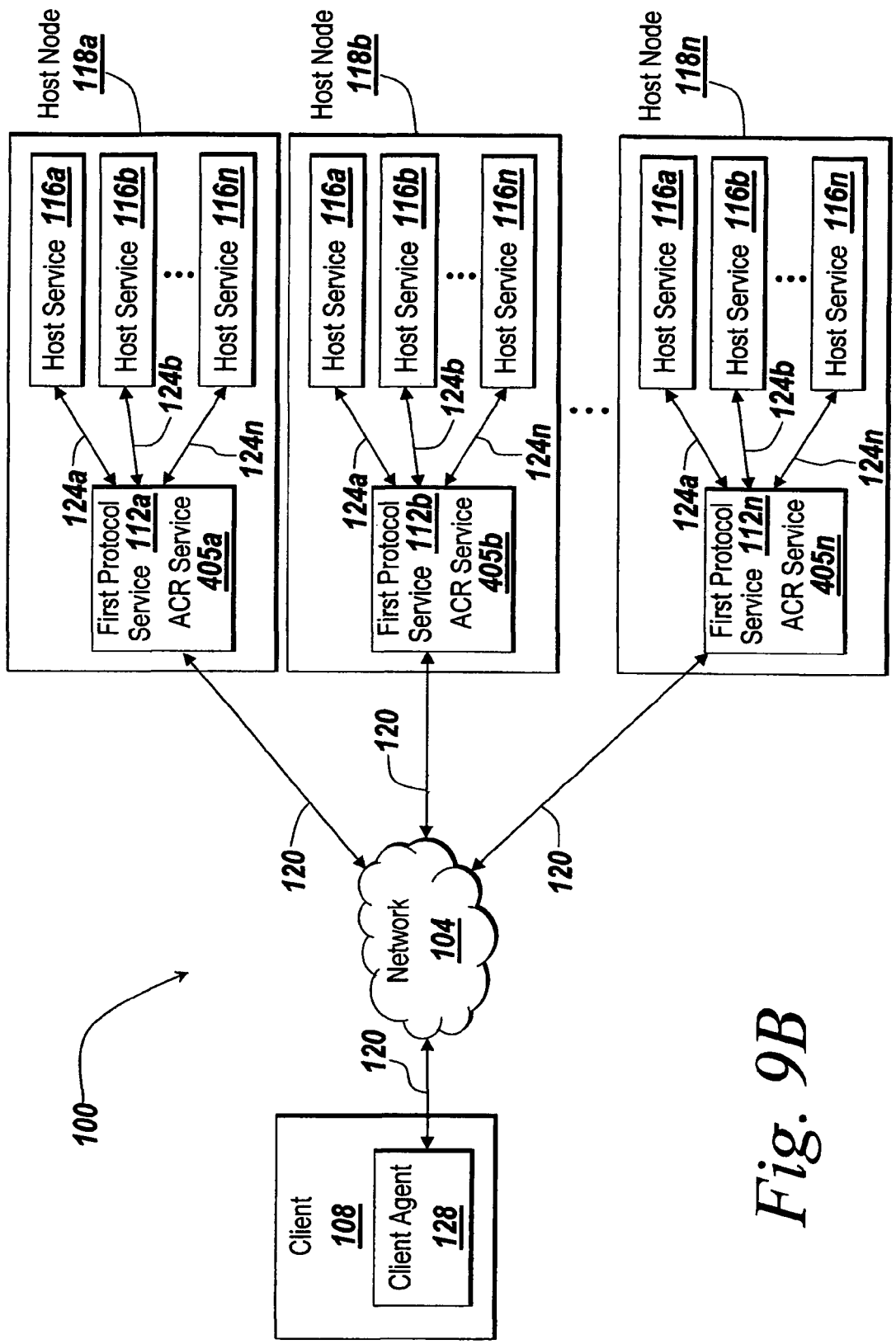
FIG. 9B is a block diagram of a system to maintain authentication credentials and provide a client with a reliable connection to a host service according to another illustrative embodiment of the invention.

In another embodiment of this aspect of the invention, each of the ACR Services 405a-405n can be associated with each of the multiple of first protocol services 116a-116n. For example as shown in FIG. 9B, a first protocol service 112a and an ACR Service 405a can be deployed on a host node 118a to service each of the multiple host services 116a-116n running on that host node 118a. As further shown in FIG. 9B, each ACR service 405a-405n is associated with each first protocol service 112a-112n to provide dedicated auto client reconnect services to the multiple host services 116a-116n of each host node 118a-118n. By way of example, client 108 establishes a communication session with host service 116a on host node 118a by using the first protocol service 112a and ACR Service 405a on the same host node 118a. If there is a network disruption, the first protocol service 112a in conjunction with the ACR Service 405a reconnects the client 108 to the host service 116a on the host node 118a.

Although the invention is discussed above in terms of various system and deployment architectures in FIGS. 8A-8B and 9A-9B, any other system and/or deployment architecture that combines and/or distributes one or more of the first protocol service(s) 112, ACR Service(s) 405, and host service(s) 116 across any of the host nodes 118, intermediary nodes 650 or other computing devices can be used.

Furthermore, instead of using an ACR Service 405 to provide authentication and re-authentication services, a ticket authority 1036 service can be used. A ticket authority 1036 generates and validates tickets for connection and authentication purposes. A ticket can comprise a session identifier and key. It can also comprise a random number, an application server certificate, a nonce, a constant or null value or any other type of identification, confidential or security based information that may be used for such purposes.

Figure 10A:
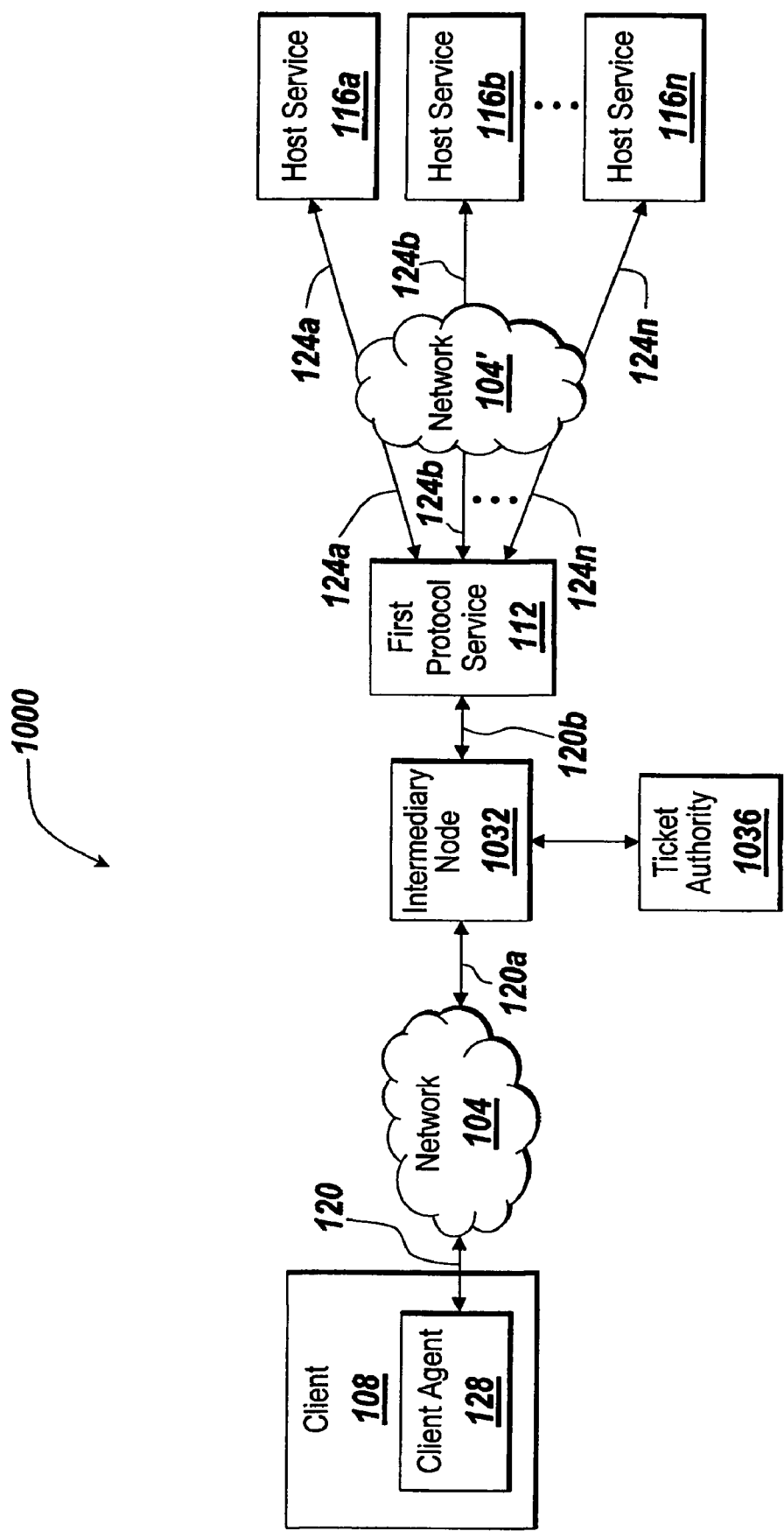
FIG. 10A is a block diagram of a system for providing a client with a reliable connection to a host service and further including components for reconnecting the client to a host service according to an illustrative embodiment of the invention.

In an embodiment of a network communication system 1000 for reconnecting a client 108 to a host service 116 as shown in FIG. 10A, a ticket authority 1036 can run on a node separate from the intermediary node 1032, first protocol service 112 or any of the host services 116a-116n. FIG. 10A depicts an intermediary node 1032 and ticket authority 1036, which could be a single computing device, as part of the system 1000. In addition to the networks 104 and 104', the system 1000 includes a client 108, first protocol service 112, and the host services 116a-116n, all of which are described above. In one embodiment, the intermediary node 1032 is a security gateway, such as, for example, a firewall and/or a router, through which messages between the client 108 and the first protocol service 112 must pass due to the configuration of the network 104. The ticket authority 1036 can be, for example, a stand-alone network component that is capable of communication and that has sufficient processor power and memory capacity to perform the operations described herein. The ticket authority 1036 also can be a specific host service 116 dedicated to providing ticket related services on a server 415.

As shown in the illustrative embodiment of FIG. 10A, the intermediary node 1032 is configured to accept a connection 120a initiated by the client 108 and to establish a second connection 120b with the first protocol service 112. Together, the connection 120a and the second connection 120b constitute the connection 120, described above, over which the client 108 and the first protocol service 112 communicate using the first protocol.

The intermediary node 1032, as shown, is also configured to communicate with the ticket authority 1036. In one embodiment, the ticket authority 1036 is configured to receive a request for a first reconnection ticket from the intermediary node 1032 and to thereafter generate the first reconnection ticket. The first reconnection ticket can include, for example, a large random number. The first reconnection ticket allows the client 108 to automatically re-establish a connection with the host service after an abnormal disruption of service without requiring the client 108 to provide authentication credentials again.

After generation of the first reconnection ticket, the ticket authority 1036 encrypts the authentication credentials supplied by the client 108 using the first reconnection ticket so that an attacker who gains access to the intermediary node 1032 or the ticket authority 1036 cannot access the authentication credentials without the first reconnection ticket. The ticket authority 1036 may also generate a SID to identify the communication session that is established between the client 108 and the intermediary node 1032. The ticket authority 1036 then stores the encrypted authentication credentials with the SID in memory and transmits the SID and the first reconnection ticket to the client 108 over the network 104. Upon the client's receipt of the SID and the first reconnection ticket, the ticket authority 1036 destroys (i.e., deletes) the ticket from its memory (not shown).

In another embodiment, the ticket authority 1036 is configured to generate a handle. The handle can be, for example, a random number that is associated with (e.g., mapped to) the first reconnection ticket. In one embodiment, the handle is a smaller random number than the random number forming the first reconnection ticket. For example, the handle may be a 32-bit random number. The ticket authority 1036 transmits the first reconnection ticket and the handle to the intermediary node 1032, while keeping a copy of the first reconnection ticket and a copy of the handle. The copy of the first reconnection ticket can later be used by the ticket authority 1036 to validate the first reconnection ticket originally transmitted to the client 108 when it is later presented to the ticket authority 1036 during the process of reconnecting the client 108. In one embodiment, the ticket authority 1036 also keeps an address for the first protocol service 112, which, as explained below, is associated with the first reconnection ticket and, upon validation of the first reconnection ticket, is transmitted to the intermediary node 1032.

In one embodiment, the intermediary node 1032 is further configured to use the handle transmitted to it by the ticket authority 1036 to delete the copy of the first reconnection ticket kept at the ticket authority 1036. In another embodiment, as described below, the ticket authority 1036 is further configured to delete, during the process of reconnecting the client 108 to a host service 116, the first reconnection ticket and thereafter generate a replacement first reconnection ticket. Additionally, in another embodiment, the first reconnection ticket is configured for automatic deletion after a pre-determined period of time.

In another embodiment, the first protocol service 112 is configured to generate a second reconnection ticket, which, as in the case of the first reconnection ticket, can include, for example, a large random number. The first protocol service 112 can also be configured to transmit the second reconnection ticket to the client 108, while keeping a copy of the second reconnection ticket and a session number. The copy of the second reconnection ticket can later be used by the first protocol service 112 to validate the second reconnection ticket originally transmitted to the client 108 when it is later presented to the first protocol service 112 during the process of reconnecting the client 108. In one embodiment, the first protocol service 112 transmits the second reconnection ticket to the client 108 via the intermediary node 1032. In another embodiment, the first protocol service 112 transmits the second reconnection ticket to the client 108 directly. Moreover, as described in greater detail below, the first protocol service 112 can be further configured to delete, during the process of reconnecting the client 108 to a host service 116, the second reconnection ticket, and thereafter generate a replacement second reconnection ticket. Additionally, in another embodiment, the second reconnection ticket is configured for automatic deletion after a pre-determined period of time.

In one embodiment, the intermediary node 1032 serves as an intermediary for the first and second reconnection tickets. The intermediary node 1032 receives, for example, the first reconnection ticket generated by the ticket authority 1036 and the second reconnection ticket generated by the first protocol service 112. The intermediary node 1032 can then transmit the first reconnection ticket and the second reconnection ticket to the client 108. Moreover, during the process of reconnecting the client 108 to a host service 116, the intermediary node 1032 can accept the first reconnection ticket and the second reconnection ticket from the client 108 and thereafter transmit the first reconnection ticket to the ticket authority 1036 and, if appropriate, the second reconnection ticket to the first protocol service 112.

If the first communication session between the client 108 and the host service 116 terminates, for example abnormally, the new session can be re-established without requiring the user to reenter his or her authentication credentials. When the client 108 and the host service 116 re-establish a second communication session, the client 108 retransmits the first and second reconnection tickets and the SID to the intermediary node 1032. The intermediary node 1032 transmits the first and second reconnection tickets and the SID to the ticket authority 1036, which uses the SID to locate and retrieve the encrypted authentication credentials for the first connection and uses the first reconnection ticket to decrypt the retrieved authentication credentials. The ticket authority 1036 then authenticates the client by validating the decrypted authentication credentials. After re-authentication, the second reconnection ticket is forwarded to the first protocol service 112 to re-establish the second connection 124 with the host service 116.

Figure 10B:
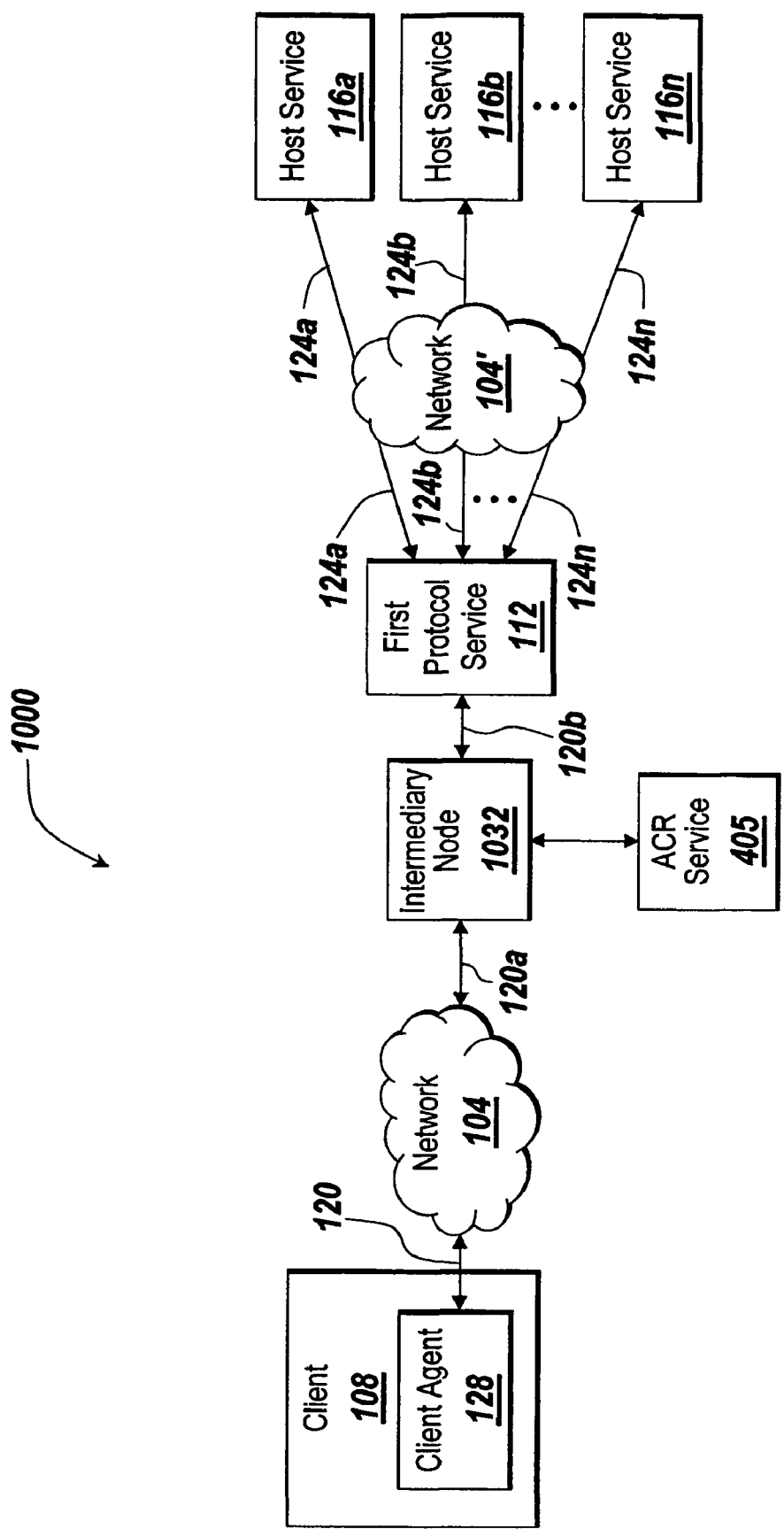
FIG. 10B is a block diagram of an embodiment of a system for providing a client with a reliable connection to a host service and further including components for reconnecting the client to a host service.

In another embodiment of a network communications system 1000 as shown in FIG. 10B, an ACR Service 405 can be used instead of the ticket authority 1036 for reconnecting the client 108 to any of the host services 116a-116n. In this embodiment, the ACR Service 405 can provide similar services as described above with regards to the ticket authority 1036. As previously described, the ACR Service 405 generates, validates and manages a SID and a key for connecting and reconnecting a client communication session. A SID and a key can form a ticket as in the type of ticket generated, validated and managed by the ticket authority 1036 as described above. As such, in another embodiment, a ticket may be used interchangeably for the combination of a session identifier and a key.

The intermediary node 1032, as shown in FIG. 10B, is configured to communicate with the ACR Service 405. In one embodiment, the ACR Service 405 is configured to receive a request for a first SID and a first key from the intermediary node 1032 and to thereafter generate the first SID and first key. The ACR Service 405 uses the first SID to identify the communication session that is established between the client 108 and a host service 116. The first SID and the first key allow the client 108 to automatically reconnect with the host service 116 after an abnormal disruption of service without requiring the client 108 to provide authentication credentials again.

After generation of the first SID and the first key, the ACR Service 405 encrypts the authentication credentials supplied by the client 108 using the first key so that an attacker who gains access to the intermediary node 1032 or the ACR Service 405 cannot access the authentication credentials without the first key. The ACR Service 405 then stores the encrypted authentication credentials with the SID in memory 430 and transmits the first SID and the first key to the client 108 over the network 104. Upon the client's receipt of the SID and the key, the ACR Service 405 destroys (i.e., deletes) the key from its memory 430.

In another embodiment, the first protocol service 112 is configured to generate a second SID and second key. The first protocol service 112 can also be configured to transmit the second SID and second key to the client 108, while keeping a copy of the second SID and second key. The copy of the second SID and second key can later be used by the first protocol service 112 to validate the second SID and second key originally transmitted to the client 108 when it is later presented to the first protocol service 112 during the process of reconnecting the client 108. In one embodiment, the first protocol service 112 transmits the second SID and second key to the client 108 via the intermediary node 1032. In another embodiment, the first protocol service 112 transmits the second SID and second key to the client 108 directly. Moreover, as described in greater detail below, the first protocol service 112 can be further configured to delete, during the process of reconnecting the client 108 to a host service 116, the second SID and second key, and thereafter generate a replacement second SID and second key. Additionally, in another embodiment, the second SID and second key is configured for automatic deletion after a pre-determined period of time.

In one embodiment, the intermediary node 1032 serves as an intermediary for the first and second SIDs and keys. The intermediary node 1032 receives, for example, the first SID and first key generated by the ACR Service 405 and the second SID and second key generated by the first protocol service 112. The intermediary node 1032 can then transmit the first SID and first key and the SID and second key to the client 108. Moreover, during the process of reconnecting the client 108 to a host service 116, the intermediary node 1032 can accept the first SID and first key and the second SID and second key from the client 108 and thereafter transmit the first SID and first key to the ACR Service 405 and, if appropriate, the second SID and second key t to the first protocol service 112.

If the first communication session between the client 108 and the host service 116 terminates, for example abnormally, the new session can be re-established without requiring the user to reenter his or her authentication credentials. When the client 108 and the host service 116 re-establish a second communication session, the client 108 transmits the first and second SIDs and keys to the intermediary node 1032. The intermediary node 1032 transmits the first SID and first key to the ACR Service 405, which uses the SID to locate and retrieve the encrypted authentication credentials for the first connection and uses the first key to decrypt the retrieved authentication credentials. The ACR Service 405 then authenticates the client by validating the decrypted authentication credentials. After re-authentication, the second SID and second key is forwarded to the first protocol service 112 to re-establish the second connection 124 with the host service 116.

Figure 11A:
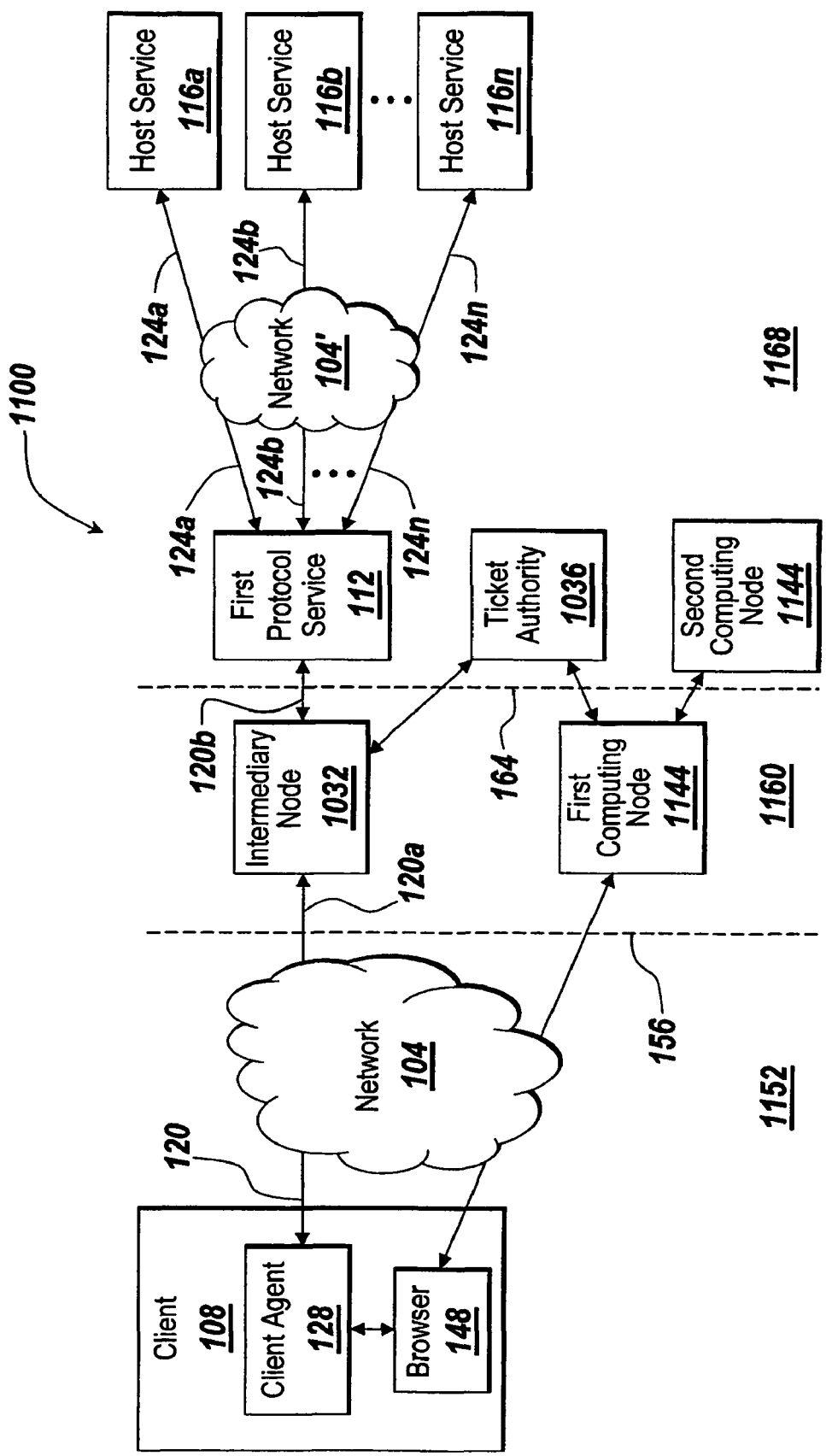
FIG. 11A is a block diagram of an embodiment of FIG. 10A further including components for initially connecting the client to a host service.

Referring to FIG. 11A, another embodiment of a system 1100 for network communications includes the networks 104 and 104', the client 108, the first protocol service 112, the host services 116, the intermediary node 1032, and the ticket authority 1036, as described above, and further depicts a first computing node 1140 and a second computing node 144, both of which are used, in one embodiment, for initially connecting the client 108 to a host service 116. Moreover, in the illustrative embodiment of FIG. 11A, the client 108 further includes a web browser 148, such as, for example, the INTERNET EXPLORER program from Microsoft Corporation of Redmond, Wash., to connect to the World Wide Web.

In one embodiment (not shown), the system 1100 includes two or more intermediary nodes 1032 and/or two or more first protocol services 112. The intermediary node 1032, through which messages between the client 108 and the first protocol service 112 must pass, and/or the first protocol service 112 can, as explained below, each be chosen based on, for example, a load balancing equation.

Each of the first computing node 1140 and the second computing node 1144 can be any computing device that is capable of communication and that has sufficient processor power and memory capacity to perform the operations described herein. For example, in one embodiment, the first computing node 1140 is a web server, providing one or more websites or web based applications. In another embodiment, the second computing node 1144 provides an XML service or web service.

In one embodiment, the client 108 and the network 104 form an external network 1152, separated from the rest of the system 1100 by a first firewall 1156, depicted as a dashed line. The intermediary node 1032 and the first computing node 1140 can be located in a "demilitarized zone" 1160 (i.e., a network region placed between a company's private network and the public network), separated from the rest of the system 1100 by the first firewall 1156 and a second firewall 1164, also depicted by a dashed line. Then, as shown, the network 104', the first protocol service 112, the host services 116*a*-116*n*, the ticket authority 1036, and the second computing node 1144, form an internal network 1168, separated from the rest of the system 1100 by the second firewall 1164.

Alternatively, in another embodiment not shown in FIG. 11A, the system 1100 further includes a third computing node 1146 positioned, in the demilitarized zone 1160, between the network 104 and the intermediary node 1032. The third computing node 1146 can be any computing device that is capable of networked communication and that has sufficient processor power and memory capacity to perform the operations described herein. As described below, the third computing node 1146 is used, in some embodiments, during the process of initially connecting the client 108 to a host service 116 and/or during the process of reconnecting the client 108 to a host service 116. More specifically, as described below, where the system 1100 includes two or more intermediary nodes 1032, the third computing node 1146 can, based on a load balancing equation for example, choose the intermediary node 1032 through with communications between the client agent 128 of the client 108 and the first protocol service 112 must pass.

Moreover, referring to FIG. 11A, the intermediary node 1032, in an alternative embodiment, can be replaced by two or more levels "a"-"n" of intermediary nodes 1032. As illustrated, each level "a"-"n" can include two or more intermediary nodes 1032*a*-1032*n*. As described below, the client agent 128 of the client 108 can be routed through any combination of the intermediary nodes 1032 based on, for example, load balancing equations. For example, as illustrated, the client agent 128 can be routed through the intermediary nodes 1032 via connection 120. Other configurations of the system 1100, as would be readily apparent to one skilled in the art, are also possible.

Referring again to FIG. 11A, in one embodiment, the web browser 1148 communicates over the network 104 with the first computing node 1140, which itself interfaces with the second computing node 1144 and the ticket authority 1036. More specifically, the first computing node 1140 is configured with the address of the second computing node 1144 and the ticket authority 1036. In one embodiment, as explained further below, the first computing node 1140 is configured to relay information between, and thereby prevent direct communication between, the web browser 1148 of the client 108, the second computing node 1144, and the ticket authority 1036. By preventing such direct communication, the first computing node 1140 adds an additional level of security to the system 1100. The first computing node 1140 can also be configured with the address of the intermediary node 1032, or, alternatively, with the address of two or more intermediary nodes 1032.

For its part, the second computing node 1144 is configured to determine which of the application programs running on the host services 116 are available to a user of the client 108. In other words, the second computing node 1144 is configured to determine which of the application programs the user is authorized to access. In one embodiment, after the user selects his desired application program, as described further below, the second computing node 1144 is further configured to determine which of the host services 116 will be used to run the user's desired application for purposes of load balancing. The second computing node 1144 returns the address of that host service 116 to the first computing node 1140. The second computing node 1144 also returns the address of the first protocol service 112, which can also be selected from amongst a plurality of first protocol services 112 through the use of a load balancing equation, to the first computing node 1140. In turn, the first computing node 1140 transmits the address of the chosen first protocol service 112 and the chosen host service 116 to the ticket authority 1036.

For its part, the ticket authority 1036 generates connection tickets. In one embodiment, the ticket authority 1036 transmits an initial connection ticket to the first computing node 1140 for transmission to the client 108. In another embodiment, the ticket authority transmits a first reconnection ticket to the intermediary node 1032.

Figure 11B:
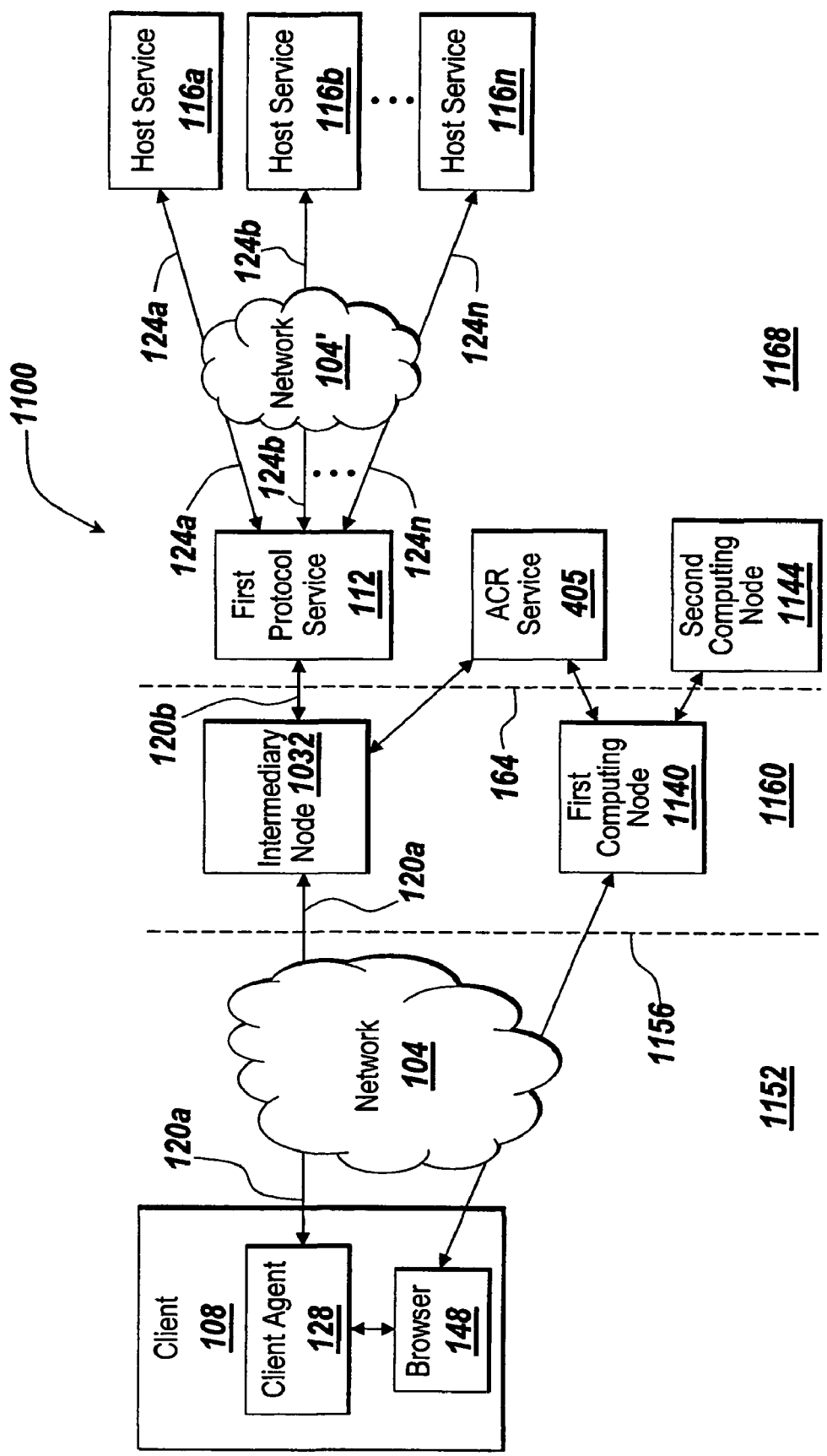
FIG. 11B is a block diagram of the illustrative system of FIG. 10B further including components for initially connecting the client to a host service and to maintain authentication credential according to an illustrative embodiment of the invention.

In another embodiment of a network communication system 1100 as shown in FIG. 11B, the ACR Service 405 can be used instead of the ticket authority 1036 to reconnect a client 108 to a host service 116. Instead of using tickets as with the ticket authority 1036, the ACR Service 405 generates, validates and manages SIDs and keys for connecting and reconnecting client communication sessions. The ACR Service 405 authenticates and re-authenticates the client to a host service 116 or server 415 using a SID and key, or a ticket, associated with the client 108. As previously mentioned, a ticket can be used to refer to the combination of a SID and key or a ticket can comprise a SID and a key.

The system 1100 of FIG. 11B includes the networks 104 and 104', the client 108, the first protocol service 112, the host services 116, the intermediary node 1032, and the ACR Service 405, as described above, and further depicts a first computing node 1140 and a second computing node 144, both of which are used, in one embodiment, for initially connecting the client 108 to a host service 116. Moreover, the client 108 further includes a web browser 148 to connect to the World Wide Web.

In one embodiment (not shown), the system 1100 includes two or more intermediary nodes 1032 and/or two or more first protocol services 112 or two or more ACR Services 405. The intermediary node 1032, through which messages between the client 108 and the first protocol service 112 must pass, and/or the first protocol service 112 can and/or the ACR Service 405, as explained below, each be chosen based on, for example, a load balancing equation.

In another embodiment, the system 1100 of FIG. 11B can include an external network 1152, separated from a "demilitarized zone" 1160 by a first firewall 1156 which in turn is separated from an internal network 1168 by a second firewall 1164. Although the invention is discussed above in terms of various network topologies in FIGS. 11A and 11B, any other network topologies can be used, such as for example, a topology including combinations of internal networks, external networks, sub-networks, intranets, firewalls, security zones, single servers, a server network or server farms.

Alternatively, in another embodiment not shown in FIG. 11B, the system 1100 further includes a third computing node 1146 positioned, in the demilitarized zone 1160, between the network 104 and the intermediary node 1032. The third computing node 1146 is used, in some embodiments, during the process of initially connecting the client 108 to a host service 116 and/or during the process of reconnecting the client 108 to a host service 116.

In another embodiment of the system 1100 in FIG. 11B, the intermediary node 1032, can be replaced by two or more levels "a"-"n" of intermediary nodes 1032a-1032n. The client agent 128 of the client 108 can be routed through any combination of the intermediary nodes 1032 based on, for example, load balancing equations.

In one embodiment, the web browser 1148 communicates over the network 104 with the first computing node 1140, which itself interfaces with the second computing node 1144 and the ACR Service 405. The first computing node 1140 is configured with the address of the second computing node 1144 and the ACR Service 405. In another embodiment to provide an additional level of security in the system 1100, the first computing node 1140 is configured to relay information between, and thereby prevent direct communication between, the web browser 1148 of the client 108, the second computing node 1144, and the ACR Service 405. The first computing node 1140 can also be configured with the address of any of the intermediary nodes 1032a-1032n.

For its part, the second computing node 1144 is configured to determine which of the application programs running on the host services 116 are available to a user of the client 108 and to provide the address of the host service 116 selected by the user to the first computing node 1140. The second computing node 1144 also provides the address of one of the multiple first protocol service 112, through the use of a load balancing equation, to the first computing node 1140. In turn, the first computing node 1140 transmits the address of the chosen first protocol service 112 and the chosen host service 116 to the ACR Service 405.

For its part, the ACR Service 405 generates, validates and manages connection SIDs and key to provide authentication and re-authentications services to re-establish a client's communication session with a host service 116 or server 415, as described herein. In one embodiment, the ACR Service 405 transmits a first SID and first key to the first computing node 1140 for transmission to the client 108. In another embodiment, the ACR Service 405 transmits a first SID and first key to one of the intermediary nodes 1032.

In another aspect, this invention relates to methods for network communications and reconnecting a client 108 to a host service 116 using a plurality of secondary protocols encapsulated within a first protocol. The method includes establishing a first connection between a client 108 and a first protocol service 112 using a first protocol and communicating between the client 108 and the first protocol service 112 via a plurality of second protocols encapsulated within the first protocol. Moreover, at least one of the second protocols includes a plurality of virtual channels.

In one embodiment of this aspect of the invention, a second connection is established between the first protocol service 112 and a host service 116 using one of the secondary protocols. Communication between the first protocol service 112 and the host service 116 occurs via one of the secondary protocols. Specifically, each of the plurality of second connections is established between the first protocol service 112 and a different host service 116 and each of the plurality of second connections is established using one of the plurality of secondary protocols. In yet another embodiment, the first connection between the client 108 and the first protocol service 116 is established through one or more intermediary nodes 1032.

Figure 12A:
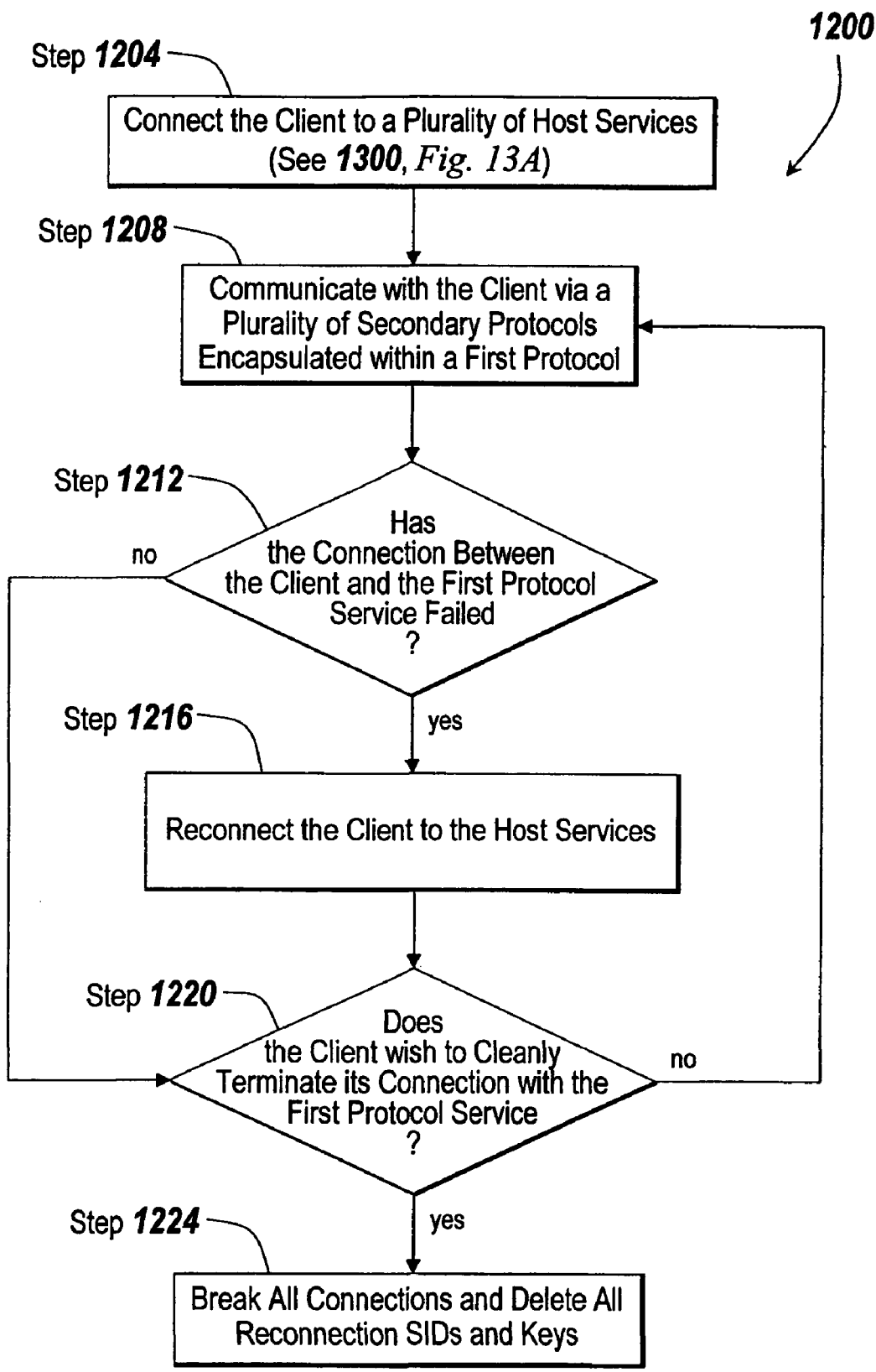
FIG. 12A is a flow diagram of a method for network communications according to an illustrative embodiment of the invention.

Referring now to FIG. 12A, one embodiment of a method 1200 for reconnecting a client to a host service after a network failure is illustrated. At step 1204, the client 108 initially connects to one of a plurality of host services 116 by employing, for example. Generally, the client 108 is required to transmit authentication credentials to the host service 116 to initiate the communication session. After the client 108 is connected to the host service 116, the client 108 and the host service 116 communicate, through the first protocol service 112, and at step 1208, via a plurality of secondary protocols encapsulated within the first protocol as discussed above in reference to FIGS. 2A-2B and FIG. 3. In one embodiment, the first protocol service 112 encrypts, prior to the transmission of any first protocol packets, communications at the level of the first protocol 204, thereby securing the communications. In another embodiment, the first protocol service 112 compresses, prior to the transmission of any first protocol packets, the communications at the level of the first protocol, thereby improving communication efficiency.

At step 1212, the client agent 128 determines whether the connection 120 between the client agent 128 and the first protocol service 112 has failed. For example, the connection 120a between the client agent 128 and the intermediary node 1032 may have failed, the connection 120b between the intermediary node 1032 and the first protocol service 112 may have failed, or both the connection 120a and the connection 120b may have failed. If the client agent 128 determines that the connection 120 has not failed, the method 1200 proceeds to step 1220. If, on the other hand, the client agent 128 determines that the connection 120 has failed, the client 108 is, at step 1216, reconnected to the host service 116.

The step of reconnecting in step 1216 after a first communication session ends abnormally, can comprise in a system 1100 deploying a ticket authority 1036 and the client 108 transmitting the SID and the first and second reconnection tickets to the intermediary node 1032. The intermediary node 1032 uses the first reconnection ticket to authenticate the client 108 and re-establish the connection 120 between the client 108 and the intermediate node 1032. The intermediary node 1032 then transmits the second reconnection ticket to the first protocol service 112, which uses the second reconnection ticket to authenticate re-establish the connection 124 to the host service 116. The reconnection tickets thus allow the client 108 to automatically establish a second communication session to the host service 116 without retransmitting the authentication credentials a second time.

In another embodiment, the step of reconnecting, in step 1216, can also comprise a system 1100 deploying an ACR Service 405. In such an embodiment, the client 108 transmits a first SID and first key to the intermediary node 1032 to authenticate the client 108 and reestablish the connection of the client 108 to the host service 116.

It is determined, at step 1220, whether the client 108 wishes to cleanly terminate its connection 120 with the first protocol service 112 and, consequently, its connections 124a-124n with the host services 116a-116n. If not, communication between the client 108 and the first protocol service 112, via the plurality of secondary protocols encapsulated within the first protocol, continues at step 1208. If so, then, at step 1224, all connections 120a, 120b, and 124a-124n are broken and all reconnection tickets are deleted. In another embodiment using an ACR Service 405, at step 1224, all connections 120a, 120b, and 124a-124n are broken and all SIDS and keys are deleted. In one embodiment, the intermediary node 1032 uses a handle it receives from the ticket authority 1036 to delete a copy of a first reconnection ticket kept at the ticket authority 136. In another embodiment deploying a ticket authority 1036, the first protocol service 112 deletes a copy of a second reconnection ticket kept at the first protocol service 112. In yet another embodiment deploying the ACR Service 405, the first protocol service 112 deletes a copy of a second SID and second key kept at the first protocol service 112.

In a further embodiment using a ticket authority 1036, if for some reason a secondary protocol connection 124 fails, a copy of the second reconnection ticket associated therewith and kept at the first protocol service 112 is deleted by the first protocol service 112. In yet another embodiment, a first reconnection ticket and/or a second reconnection ticket is automatically deleted after a pre-determined period of time following a failure in the connection 120, as at step 1212, and/or following a clean termination of the connection 120, as at step 1220.

Figure 12B:
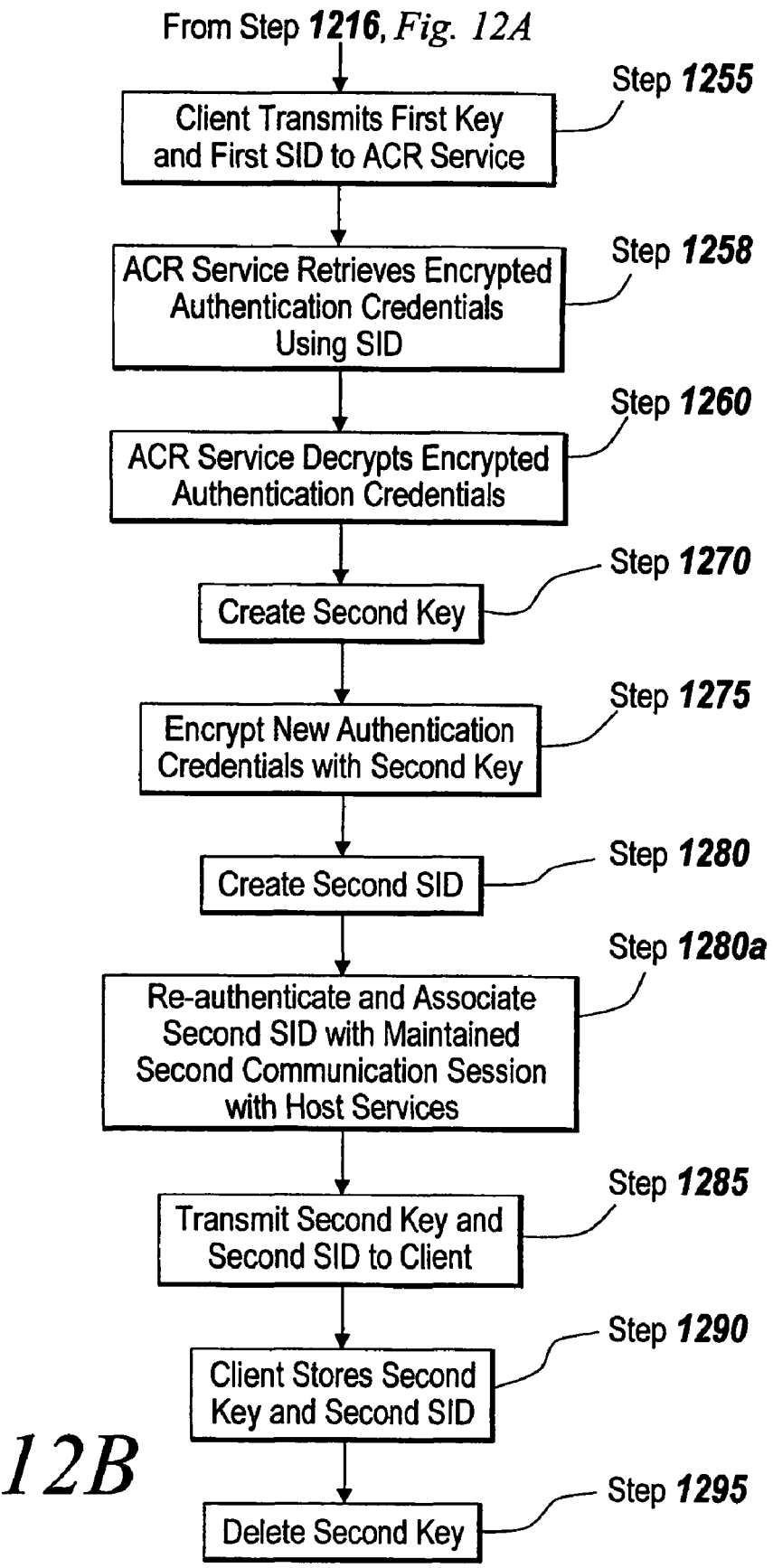
FIG. 12B is a flow diagram of a method for reconnecting the client to the host services.

In another aspect, this invention relates to methods for reconnecting the client 108 to the host service 116 using the ACR Service 405. Referring now to FIG. 12B, one embodiment of the method 1216 to reconnect a client 108 to a host service 116 is illustrated. The client 108 transmits the first SID and the first key to the ACR Service 405 to reconnect to the host service (step 1255). The ACR Service 405 uses the SID (step 1258) to locate and retrieve the encrypted authentication credentials and uses the key (step 1260) to decrypt the retrieved authentication credentials. In one embodiment (not shown), the ACR Service 405 uses the decrypted authentication credentials to re-authenticate the client 108 to the maintained session between the first protocol service 113 and the host service 116. After re-authenticating, the reestablished connection of the client 108 to the first protocol service 116 is re-linked to the maintained session between the first protocol service 112 and the host service 116.

In another embodiment, during the second communication session, the ACR Service 405 generates (step 1270) a second key for the authentication credentials and then encrypts (step 1275) the authentication credentials using the second key. The ACR Service 405 creates a second SID (step 1280). Then the decrypted authentication credentials are re-authenticated with the host service 116 and the second SID is associated with the maintained communication session with the host service 116 (step 1280a). The ACR Service 405 then transmits the second SID and second key to the client 108 (step 1285). In one embodiment, the ACR Service 405 may transmit the second SID and second key through an intermediary node 1032. The client 108 stores the second SID and second key (step 1290). The ACR Service 405 then deletes the second key (step 1295).

Figure 13A:
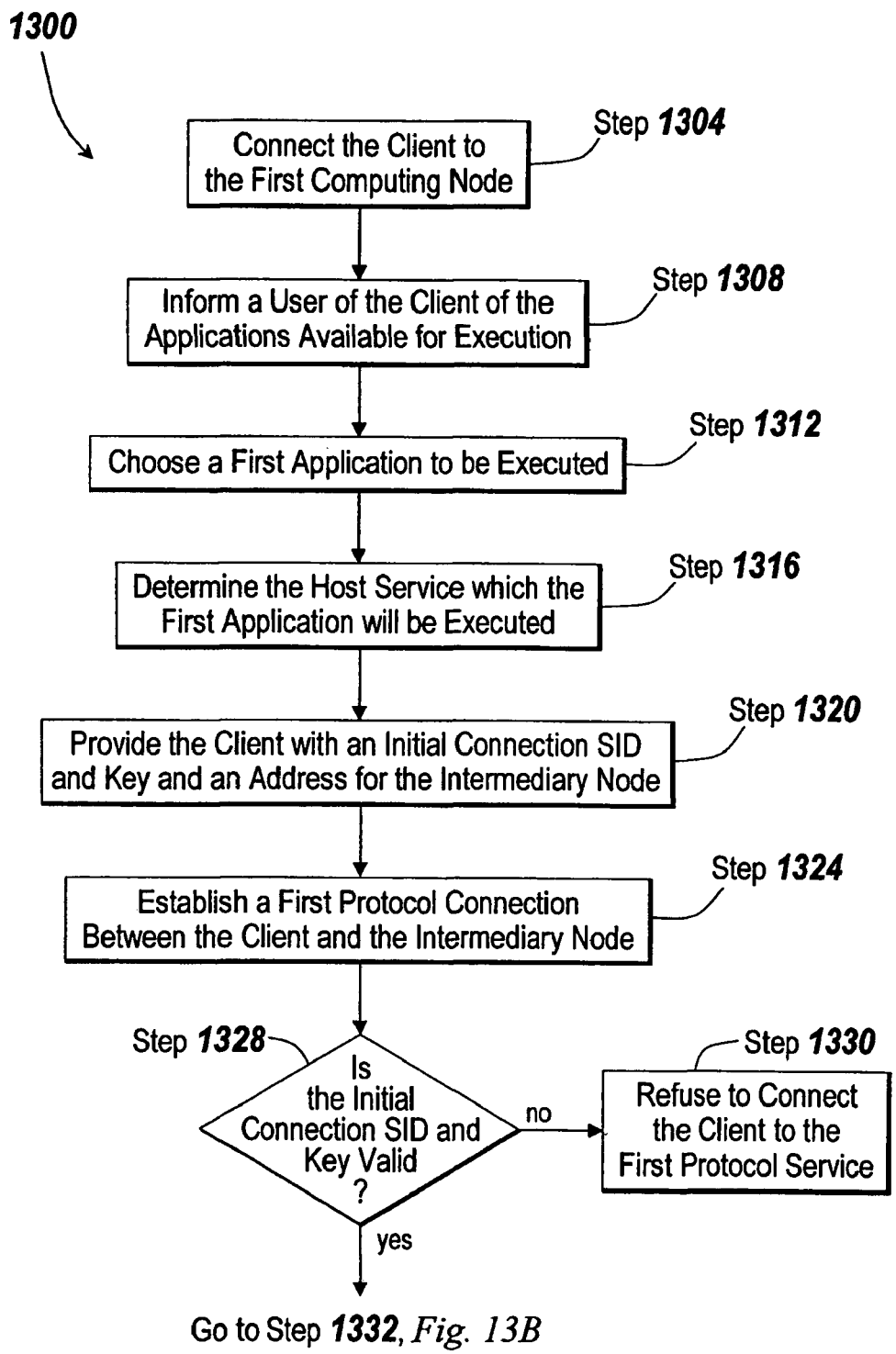
FIGS. 13A-13C are flow diagrams of a method for connecting a client to a plurality of host services according to an illustrative embodiment of the invention.
Figure 13B:
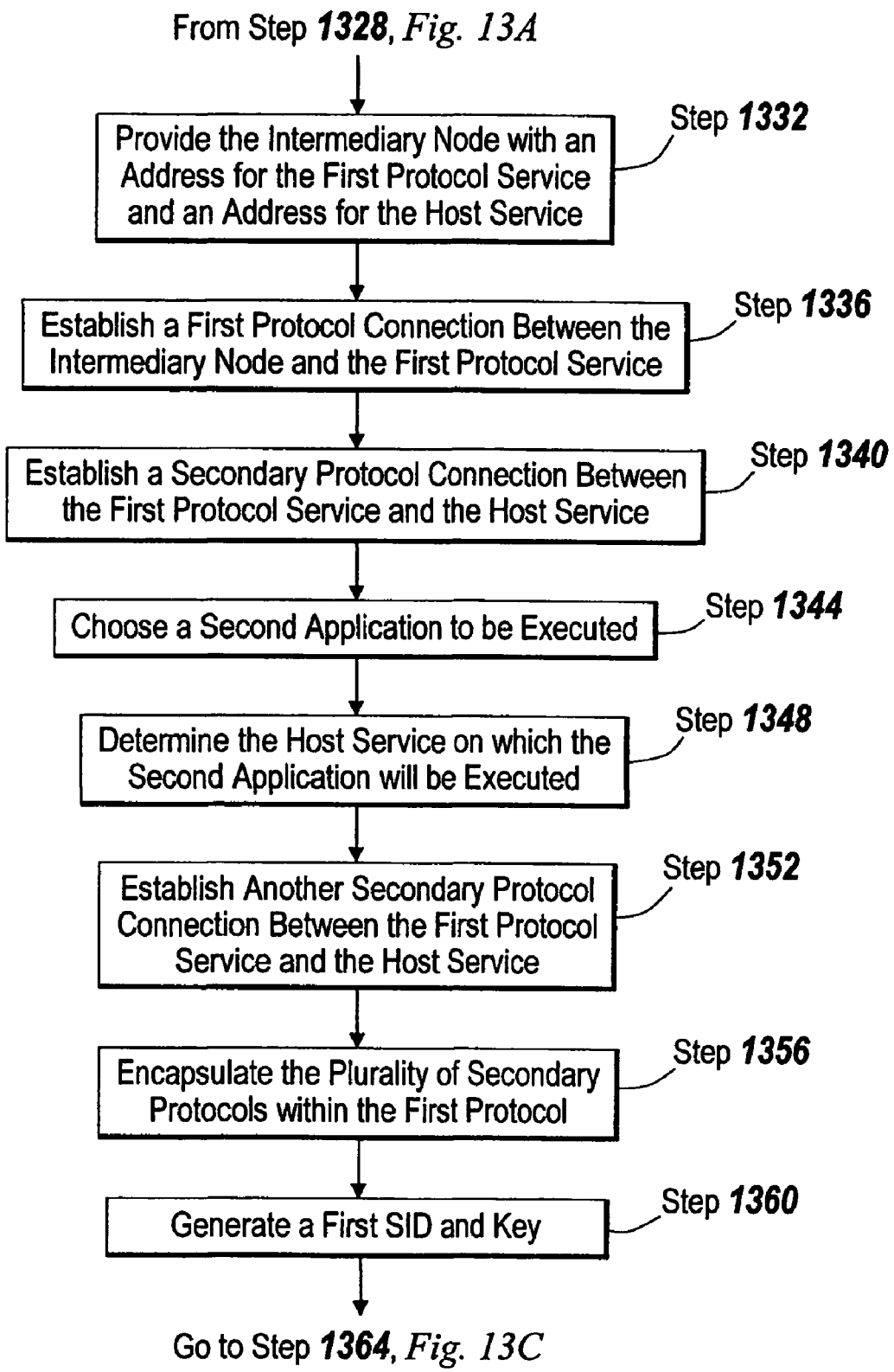
Figure 13C:
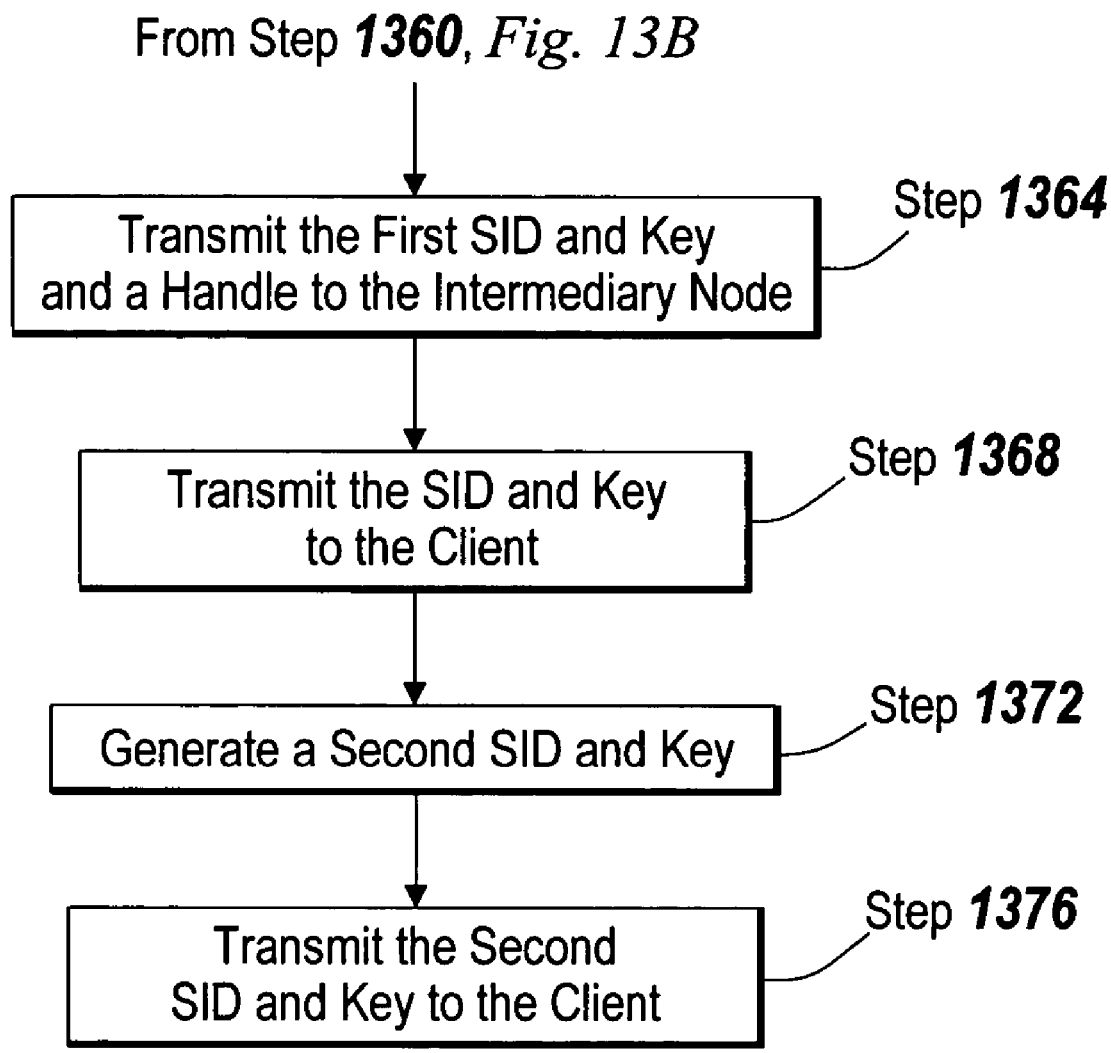

Referring to FIGS. 13A-13C, one embodiment of a method 1300 for initially connecting the client 108 to the host service 116 using an ACR Service 405 is illustrated. At step 1304, the client 108, using the browser 148, sends a request, such as, for example, an HTTP request, to the first computing node 1140. The first computing node 1140 returns a web page, such as, for example, an HTML form requesting authentication information (e.g., a username and a password). A user of the client 108 enters his authentication credentials and transmits the completed form to the first computing node 1140.

The first computing node 1140, at step 1308, then informs the user of the client 108 of applications available for execution. In one embodiment, the first computing node 1140 extracts the user's credentials from the login page and transmits them to the second computing node 1144, together with a request for the second computing node 1144 to enumerate the applications available to the user. Based on the user's credentials, the second computing node 1144 returns a list of specific applications available to the first computing node 1140, which then forwards the list, in the form of a web page for example, to the user of the client 108.

At step 1312, the user selects the desired application and a request for that application is sent to the first computing node 1140. For example, in one embodiment, the user clicks on a desired application listed in the web page presented to him by the first computing node 1140 and an HTTP request for that application is forwarded to the first computing node 1140. The request is processed by the first computing node 140 and forwarded to the second computing node 1144.

At step 1316, the second computing node 144 determines the host service 116 on which the desired application will be executed. The second computing node 1144 can make that determination based, for example, on a load balancing equation. In one embodiment, the second computing node 1144 also determines a first protocol service 112 from amongst a plurality of first protocol services 112 that will be used to communicate with the host service 116 via a connection 124. Again, the second computing node 1144 can make that determination based, for example, on a load balancing equation. The second computing node 1144 returns the address of the chosen host service 116 and the chosen first protocol service 112 to the first computing node 1140.

The client 108, at step 1320, is then provided with an initial connection session id and key, a first SID and first key, and an address for the intermediary node 1032 (which is either its actual address or its virtual address, as described below). In one embodiment, the first computing node 1140 provides the address for the chosen host service 116 and the chosen first protocol service 112 to the ACR Service 405, together with a request for the initial connection session id and key. The ACR Service 405 generates the initial session id and key, and transmits the session id and key to the first computing node 1140, while keeping a copy for itself.

The first computing node 1140, configured, in one embodiment, with the actual address of the intermediary node 1032, then transmits the actual address of the intermediary node 1032 and the initial connection session id and key to the browser 1148 of the client 108. The first computing node 1140 can, for example, first create a file containing both the actual address of the intermediary node 1032 and the initial connection ticket and then transmitting the file to the browser 1148 of the client 108. Optionally, in another embodiment, the first computing node 1140 is configured with the actual address of two or more intermediary nodes 1032. In such an embodiment, the first computing node 1140 first determines the intermediary node 1032 through which messages between the client 108 and the first protocol service 112 will have to pass. The first computing node 1140 then transmits the actual address of that chosen intermediary node 1032 and the initial connection ticket to the browser 1148 of the client 108 using, for example, the file described above. In one embodiment, the first computing node 1140 chooses the intermediary node 1032 using a load balancing equation. The client agent 128 of the client 108 is then launched and uses the address of the intermediary node 1032, to establish, at step 1324, a first protocol connection 120a between the client agent 128 of the client 108 and the intermediary node 1032.

Alternatively, in another embodiment, the first computing node 1140 is configured with an actual address of the third computing node 1146, which serves as a virtual address of an intermediary node 1032. In such an embodiment, the first computing node 1140 transmits, at step 1320, the actual address of the third computing node 1146 and the initial connection session id and key to the browser 1148 of the client 108 using, for example, the file described above. The client agent 128 of the client 108 is then launched and uses the actual address of the third computing node 1146 to establish, at step 1324, a first protocol connection between the client agent 128 of the client 108 and the third computing node 1146. The third computing node 1146 then determines the intermediary node 1032 through which messages between the client 108 and the first protocol service 112 will have to pass. In one embodiment, the third computing node 1146 chooses the intermediary node 1032 using a load balancing equation. Having chosen the intermediary node 1032, the third computing node 1146 establishes a first protocol connection to the intermediary node 1032. A first protocol connection 120a therefore exists, through the third computing node 1146, between the client agent 128 of the client 108 and the intermediary node 1032. The actual address of the third computing node 1146 is therefore mapped to the actual address of the intermediary node 1032. To the client agent 128 of the client 108, the actual address of the third computing node 146 therefore serves as a virtual address of the intermediary node 1032.

In one embodiment, where more than one level of intermediary nodes 1032a-1032n exist, as described above, the first computing node 1140 or the third computing node 1146, respectively, only choose the intermediary node 1032 to which the client agent 128 will connect at level "a." In such an embodiment, at each of the levels "a"-"n−1", the intermediary node 1032 through which the client agent 128 is routed at that level thereafter determines, based on a load balancing equation for example, the intermediary node 1032 to which it will connect at the next level. Alternatively, in other embodiments, the first computing node 1140 or the third computing node 1146, respectively, determine, for more than one or all of the levels "a"-"n", the intermediary nodes 1032 through which the client agent 128 will be routed.

Having established the first protocol connection 120a between the client agent 128 of the client 108 and the intermediary node 1032, for example the intermediate node 1032 at level "n" (hereinafter referred to in method 1300 as the intermediary node 1032), the client agent 128 then transmits the initial connection ticket to the intermediary node 1032.

It is then determined, at step 1328, whether the initial connection SID and key is valid. In one embodiment, the intermediary node 1032 transmits the initial connection SID and key to the ACR Service 405 for validation. In one embodiment, the ACR Service 405 validates the SID and key by comparing it to the copy of the SID and encrypted authentication credentials it kept at step 1320. If the ACR Service 405 determines the SID and key to be valid, the ACR Service 405 transmits, at step 1332, the address of the first protocol service 112 and the address of the chosen host service 116 to the intermediary node 1032. The first protocol service 112 can also delete the SID and key and any copy thereof. If, on the other hand, the ACR Service 405 determines the SID and key to be invalid, the client 108 is, at step 1330, refused connection to the first protocol service 112 and, consequently, connection to the host service 116.

Following step 1332, the intermediary node 1032 uses the address of the chosen first protocol service 112 to establish, at step 1336, a first protocol connection 120b between the intermediary node 1032 and the first protocol service 112. A first protocol connection 120 therefore now exists, through the intermediary node 1032, between the client agent 128 of the client 108 and the first protocol service 112. The intermediary node 1032 can also pass the address of the chosen host service 116 to the first protocol service 112.

In one embodiment, at step 1340, the first protocol service 112 uses the address of the chosen host service 116 to establish a secondary protocol connection 124 between the first protocol service 112 and the chosen host service 116. For example, the chosen host service 116 is in fact the host service

116a and a secondary protocol connection 124a is established between the first protocol service 112 and the host service 116a.

In one embodiment, following step 1340, the user chooses, at step 1344, a second application to be executed and the second computing node 1144 determines, at step 1348, the host service 116 on which the second application is to be executed. For example, by calculating a load balancing equation, the second computing node 1144 may choose the host service 116b to execute the second application program. The second computing node 1144 then transmits the address of the chosen host service 116b to the first protocol service 112. In one embodiment, the second computing node 1144 is in direct communication with the first protocol service 112 and directly transmits the address thereto. In another embodiment, the address of the chosen host service 116b is indirectly transmitted to the first protocol service 112. For example, the address can be transmitted to the first protocol service 112 through any combination of the first computing node 1140, the ACR Service 405, the intermediary node 1032, and the first protocol service 112. Having received the address of the chosen host service 116b, the first protocol service 112 establishes, at step 1352, a secondary protocol connection 124b between the first protocol service 112 and the chosen host service 1116b.

Steps 1344, 1348, and 1352 can be repeated any number of times. As such, any number of application programs can be executed on any number of host services 116a-116n, the outputs of which can be communicated to the first protocol service 112 over the connections 124a-124n using any number of secondary protocols.

Turning now to step 1356, the first protocol service 112 can, as described above, encapsulate the plurality of secondary protocols within the first protocol. As such, the client 108 is connected to, and simultaneously communicates with, a plurality of host services 116.

In another embodiment, prior to performing steps 1344, 1348, and 1352 to execute a new application program on a host service 116, such as, for example, the host service 116b, a user of the client 108 ends execution of another application program, such as, for example, an application program executing on host service 116a. In such a case, the first protocol service 112 disrupts the connection 124a between the first protocol service 112 and the host service 116a. The first protocol service 112 then establishes, by implementing steps 1344, 1348, and 1352, the connection 124b between the first protocol service 112 and the host service 116b, without interrupting the connection 120 between the client 108 and the first protocol service 112.

In one embodiment, a first SID and key is generated at step 1360. For example, the intermediary node 1032 requests a first SID and key from the ACR Service 405. Upon receiving the request, the ACR Service 405 generates the first SID and key, and can also generate a handle, which is, for example, a random number. The ACR Service 405 can then transmit, at step 1364, the first SID and key and the handle to the intermediary node 1032, while keeping a copy of the first SID and key and a copy of the handle. The ACR Service 405 continues to maintain the address of the first protocol service 112 that was transmitted to it by the first computing node 1140 at step 1320. The intermediary node 1032 then transmits, at step 1368, the first reconnection ticket to the client 108.

At step 1372, a second SID and key is then generated. In one embodiment, the first protocol service 112 generates the second SID and key. The first protocol service 112, at step 1376, then transmits the second SID and key, through the intermediary node 1032, to the client 108. In doing so, the first protocol service 112 keeps a copy of the key and a session number associated therewith for identifying the session to be reconnected following a disruption of the connection 120. In one embodiment, for example, the first protocol service 112 maintains, for a particular session number, a table listing the secondary protocol connections 124a-124n associated with that session number. Accordingly, following re-establishment of the first protocol connection 120 and validation of the second SID and key at the first protocol service 112, as described below, the first protocol service 112 can identify the secondary protocol connections 124 to be encapsulated within the re-established first protocol connection 120 for communication to the client 108.

In an embodiment not shown in FIGS. 13A-13C, a ticket authority 1136 can be used instead of the ACR Service 405 to provide for reconnecting a client 108 to a host service 116. In the method 1300, the ticket authority 1326 would generate and transmit reconnection tickets instead of SIDs and keys as with the ACR Service 405. For example, at steps 1320, a ticket authority 1036 would provide the client 108 with an initial connection ticket and an address for the intermediary node 1032. Also, in step 1328, the ticket authority 1036 would determine if the initial connection ticket is valid and at step 1360, would generate a first reconnection ticket. Additionally, at steps 1364, 1368, 1372 and 1378 the ticket authority would generate and transmit the first and second reconnection tickets in accordance with method 1300. As such, the ticket authority 1036 facilitated the reconnecting of the client 108 to the host service 116.

Figure 14:
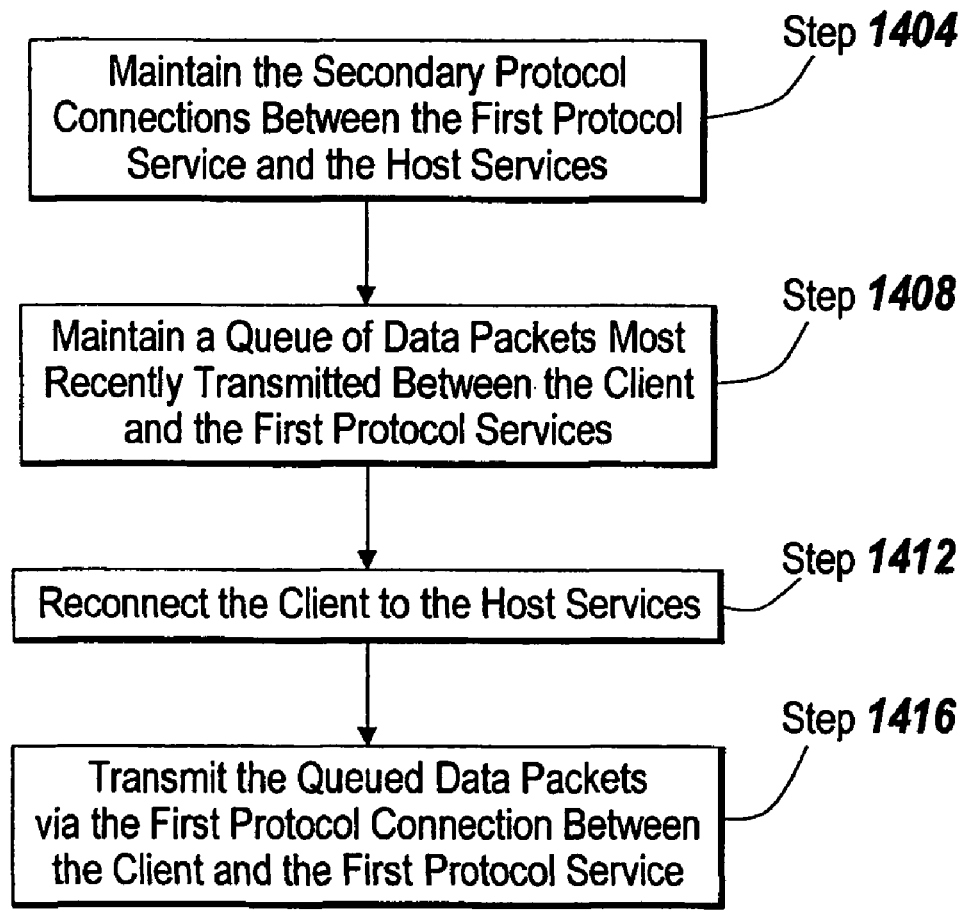
FIG. 14 is a flow diagram of a method for providing a client with a reliable connection to host services and for reconnecting the client to the host services according to an illustrative embodiment of the invention.

Referring now to FIG. 14, one embodiment of a method 1400 for providing a client 108 with a persistent and reliable connection to one or more host services 116 and for reconnecting the client 108 to the host services 116 (for example at step 1216 of FIG. 12A) is illustrated. In particular, at step 1404, the secondary protocol connection 124 between the first protocol service 112 and each of the one or more host services 116 is maintained. Moreover, at step 1408, a queue of data packets most recently transmitted between the client agent 128 of the client 108 and the first protocol service 112, via the connection 120 that was determined to have broken, for example, at step 1216 of FIG. 12, is maintained. In one embodiment, the data packets are queued and maintained both before and upon failure of the connection 120. The queued data packets can be maintained, for example, in a buffer by the client agent 128. Alternatively, the first protocol service 112 can maintain in a buffer the queued data packets. In yet another embodiment, both the client agent 128 and the first protocol service 112 maintain the queued data packets in a buffer.

At step 1412, a new first protocol connection 120 is established between the client agent 128 of the client 108 and the first protocol service 112 and linked to the maintained secondary protocol connection 124 between the first protocol service 112 and each of the one or more host services 116, thereby reconnecting the client 108 to the host services 116. After the client 108 is reconnected, the queued data packets maintained at step 1408 can be transmitted, at step 1416, via the newly established first protocol connection 120. As such, the communication session between the host services 116 and the client 108, through the first protocol service 112, is persistent and proceeds without any loss of data. In one embodiment, the ACR Service 405 authenticates the client 108 to the host service 116 before reconnecting the client 108 to a host service 116. In another embodiment, the first protocol service 112 validates a reconnection ticket with the ticket authority 1036 before reconnecting the client 108 to a host service 116.

Figure 15A:
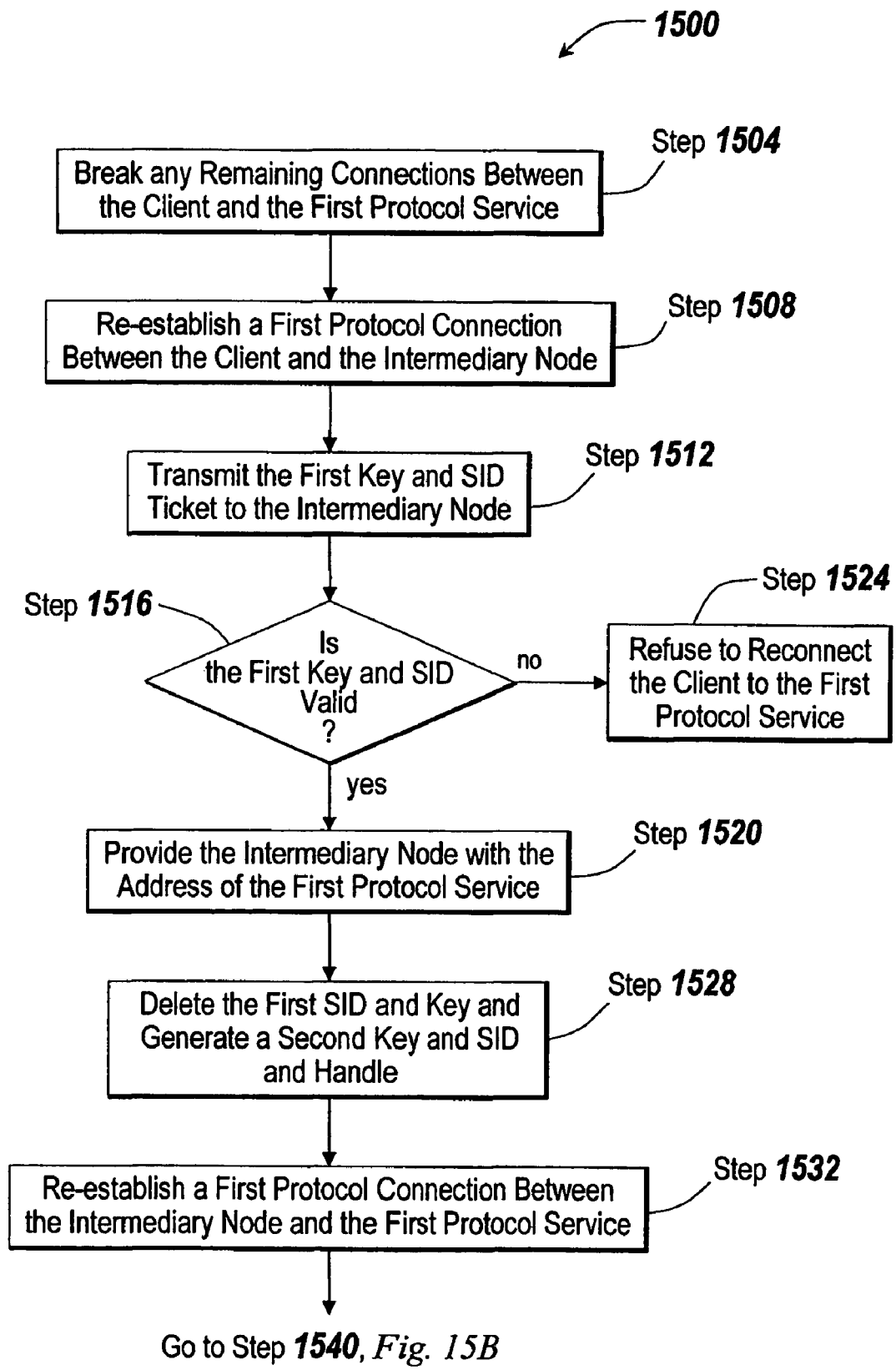
FIGS. 15A-15B are flow diagrams of a method for reconnecting a client to host services according to an illustrative embodiment of the invention.
Figure 15B:
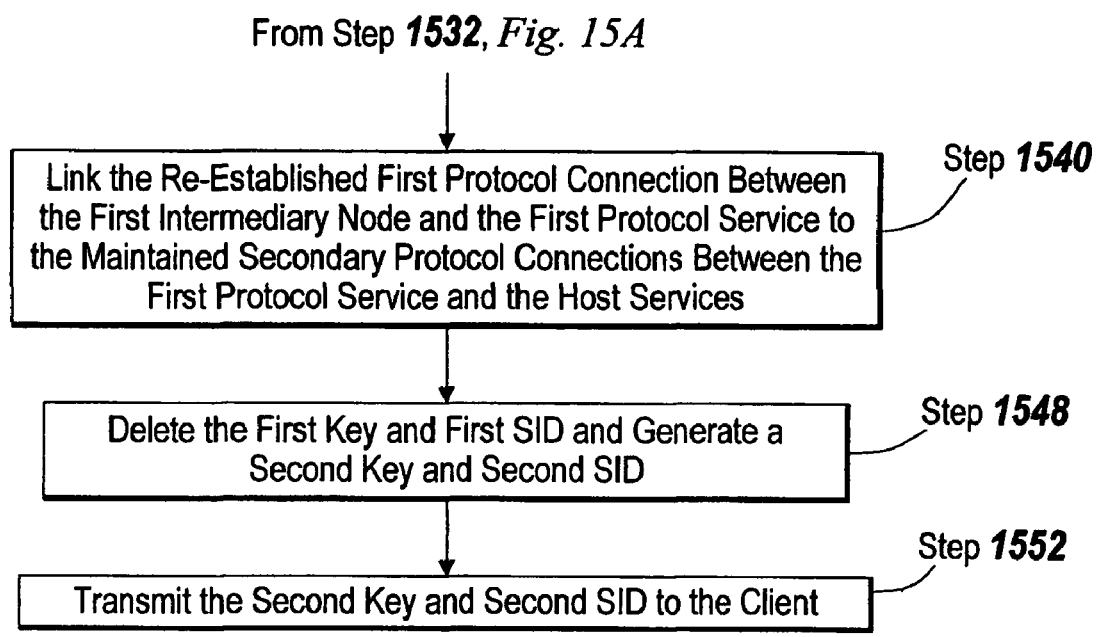

FIGS. 15A-15B, illustrate one embodiment of a method 1500 for reconnecting the client 108 to the one or more host services 116 using an ACR Service 405 as in the embodiment of the system 1100 depicted in FIG. 11B.

At step 1504, any remaining connections between the client 108 and the first protocol service 112 are broken. For example, where the connection 120a has failed, but the connection 120b has not, the connection 120b is broken. Alternatively, where the connection 120b has failed, but the connection 120a has not, the connection 120a is broken.

In one embodiment, using the actual address of the intermediary node 1032 provided to the client 108, the client agent 128 of the client 108 then re-establishes, at step 1508, the first protocol connection 120a between the client agent 128 and the intermediary node 1032. Alternatively, in another embodiment, using the actual address of the third computing node 1146 provided to the client 108, the client agent 128 of the client 108 then re-establishes, at step 1508, a first protocol connection between the client agent 128 and the third computing node 1146. The third computing node 1146 then determines the intermediary node 1032 through which messages between the client 108 and the first protocol service 112 will have to pass. In one embodiment, the third computing node 1146 chooses the intermediary node 1032 using a load balancing equation. The intermediary node 1032 chosen by the third computing node 1146 in reconnecting the client 108 to the one or more host services 116 can be different from that chosen to initially connect the client 108 to the one or more host services 116. Having chosen the intermediary node 1032, the third computing node 1146 re-establishes a first protocol connection to the intermediary node 1032. A first protocol connection 120a is therefore re-established, through the third computing node 1146, between the client agent 128 of the client 108 and the intermediary node 1032.

In one embodiment, where more than one level of intermediary nodes 1032 exist, the intermediary node 1032 through which the client agent 128 is routed at each of the levels "a"-"n-1" thereafter determines, based on a load balancing equation for example, the intermediary node 1032 to which it will connect at the next level. Alternatively, in another embodiment, the third computing node 1146 determines, for more than one or all of the levels "a"-"n", the intermediary nodes 1032 through which the client agent 128 will be routed.

Having re-established the first protocol connection 120a between the client agent 128 of the client 108 and the intermediary node 1032, for example the intermediate node 1032 at level "n" (hereinafter referred to in method 1500 as the intermediary node 1032), the client agent 128 then transmits, at step 1512, the first SID and key and the second SID and key to the intermediary node 1032.

It is then determined, at step 1516, whether the first SID and key is valid. In one embodiment, the validity of the first SID and key is determined by using the ACR Service 405. For example, the intermediary node 1032 transmits the first SID and key to the ACR Service 405. In one embodiment, the ACR Service 405 determines the validity of the first SID and key by comparing it to a copy of the first SID stored in memory 430. If the ACR Service 405 determines the first SID and key to be valid, the ACR Service 405 re-authenticates the client 108 to the host service 116 and transmits, at step 1520, the address of the first protocol service 112 to the intermediary node 1032. Otherwise, if the ACR Service 405 determines the first SID and key to be invalid, the client 108 is, at step 1524, refused reconnection to the first protocol service 112 and, consequently, reconnection to the host services 116.

At step 1528, the first SID and key is deleted by, for example, the ACR Service 405 and a replacement second SID and key is generated by the ACR Service 405. In some such embodiments, the ACR Service 405 transmits the second SID and key to the intermediary node 1032. In some embodiments, the ACR Service 405 waits for the client 108 to acknowledge that it has received the second SID and key before it proceeds to delete the first SID and key.

After the first SID and key is validated, the intermediary node 1032, using the address of the first protocol service 112, re-establishes, at step 1532, the first protocol connection 120b between the intermediary node 1032 and the first protocol service 112. Having re-established the first protocol connection 120b between the intermediary node 1032 and the first protocol service 112, it is then determined, at step 1536, whether the second SID and key is valid. In one embodiment, the validity of the second SID and key is determined by using the first protocol service 112. For example, the intermediary node 1032 transmits the second SID and key to the first protocol service 112. In one embodiment, the first protocol service 112 determines the validity of the second SID and key by comparing it to a previously kept copy of the second SID and encrypted authentication credentials. If the first protocol service 112 determines the second SID and key to be valid, the re-established first protocol connection 120b between the first intermediary node 1032 and the first protocol service 112 is linked, at step 1540, to the maintained secondary protocol connection 124 between the first protocol service 112 and each of the one or more host services 116. Otherwise, if the first protocol service 112 determines the second SID and key to be invalid, the re-established first protocol connection 120b is not linked to the one or more maintained secondary protocol connections 124 and the client 108 is, at step 1544, refused reconnection to the one or more host services 116.

At step 1548, the second SID and key is deleted by, for example, the first protocol service 112 and a replacement second SID and key is generated by, for example, the first protocol service 112 for transmission to the client 108. In such an embodiment, the first protocol service 112 keeps a copy of the replacement second SID and key. In some embodiments, the first protocol service 112 waits for the client 108 to acknowledge that it has received the replacement second SID and key before it proceeds to delete the second session id and key At step 1552, the replacement second SID and key are transmitted to the client. For example, the ACR Service 405 can transmit, through the intermediary node 1032, the replacement second SID and key to the client 108. Moreover, in one embodiment, the first protocol service 112 transmits, through the intermediary node 1032, the replacement second SID and key to the client 108.

In an embodiment not shown in FIGS. 15A-15C, a ticket authority 1036 could also be used instead of the ACR Service 405 for reconnecting a client 108 to a host service 116. In the method 1500, the ticket authority 1036 would generate and transmit reconnection tickets instead of SIDs and keys as with the ACR Service 405. For example, at steps 1512, a ticket authority 1036 would determine in step 1516 if a first reconnect ticket received from the intermediary node 1032 in step 1512 is valid. At step 1528 the ticket authority 1036 would delete the first reconnection ticket and generates a second reconnection ticket with a handle. As such, the ticket authority 1036 facilitates re-establishing and re-authenticating the communication session of the client 108 to the host service 116.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A method for maintaining a session between a client and a host service, the method comprising the steps of:
    (a) providing, by a first protocol service, a first connection between a client and the first protocol service, and a second connection between the first protocol service and a first server;
    (b) establishing a user session via a second protocol between an application of the client and a host service via the first connection and the second connection;
    (c) communicating, by the client, to the first protocol service via the second protocol encapsulated in a first protocol, and the first protocol service communicating to the host service using the second protocol;
    (d) detecting, by the first protocol service, a disruption in the first connection interrupting the user session;
    (e) while maintaining the second connection and user session related information, re-establishing, by at least one of the client or the first protocol service, the disrupted first connection via the first protocol; and
    (f) continuing the user session between the application of the client and the host service via the second protocol.

2. The method of claim 1, comprising communicating, by the client, to the host service using a network identifier assigned by a computing device to the client, and the host service communicating to the client using the network identifier.

3. The method of claim 2, wherein the computing device comprises one of a server, a network device, or a Dynamic Host Configuration Protocol server.

4. The method of claim 1, comprising re-establishing, by at least one of the client or the first protocol service, the disrupted first connection without one of re-opening or closing the user session associated with the second protocol.

5. The method of claim 1, comprising maintaining, by at least one of the first protocol service or the server, the second connection via the second protocol used by the application for the user session.

6. The method of claim 1, comprising re-establishing the first connection using the same protocol used by the application of the client to communicate with one of the first protocol service or the server.

7. The method of claim 1, wherein the second protocol comprises a remote display protocol.

8. The method of claim 7, wherein the remote display protocol comprises one of the Independent Computing Architecture protocol or the Remote Desktop Protocol.

9. The method of claim 1, comprising the host service executing an application program on behalf of the client, and transmitting display output generated by the application program to the client.

10. The method of claim 1, comprising encrypting communications via the second protocol.

11. The method of claim 1, wherein step (e) further comprises re-establishing the user session by using a ticket associated with the client.

12. The method of claim 11, wherein step (e) further comprises authenticating the client via the ticket to re-establish the disrupted first connection.

13. The method of claim 1, wherein the first protocol comprises an application-layer transport protocol.

14. The method of claim 1, wherein the first protocol service comprises one of a tunneling or an application-level proxy.

15. The method of claim 1, comprising re-establishing the disrupted first connection transparently to at least one of the following:
    a transport driver interface and at least a presentation layer of a network communication stack,
    the second protocol,
    a user of the client, and
    an application executing on the client.

16. The method of claim 1, comprising re-establishing the disrupted first connection without one of manipulating a transport driver interface, or intercepting a communication at the transport driver interface.

17. The method of claim 1, comprising re-establishing the disrupted first connection transparently to the application of the client by a client agent corresponding to the application.

18. The method of claim 1, wherein the client is a non-mobile client.

19. A system for maintaining a session between a client and a host service, the system comprising:
    a means for providing a first connection between a client and a first protocol service, and a second connection between the first protocol service and a first server;
    a means for establishing a user session via a second protocol between an application of the client and a host service via the first connection and the second connection;
    a means for communicating, by the client, to the first protocol service via the second protocol encapsulated in a first protocol, and the first protocol service communicating to the host service using the second protocol;
    means for detecting a disruption in the first connection interrupting the user session;
    means for re-establishing the disrupted first connection via the first protocol while maintaining the second connection and user session related information; and
    means for continuing the user session between the application of the client and the host service via the second protocol.

20. The system of claim 19, comprising a means for communicating, by the client, to the host service using a network identifier assigned by a computing device to the client, and the host service communicating to the client using the network identifier.

21. The system of claim 20, wherein the computing device comprises one of a server, a network device, or a Dynamic Host Configuration Protocol server.

22. The system of claim 19, comprising a means for re-establishing the disrupted first connection without one of re-opening or closing the user session associated with the second protocol.

23. The system of claim 19, comprising a means for maintaining, by at least one of the first protocol service or the server, the second connection via the second protocol used by the application for the user session.

24. The system of claim 19, comprising a means for re-establishing the first connection using the same protocol used by the application of the client to communicate with one of the first protocol service or the server.

25. The system of claim 19, wherein the second protocol comprises a remote display protocol.

26. The system of claim 25, wherein the remote display protocol comprises one of the Independent Computing Architecture protocol or the Remote Desktop Protocol.

27. The system of claim 19, comprising a means for the host service to execute an application program on behalf of the client, and transmit display output generated by the application program to the client.

28. The system of claim 19, comprising a means for encrypting communications via the second protocol.

29. The system of claim 19, comprising a means for re-establishing the user session by using a ticket associated with the client.

30. The system of claim 29, comprising a means for authenticating the client via the ticket to re-establish the disrupted first connection.

31. The system of claim 19, wherein the first protocol comprises an application-layer transport protocol.

32. The system of claim 19, wherein the first protocol service comprises one of a tunneling or an application-level proxy.

33. The system of claim 19, comprising a means for re-establishing the disrupted first connection transparently to at least one of the following:
- a transport driver interface and at least a presentation layer of a network communication stack,
- the second protocol,
- a user of the client, and
- an application executing on the client.

34. The system of claim 19, comprising a means for re-establishing the disrupted first connection without one of manipulating a transport driver interface, or intercepting a communication at the transport driver interface.

35. The system of claim 19, comprising a means for re-establishing the disrupted first connection transparently to the application of the client by a client agent corresponding to the application.

36. The system of claim 19, wherein the client is a non-mobile client.

* * * * *